US011405829B2

(12) United States Patent
Kawasaki et al.

(10) Patent No.: US 11,405,829 B2
(45) Date of Patent: Aug. 2, 2022

(54) COMMUNICATION CONTROL METHOD FOR A USER EQUIPMENT THAT CONFIGURES A PROTOCOL DATA UNIT SESSION TO CORRESPOND TO A NON-IP PACKET DATA NETWORK CONNECTION

(71) Applicants: SHARP KABUSHIKI KAISHA, Sakai (JP); FG Innovation Company Limited, Hong Kong (CN)

(72) Inventors: Yudai Kawasaki, Sakai (JP); Yasuo Sugawara, Sakai (JP); Shuichiro Chiba, Sakai (JP); Masafumi Aramoto, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/765,417

(22) PCT Filed: Nov. 20, 2018

(86) PCT No.: PCT/JP2018/042858
§ 371 (c)(1),
(2) Date: May 19, 2020

(87) PCT Pub. No.: WO2019/098388
PCT Pub. Date: May 23, 2019

(65) Prior Publication Data
US 2020/0336948 A1 Oct. 22, 2020

(30) Foreign Application Priority Data
Nov. 20, 2017 (JP) .............................. JP2017-222796

(51) Int. Cl.
H04W 36/00 (2009.01)
H04W 36/14 (2009.01)
H04W 88/02 (2009.01)

(52) U.S. Cl.
CPC ....... *H04W 36/0022* (2013.01); *H04W 36/14* (2013.01); *H04W 88/02* (2013.01)

(58) Field of Classification Search
CPC . H04W 36/0022; H04W 36/14; H04W 88/02; H04W 8/06; H04W 88/06; H04W 60/00; H04M 1/00
(Continued)

(56) References Cited

U.S. PATENT DOCUMENTS

2016/0080981 A1* 3/2016 Wang ................ H04W 36/0011 370/331
2017/0289858 A1 10/2017 Faccin et al.
(Continued)

FOREIGN PATENT DOCUMENTS

WO WO2017/023346 11/2015

OTHER PUBLICATIONS

Ericsson "Handling of Ethernet and unstructured PDU session types when interworking with EPC (23.502)" SA WG2 Meeting #123, S2-177739, Oct. 23-27, 2017, Ljubljana, Slovenia (Year: 2017).*
(Continued)

*Primary Examiner* — Michael Y Mapa
(74) *Attorney, Agent, or Firm* — Imperium Patent Works

(57) ABSTRACT

A communication measure is provided that causes a PDU session established in a 5GS to return to an original state of the PDU session in a case that the PDU session is moved (handed over) to an EPS and then moved (handed over) to the 5GS again. In addition, according to the present invention, a communication measure is provided that causes a PDN connection established in the EPS to return to the PDN
(Continued)

connection in an original state after the PDN connection established in the EPS is moved (handed over) to the 5GS and then again moved (handed over) to the EP. In addition, according to the present invention, a communication measure is provided that allows smooth mobility of the UE in an idle mode between the 5GS and the EPS. This allows a communication measure that performs a handover between the 5GS and the EPS smoothly to be provided.

4 Claims, 14 Drawing Sheets

(58) Field of Classification Search
USPC .................................. 455/436–445; 370/331
See application file for complete search history.

(56) References Cited

U.S. PATENT DOCUMENTS

| | | | | |
|---|---|---|---|---|
| 2018/0270716 | A1* | 9/2018 | Takahashi | H04W 36/0033 |
| 2021/0195490 | A1* | 6/2021 | Rommer | H04W 36/0022 |

OTHER PUBLICATIONS

Ericsson: "Handling of Ethernet and unstructured PDU session types when interworking with EPC (23.501)", SA WG2 Meeting #123, S2-177673, Oct. 23-27, 2017, Ljubljana, Slovenia (Year: 2017).*

"Handling of Ethernet and unstructured PDU session types when interworking with EPC (23.502)" SA WG2 Meeting #123, S2-177739, Oct. 23-27, 2017, Ljubljana, Slovenia (Year: 2017).*

"Handling of Ethernet and unstructured PDU session types when interworking with EPC (23.501)", SA WG2 Meeting #123, S2-177673, Oct. 23-27, 2017, Ljubljana, Slovenia (Year: 2017).*

3GPP TS 23.501 V1.5.0 (Nov. 2017) 3rd Generation Partnership Project; Technical Specification Group Services and System Aspects; System Architecture for the 5G System; Stage 2 (Release 15).

3GPP TS 23.502 V1.3.0 (Nov. 2017) 3rd Generation Partnership Project; Technical Specification Group Services and System Aspects; Procedures for the 5G System; Stage 2 (Release 15).

Ericsson: "Handling of Ethernet and unstructured PDU session types when interworking with EPC (23.502)", SA WG2 Meeting #123, S2-177739, Oct. 23-27, 2017, Ljubljana, Slovenia.

Ericsson: "Handling of Ethernet and unstructured PDU session types when interworking with EPC (23.501)", SA WG2 Meeting #123, S2-177673, Oct. 23-27, 2017, Ljubljana, Slovenia.

Qualcomm Incorporated: "TS 23.501: Support for Ethernet and unstructured PDU session types in EPC", SA WG2 Meeting #123, S2-177204, Oct. 23-27, 2017, Ljubljana, Slovenia.

ERICSSON: "Handling of Ethernet and unstructured PDU session types when interworking with EPC (23.502)", 3GPP Draft; S2-177672 3rd Generation Partnership Project (3GPP) Mobile Competence Centre; 650, Route des Lucioles; F-06921 Sophia-Antipolis Cedex, France; SA WG2 Meeting #123, Ljubljana, Slovenia, Oct. 30, 2017, XP051360325 (9 pages).

ERICSSON: "Handling of Ethernet and unstructured PDU session types when interworking with EPC (23.501)", 3GPP Draft; S2-177673 3rd Generation Partnership Project (3GPP) Mobile Competence Centre; 650, Route des Lucioles; F-06921 Sophia-Antipolis Cedex, France; SA WG2 Meeting #123, Ljubljana, Slovenia, Oct. 26, 2017, XP051346381 (6 pages).

Extended European Search Report dated Jul. 22, 2021 of the European Patent Office in foreign related application EP18878113.2 (6 pages).

Office action dated Mar. 24, 2022, of the Indian Patent Office in the related foreign application IN 202017024619 (5 pages).

* cited by examiner

COMMUNICATION CONTROL METHOD FOR A USER EQUIPMENT THAT CONFIGURES A PROTOCOL DATA UNIT SESSION TO CORRESPOND TO A NON-IP PACKET DATA NETWORK CONNECTION

TECHNICAL FIELD

The present invention relates to a User Equipment (UE) and a communication control method for the UE. This application claims priority based on JP 2017-222796 filed on Nov. 20, 2017 in Japan, the contents of which are incorporated herein in its entirety by reference.

BACKGROUND ART

The 3rd Generation Partnership Project (3GPP) has standardized the system architecture of the Evolved Packet System (EPS), which is a fourth-generation (4G) mobile communication system. Note that a core network constituting the EPS is called an Evolved Packet Core (EPC).

In addition, the 3GPP has started technical studies of the system architecture of 5G system (5GS) which is the next generation, namely, the fifth-generation (5G) mobile communication system (5G System), and interworking between the 5GS and the EPS, which is one of many topics, has been discussed (see NPL 1 and NPL 2).

CITATION LIST

Non Patent Literature

NPL 1: 3GPP TS 23.501 v1.5.0 (November 2017); Technical Specification Group Services and System Aspects; System Architecture for the 5G system; Stage 2 (Release 15)
NPL 2: 3GPP TS 23.502 v1.3.0; (November 2017); Technical Specification Group Services and System Aspects; Procedures for the 5G system; Stage 2 (Release 15)

SUMMARY OF INVENTION

Technical Problem

In the discussion of interworking between the 5GS and the EPS, how to hand over a Packet Data Unit or Protocol Data Unit (PDU) session established in the 5GS to the EPS and how to hand over a Packet Data Network (PDN) connection established in the EPS to the 5GS have been discussed.

Note that, while, as a PDN type for indicating the type of a PDN connection established in the EPS, IPv4, IPv6 IPv4v6, and non-IP are supported, as a PDU session type for indicating the type of a PDU session established in the 5GS, IPv4, IPv6, Ethernet, and Unstructured are supported.

However, there is a problem in that, in a case that a PDU session established in the 5GS, which is a PDU session whose PDU session type is Ethernet or Unstructured, is handed over to the EPS, there is no corresponding PDN type in the EPS, and thus a handover is not possible without change.

There is also a problem in that, in a case that a PDN connection established in the EPS, which is a PDN connections with a PDN type of non-IP, is handed over to the 5GS, there is no corresponding PDU session type in the 5GS, and thus a handover is not possible without change.

In addition, there is no specification or clarification on a unit in which a PDU session is switched in a case that a handover is performed from the 5GS to the EPS, and a unit in which a PDN connection is switched in a case that a handover is performed from the EPS to the 5GS, which is a problem.

In addition, there is no specification or clarification on behaviors of a User Equipment (UE) in an idle state in a case that a connection to the EPS is unsuccessful after handover from the 5GS to the EPS and behaviors of UE in a case that a connection to the 5GS is unsuccessful after handover from the EPS to the 5GS, which is a problem.

In light of the foregoing, an objective of the present invention is to provide a technique for smoothly performing handover between the 5GS and the EPS.

Solution to Problem

A User Equipment (UE) according to an aspect of the present invention is a UE including a controller, wherein the controller establishes, in an Evolved Packet System (EPS), a Packet Data Network (PDN) connection of which PDN type is non-IP, and configures a PDU session type to Ethernet or Unstructured at a time of a handover from the EPS to a 5G System (5GS), and the PDU session type is configured to a PDU session corresponding to the PDN connection.

A communication control method for a User Equipment (UE) according to an aspect of the present invention includes establishing, in an Evolved Packet System (EPS), a Packet Data Network (PDN) connection of which PDN type is non-IP, and configuring a PDU session type to Ethernet or Unstructured at a time of a handover from the EPS to a 5G System (5GS), wherein the PDU session type is configured to a PDU session corresponding to the PDN connection.

Advantageous Effects of Invention

According to the present invention, a handover between the 5GS and the EPS can be performed smoothly. In addition, according to the present invention, in a case that a PDU session established in the 5GS is moved to the EPS (handover) and then again moved to the 5GS (handover), it is possible to return to the original state of the PDU session. In addition, according to the present invention, in a case that a PDN connection established in the EPS is moved to the 5GS (handover) and then again moved to the EPS (handover), it is possible to return to the original state of the PDN connection. In addition, according to the present invention, the mobility of the UE between the 5GS and the EPS in an idle mode can be made smoothly.

DESCRIPTION OF EMBODIMENTS

Preferred embodiments for carrying out the present invention will be described below with reference to the drawings.

1. Overview of System

Figure 1:
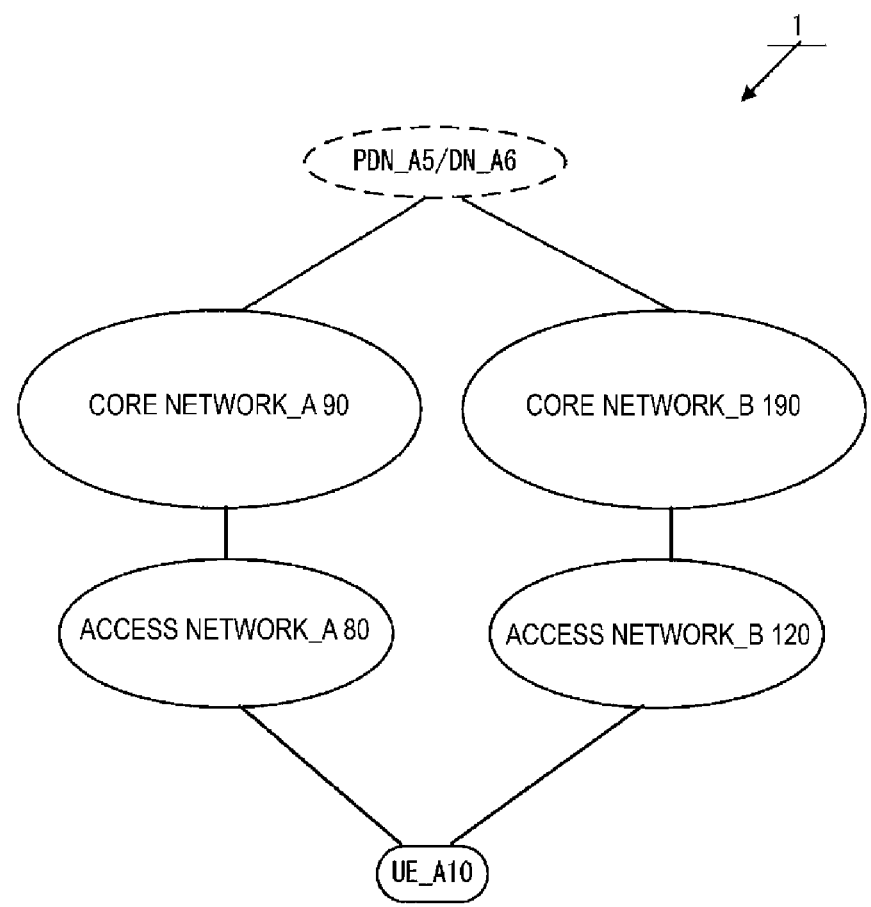
FIG. 1 is a diagram illustrating an overview of a mobile communication system (EPS/5GS).
Figure 2:
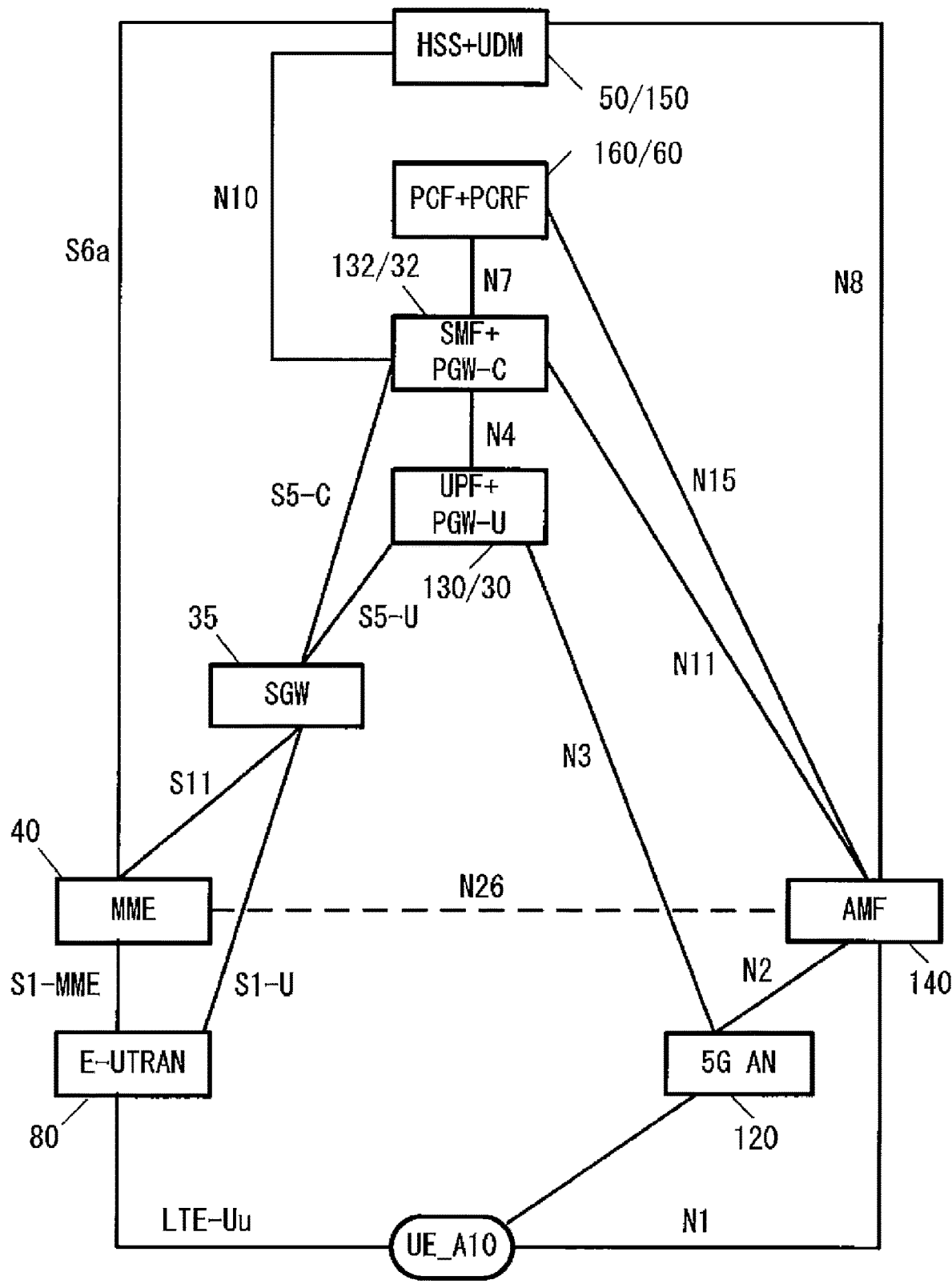
FIG. 2 is a diagram illustrating a detailed configuration of a mobile communication system (EPS/5GS).

First, FIG. 1 is a diagram for describing an overview of a mobile communication system 1 used in each embodiment, and FIG. 2 is a diagram for describing a detailed configuration of the mobile communication system 1.

In FIG. 1, the mobile communication system 1 includes a user equipment (UE)_A 10, an access network_A 80, a core network_A 90, a Packet Data Network (PDN)_A 5, an access network_B 120, a core network_B 190, and a Data Network (DN)_A 6.

In the following, these apparatuses and functions may be described by omitting reference symbols, like UE, access network_A, core network_A, PDN, access network_B, core network_B, DN, and the like.

Also in FIG. 2, apparatuses and functions of the UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and the like, and interfaces that connect these apparatuses and functions to one another are shown.

In the following, these apparatuses and functions may be described by omitting reference symbols, like UE, E-UTRAN, MME, SGW, PGW-U, PGW-C, PCRF, HSS, 5G AN, AMF, UPF, SMF, PCF, UDM, and the like.

Note that, although an EPS that is a 4G system EPS is configured to include the access network_A and the core network_A, UE and/or PDN may be further included. In addition, although a 5GS that is a 5G system is configured to include UE, the access network_B, and the core network_B, a DN may also be included.

The UE is an apparatus that can connect to a network service via 3GPP access (also referred to as a 3GPP access network or a 3GPP AN) and/or non-3GPP access (also referred to as a non-3GPP access network or a non-3GPP AN). The UE may be a terminal apparatus, such as a mobile phone, a smart phone, or the like, that can perform wireless communication, and may be a terminal apparatus that can connect to the EPS and the 5GS. The UE may include a Universal Integrated Circuit Card (UICC) and an Embedded UICC (eUICC). Note that the UE may be expressed as a user apparatus or may be expressed as a terminal apparatus.

In addition, the access network_A corresponds to an Evolved Universal Terrestrial Radio Access Network (E-UTRAN) and/or a wireless LAN access network. One or more evolved Node Bs (eNBs) 45 are deployed in the E-UTRAN. Note that an eNB 45 may be described as eNB with the reference symbol omitted. Further, in a case that there are multiple eNBs, the eNBs are connected to each other by using, for example, an X2 interface. Also, one or more access points are deployed in the wireless LAN access network.

In addition, the access network_B corresponds to a 5G access network (5G AN). The 5G AN includes an NG Radio Access Network (NG-RAN) and/or a non-3GPP access network. One or more NR NodeBs (gNBs) 122 are deployed in the NG-RAN. Note that, hereinafter, gNBs 122 may be described by omitting the reference symbol, like eNB. The gNB is a node that provides a New Radio (NR) user plane and a control plane to the UE, which is a node that connects to a 5GC via an NG interface (including an N2 interface or an N3 interface). That is, the gNB is a newly designed base station apparatus for the 5GS, and has a different function from a base station apparatus (eNB) used in the EPS that is a 4G system. In addition, in a case that there are multiple gNBs, the gNBs are connected to each other by, for example, an Xn interface.

Additionally, hereinafter, an E-UTRAN and an NG-RAN may be referred to as 3GPP access. In addition, the wireless LAN access network and the non-3GPP AN may also be referred to as non-3GPP access. Further, the nodes deployed in the access network_B may be collectively referred to as NG-RAN nodes.

In addition, the access network_A and/or the access network_B and/or an apparatus included in the access network_A and/or an apparatus included in the access network_B may be referred to as an access network or an access network apparatus.

Further, the core network_A corresponds to an Evolved Packet Core (EPC). In the EPC, for example, a Mobile Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

Furthermore, the core network_B corresponds to a 5G Core Network (5GC). In the 5GC, for example, an Access and Mobility Management Function (AMF), a User Plane Function (UPF), a Session Management Function (SMF), a Policy Control Function (PCF), Unified Data Management (UDM), and the like are deployed.

Further, in the following, the core network_A and/or the core network_B, an apparatus included in the core network_A, and/or an apparatus included in the core network_B may be referred to as a core network or a core network apparatus.

The core network (the core network_A and/or the core network_B) may be an IP mobile communication network operated by a Mobile Network Operator (MNO) connecting an access network (the access network_A and/or the access network_B) to a PDN and/or a DN, may be a core network for a mobile communication operator that operates and manages the mobile communication system 1, or may be a core network for a virtual mobile communication operator or a virtual mobile communication service provider such as a Mobile Virtual Network Operator (MVNO) and a Mobile Virtual Network Enabler (MVNE).

In addition, although a case in which the PDN and the DN are the same is described in FIG. 1, the networks may be different. The PDN may be a Data Network (DN) to provide a communication service to the UE. Note that the DN may be configured as a packet data service network, or configured for each service. Furthermore, the PDN may include a connected communication terminal. Therefore, connecting to the PDN may be connecting to a communication terminal or a server apparatus deployed in the PDN. Furthermore, transmission and/or reception of user data to and/or from the PDN may be transmission and/or reception of user data to and/or from a communication terminal or a server apparatus deployed in the PDN. Note that the PDN may be represented by the DN, or the DN may be represented by the PDN.

Also below, at least part of the access network_A, the core network_A, the PDN, the access network_B, the core network_B, and the DN, and/or one or more apparatuses included therein may be referred to as a network or a network apparatus. Specifically, a network and/or a network apparatus that performs transmission and/or reception of a message and/or performs a procedure means at least part of the access network_A, the core network_A, the PDN, the access network_B, the core network_B, and the DN, and/or one or more apparatuses included therein that perform the transmission and/or reception of the message and/or perform the procedure.

Moreover, the UE can connect to the access network. In addition, the UE is capable of connecting to the core network via the access network. Furthermore, the UE is capable of connecting to the PDN or the DN via the access network and the core network. That is, the UE can transmit and/or receive (communicate) user data with the PDN or the DN. In a case that the user data is transmitted and/or received, not only Internet Protocol (IP) communication but also non-IP communication may be used.

Here, IP communication is data communication using IPs, in which data is transmitted and/or received using IP packets. An IP packet consists of an IP header and a payload. The payload part may include data transmitted and/or received by an apparatus and/or a function included in the EPS and an apparatus and/or a function included in the 5GS. In addition, non-IP communication is a data communication that does not use IPs, and the data is transmitted and/or received in a different format from the structure of IP packets. For example, non-IP communication may be data communication achieved through transmitting and/or receiving application data without an IP packet added, or user data to be transmitted and/or received by the UE with another header such as an MAC header or an Ethernet (trade name) frame header added may be transmitted and/or received.

2. Configuration of Each Apparatus

Next, a configuration of each apparatus used in each embodiment will be described with reference to the drawings. Note that each apparatus may be configured as physical hardware, may be configured as logical (virtual) hardware configured on general purpose hardware, or may be configured as software. Also, at least some of functions of each apparatus (including all) may be configured as physical hardware, logical hardware, and software.

Note that each of the storage units (a storage unit_A 340, a storage unit_A 440, a storage unit_B 540, a storage unit_A 640, and a storage unit_B 740) in each apparatus and function appearing below is configured by, for example, a semiconductor memory, a Solid State Drive (SSD), a Hard Disk Drive (HDD), and the like. Also, each storage unit can store information originally set from the shipping stage as well as various types of information transmitted and/or received between apparatuses and/or functions other than apparatuses and functions of the storage unit (e.g., UE and/or an access network apparatus and/or a core network apparatus, and/or the PDN and/or the DN). In addition, each storage unit can store identification information, control information, a flag, a parameter, and the like included in a control message which is transmitted and/or received in various communication procedures described below. Furthermore, each of the storage units may store the information for each UE. In addition, in a case that interworking between the 5GS and the EPS is performed, each of the storage units can store control messages and user data transmitted and/or received between apparatuses and functions included in the 5GS and/or the EPS. At this time, not only data transmitted and/or received via the N26 interface but also data transmitted and/or received without passing through the N26 interface can be stored.

2.1. Apparatus Configuration of UE

Figure 3:
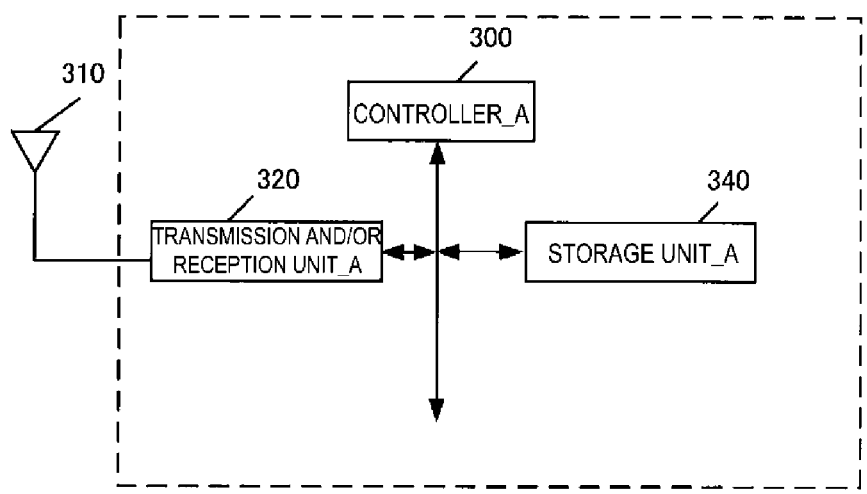
FIG. 3 is a diagram illustrating an apparatus configuration of UE.

First, an example of an apparatus configuration of the UE will be described using FIG. 3. The UE is constituted by a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 is connected to the antenna 310.

The controller_A 300 is a function unit to control overall operations and functions of the UE. The controller_A 300 implements various types of processing in the UE by reading out various programs stored in the storage unit_A 340 and performing the programs as necessary.

The transmission and/or reception unit_A 320 is a function unit for wirelessly communicating with a base station apparatus (eNB or gNB) within the access network via the antenna. That is, the UE can transmit and/or receive user data and/or control information between an access network apparatus and/or a core network apparatus and/or the PDN and/or the DN using the transmission and/or reception unit_A 320.

To describe in detail with reference to FIG. 2, the UE can communicate with the base station apparatus (eNB) in an E-UTRAN via an LTE-Uu interface using the transmission and/or reception unit_A 320. In addition, the UE can communicate with the base station apparatus (gNB) in a 5G AN using the transmission and/or reception unit_A 320. Furthermore, the UE can transmit and/or receive Non-Access-Stratum (NAS) messages with an AMF via an N1 interface using the transmission and/or reception unit_A 320. However, because the N1 interface is logical, communication between the UE and the AMF is actually performed via the 5G AN.

The storage unit_A 340 is a function unit for storing programs, user data, control information, and the like necessary for each operation of the UE.

2.2. Apparatus Configuration of eNB

Figure 4:
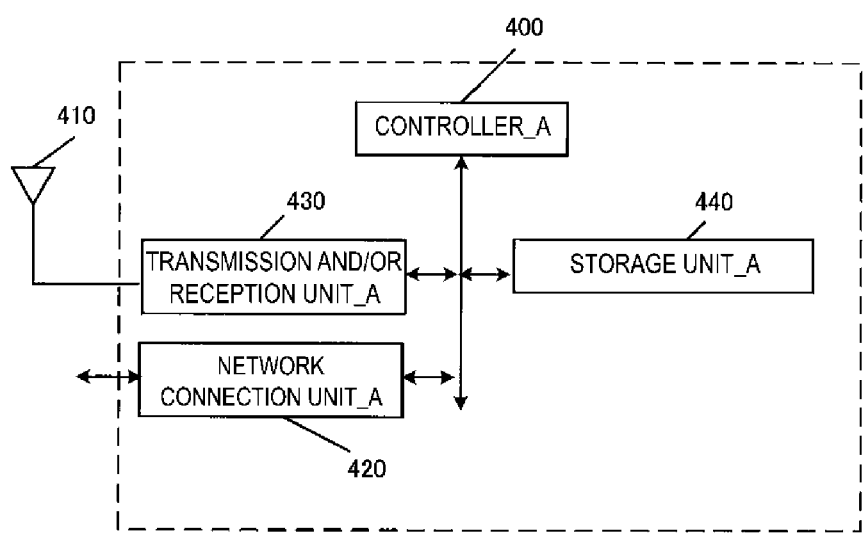
FIG. 4 is a diagram illustrating a configuration of an access network apparatus (eNB) in an EPS.

Next, an example of an apparatus configuration of the eNB will be described using FIG. 4. The eNB is constituted by a controller_A 400, an antenna 410, a network connection unit_A 420, a transmission and/or reception unit_A 430, and a storage unit_A 440. The controller_A 400, the network connection unit_A 420, the transmission and/or reception unit_A 430, and the storage unit_A 440 are connected via a bus. The transmission and/or reception unit_A 430 is connected to the antenna 410.

The controller_A 400 is a function unit for controlling overall operations and functions of the eNB. The controller_A 400 implements various types of processing in the eNB by reading out various programs stored in the storage unit_A 440 and performing the programs as necessary.

The network connection unit_A 420 is a function unit through which the eNB communicates with the MME and/or the SGW. That is, the eNB can transmit and/or receive user data and/or control information to and from the MME and/or the SGW using the network connection unit_A 420.

The transmission and/or reception unit_A 430 is a function unit for wirelessly communicating with the UE via the antenna 410. In other words, the eNB can transmit and/or receive user data and/or control information to and/or from the UE using the transmission and/or reception unit_A 430.

To describe in detail with reference to FIG. 2, the eNB included in the E-UTRAN can communicate with the MME via an S-MME interface and communicate with the SGW via an S1-U interface using the network connection unit_A 420. Additionally, the eNB can communicate with the UE via an LTE-Uu interface using the transmission and/or reception unit_A 430.

The storage unit_A 440 is a function unit for storing programs, user data, control information and the like necessary for each operation of the eNB.

2.3. Apparatus Configuration of gNB

Figure 5:
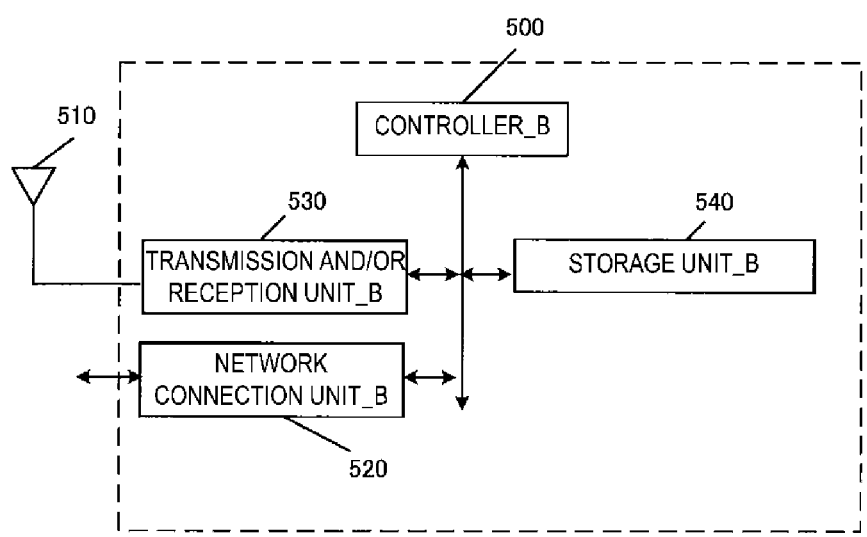
FIG. 5 is a diagram illustrating a configuration of an access network apparatus (gNB) in a 5GS.

Next, an example of an apparatus configuration of the gNB will be described using FIG. 5. The gNB is constituted by a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected to each other via a bus. The transmission and/or reception unit_B 530 is connected to the antenna 510.

The controller_B 500 is a function unit for controlling overall operations and functions of the gNB. The controller_B 500 implements various types of processing in the gNB by reading out various programs stored in the storage unit_B 540 and performing the programs as necessary.

The network connection unit_B 520 is a function unit for the gNB to communicate with an AMF and/or a UPF. Specifically, the gNB can transmit and/or receive user data and/or control information to and from the AMF and/or the UPF via the network connection unit_B 520.

The transmission and/or reception unit_B 530 is a function unit for wirelessly communicating with the UE via the antenna 510. In other words, the gNB can transmit and/or receive the user data and/or the control information to and from the UE via the transmission and/or reception unit_B 530.

To describe in detail with reference to FIG. 2, the gNB included in the 5G AN can communicate with the AMF via an N2 interface and communicate with the UPF via an N3 interface using the network connection unit_B 520. Additionally, the gNB can communicate with the UE using the transmission and/or reception unit_B 530.

The storage unit_B 540 is a function unit for storing programs, user data, control information, and the like necessary for each operation of the gNB.

2.4. Apparatus Configuration of MME

Figure 6:
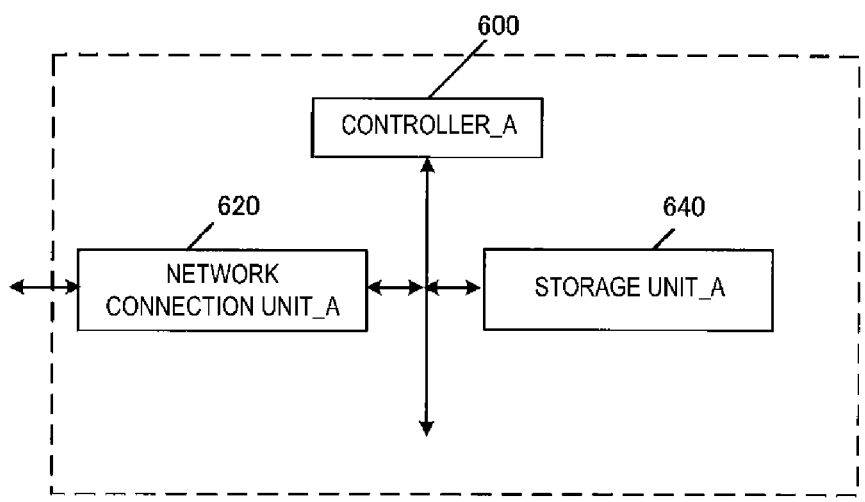
FIG. 6 is a diagram illustrating a configuration of a core network apparatus (MME/SGW/PGW) in the EPS.

Next, an example of an apparatus configuration of the MME will be described using FIG. 6. The MME is constituted by a controller_A 600, a network connection unit_A 620, and a storage unit_A 640. The controller_A 600, the network connection unit_A 620, and the storage unit_A 640 are connected to each other via a bus.

The controller_A 600 is a function unit for controlling overall operations and functions of the MME. The controller_A 600 implements various types of processing in the MME by reading out various programs stored in the storage unit_A 640 and performing the programs as necessary.

The network connection unit_A 620 is a function unit for the MME to connect to the base station apparatus (eNB) in the E-UTRAN and/or the HSS and/or the SGW and/or the AMF and/or an SCEF. That is, the MME can transmit and/or receive user data and/or control information to and from the base station apparatus (eNB) in the E-UTRAN and/or the HSS and/or the SGW and/or the AMF and/or the SCEF using the network connection unit_A 620.

To describe in detail with reference to FIG. 2, the MME in an EPC can communicate with the eNB via the S1-MME interface, can communicate with the HSS via an S6a interface, can communicate with the SGW via an S11 interface, and can communicate with the SCEF via a T6a interface using the network connection unit_A 620. Additionally, in a case that an N26 interface is supported, the MME can communicate with the AMF via the N26 interface using the network connection unit_A 620.

The storage unit_A 640 is a function unit for storing programs, user data, control information, and the like necessary for each operation of the MME.

The MME is a control apparatus or a function that performs location information management including mobility management of the UE, connection state management of the UE, and access control via the access network_A. The MME may include a function as a session management apparatus to manage a session established by the UE.

In addition, in the location information management including the mobility management of the UE, an EMM state is managed. The EMM state may be synchronized between the UE and the MME. The EMM state includes an EMM deregistered state (EMM-DEREGISTERED) and an EMM registered state (EMM-REGISTERED). In the EMM-DEREGISTERED state, the UE is not registered in the network, and thus the MME is not able to reach the UE because a UE context in the MME does not have valid location information and routing information for the UE. In addition, in the EMM-REGISTERED state, the UE is registered in the network, and thus the UE can receive services that requires registration in the network.

Further, in the connection state management of the UE, an EMM mode is managed. The EMM mode may be synchronized between the UE and the MME. The EMM mode includes an EMM non-connected mode (EMM-IDLE mode) and an EMM connected mode (EMM-CONNECTED mode). In the EMM-IDLE mode, although the UE is in the EMM-REGISTERED state, the UE does not have an NAS signaling connection established between the MME and the UE. In addition, in the EMM-IDLE mode, the UE does not have an LTE-Uu interface connection. On the other hand, in the EMM-CONNECTED mode, the UE has an NAS signaling connection established between the MME and the UE. In addition, in the EMM-CONNECTED mode, the UE may have an LTE-Uu interface connection.

Furthermore, in a case that multiple MMEs are included in the core network_A, the MMEs may be connected to each other. Thus, a UE context can be transmitted and/or received between the MMEs. In this way, the MME is a management apparatus to transmit and/or receive control information related to mobility management and session management to and/or from the UE and in other words, may be a control apparatus for a Control Plane (C-Plane; CP).

In addition, the MME may be a relay apparatus for transferring the user data as a gateway between the core network_A and the access network. Note that the user data transmitted and/or received by the MME serving as a gateway may be small data.

2.5. Apparatus Configuration of SGW

Next, an example of an apparatus configuration of the SGW will be described using FIG. 6. The SGW is constituted by a controller_A 600, a network connection unit_A 620, and a storage unit_A 640. The controller_A 600, the network connection unit_A 620, and the storage unit_A 640 are connected to each other via a bus.

The controller_A 600 is a function unit for controlling overall operations and functions of the SGW. The controller_A 600 implements various types of processing in the SGW by reading out various programs stored in the storage unit_A 640 and performing the programs as necessary.

The network connection unit_A 620 is a function unit for the SGW to connect to the base station apparatus (eNB) in the E-UTRAN and/or the MME and/or the PGW. That is, the SGW can transmit and/or receive user data and/or control information to and from the base station apparatus (eNB) in the E-UTRAN and/or the MME and/or the PGW using the network connection unit_A 620.

To describe in detail with reference to FIG. 2, the SGW in the EPC can communicate with the eNB via the S1-U interface, can communicate with the MME via the S11 interface, and can communicate with the PGW via the S5 interface using the network connection unit_A 620. Note that, in FIG. 2, a case in which the PGW is divided into a PGW-C and a PGW-U is described. In a case that the MME communicates with the PGW-U, the MME can communicate with the PGW-U via the S5-U interface, and in a case that the MME communicates with the PGW-C, the MME can communicate with the PGW-C via the S5-C interface.

The storage unit_A 640 is a function unit for storing programs, user data, control information, and the like necessary for each operation of the SGW.

The SGW is a relay apparatus for transferring the user data as a gateway of the core network_A and the access network of 3GPP (E-UTRAN).

2.6. Apparatus Configuration of PGW (PGW-U and PGW-U)

Next, an example of an apparatus configuration of the PGW (PGW-U30 and PGW-C32) will be described using FIG. 6. The PGW (PGW-U and PGW-C) includes a controller_A 600, a network connection unit_A 620, and a storage unit_A 640. The controller_A 600, the network connection unit_A 620, and the storage unit_A 640 are connected to each other via a bus.

The controller_A 600 is a function unit for controlling overall operations and functions of the PGW. The controller_A 600 implements various types of processing in the PGW by reading out various programs stored in the storage unit_A 640 and performing the programs as necessary.

The network connection unit_A 620 is a function unit for the PGW to be connected to the SGW and/or the HSS and/or a PCRF and/or a PDN. That is, the PGW can transmit and/or receive user data and/or control information to and from the SGW and/or the HSS and/or the PCRF and/or the PDN using the network connection unit_A 620.

To describe in detail with reference to FIG. 2, the PGW in the EPC can communicate with the SGW via the S5 interface using the network connection unit_A 620. In addition, the PGW can also communicate with the HSS, the PCRF, and the PDN using the network connection unit_A 620.

Note that, in FIG. 2, a case in which the PGW is divided into a PGW-C and a PGW-U is described. The PGW-C can communicate with the SGW via the S5-C interface. In addition, the PGW-C can communicate with the HSS and the PCRF. Further, the PGW-U can communicate with the SGW via the S5-C interface. The PGW-C and the PGW-U can communication with each other.

The storage unit_A 640 is a function unit for storing programs, user data, control information, and the like necessary for each operation of the PGW.

Note that the PGW-U and PGW-C may be formed by separating some of the functions of the PGW. For example, the PGW-U may be a node that handles a user plane (U-Plane) among the functions of the PGW. The PGW-C may be a node that handles a control plane (C-Plane) among the functions of the PGW. Additionally, the PGW-C may be a node having functions related to session control among the functions of the PGW. Additionally, the PGW-U and the PGW-C are only functionally separated and may be configured as one apparatus.

The PGW is a relay apparatus for transferring user data as a gateway of the PDN and the core network_A. Note that the PGW may serve as a gateway for IP communication and/or non-IP communication. Furthermore, the PGW may have a function to transfer IP communication, or may have a function to perform conversion between non-IP communication and IP communication. Note that such multiple gateways may be deployed in the core network_A. Furthermore, the multiple gateways deployed may serve as gateways for connecting the core network_A to a single PDN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Furthermore, the PGW may be configured integrally with a UPF and/or an SMF. The PGW configured integrally with the SMF may be referred to as a PGW-C, and the PGW configured integrally with the UPF may be referred to as a PGW-U. In addition, the expression "PGW" may be referred to as a PGW-C and/or a PGW-U.

2.7. Apparatus Configuration of AMF

Figure 7:
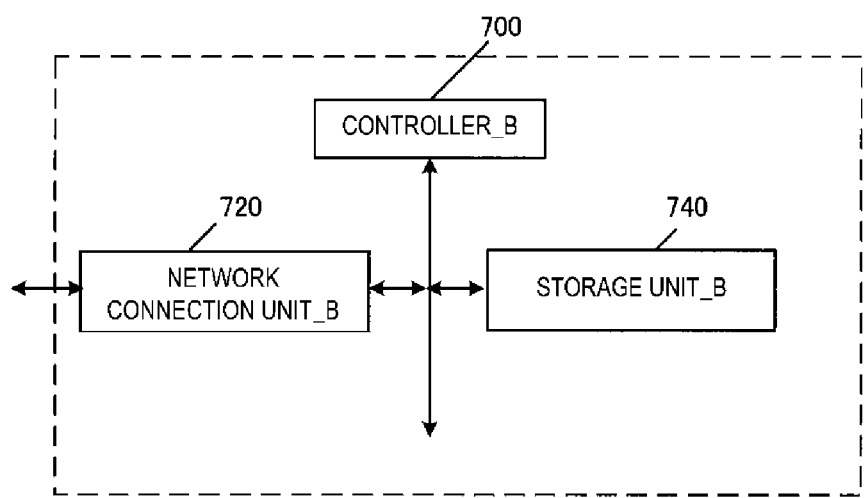
FIG. 7 is a diagram illustrating a configuration of a core network apparatus (AMF/SMF/UPF) in the 5GS.

Next, an example of an apparatus configuration of the AMF will be described using FIG. 7. The AMF includes a controller_B 700, a network connection unit_B 720, and a storage unit_B 740. The controller_B 700, the network connection unit_B 720, and the storage unit_B 740 are connected to each other via a bus.

The controller_B 700 is a function unit for controlling overall operations and functions of the AMF. The controller_B 700 implements various types of processing in the AMF by reading out various programs stored in the storage unit_B 740 and performing the programs as necessary.

The network connection unit_B 720 is a function unit for the AMF to connect to the base station apparatus (gNB) and/or the SMF and/or the PCF and/or the UDM and/or the SCEF in the 5G AN. That is, the AMF can transmit and/or receive user data and/or control information to and from the base station apparatus (gNB) and/or the SMF and/or the PCF and/or the UDM and/or the SCEF in the 5G AN using the network connection unit_B 720.

To describe in detail with reference to FIG. 2, the AMF in the 5GC can communicate with the gNB via the N2 interface, can communicate with the UDM via the N8 interface, can communicate with the SMF via the N11 interface, and can communicate with the PCF via the N15 interface using the network connection unit_A 620. Additionally, the AMF can transmit and/or receive an NAS messages to and from the UE via the N1 interface using the network connection unit_A 620. However, because the N1 interface is logical, communication between the UE and the AMF is actually performed via the 5G AN. Additionally, in a case that the N26 interface is supported, the AMF can communicate with the MME via the N26 interface using the network connection unit_A 620.

The storage unit_B 740 is a function unit for storing programs, user data, control information and the like necessary for each operation by the AMF.

Note that, the AMF has a function of exchanging a control message with an RAN using the N2 interface, a function of exchanging an NAS message with the UE using the N1 interface, a function of performing encryption and integrity protection of an NAS message, a Registration management (RM) function, a Connection management (CM) function, a Reachability management function, a function of mobility management of the UE or the like, a function of transferring a Session Management (SM) message between the UE and the SMF, an Access Authentication or Access Authorization function, a Security Anchor Functionality (SEA), a Security Context Management (SCM) function, a function of supporting the N2 interface for the Non-3GPP Interworking Function (N3IWF), a function of supporting transmission and/or reception of an NAS signal to and/or from the UE via the N3IWF, a function of authenticating the UE connected via the N3IWF, and the like.

In addition, in registration management, the RM state for each UE is managed. The RM state may be synchronized between the UE and the AMF. Additionally, the RM state includes a deregistered state (RM-DEREGISTERED state) and a registered state (RM-REGISTERED state). In the RM-DEREGISTERED state, the UE is not registered in the network, and thus the AMF is not able to reach the UE because a UE context in the AMF does not have valid location information and routing information for the UE. In the RM-REGISTERED state, the UE is registered in the network, and thus the UE can receive services that requires registration with the network. Note that the RM state may be expressed as a 5GMM state. In this case, the RM-DEREGISTERED state may be expressed as a 5GMM-DEREGISTERED state, and the RM-REGISTERED state may be expressed as a 5GMM-REGISTERED state.

In addition, in connection management, a CM state for each UE is managed. The CM state may be synchronized between the UE and the AMF. Additionally, the CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. Also, in the CM-IDLE state, the UE has neither an N2 interface connection (N2 connection) nor an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

In addition, in the connection management, a CM state in 3GPP access and a CM state in non-3GPP access are separately managed. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access includes a non-connected state in non-3GPP access (CM-IDLE state over non-3GPP access) and a connected state in non-3GPP access (CM-CONNECTED state over non-3GPP access).

Note that the CM state may be expressed as a 5GMM mode. In this case, the non-connected state may be expressed as a 5GMM non-connected mode (5GMM-IDLE mode) and the connected state may be expressed as a 5GMM connected mode (5GMM-CONNECTED mode). Further, then non-connected state in 3GPP access may be expressed as a 5GMM non-connected mode in 3GPP access (5GMM-IDLE mode over 3GPP access) and the connected state in 3GPP access may be expressed as a 5GMM connected mode in 3GPP access (5GMM-CONNECTED mode over 3GPP access). Further, a non-connected state in non-3GPP access may be expressed as a 5GMM non-connected mode in non-3GPP access (5GMM-IDLE mode over non-3GPP access) and a connected state in non-3GPP access may be expressed as 5GMM connected mode in non-3GPP access (5GMM-CONNECTED mode over non-3GPP access).

In addition, one or more AMFs may be deployed within the core network_B. In addition, the AMF may be an NF that manages one or more Network Slice Instances (NSI). In addition, the AMF may also be a Common Control Plane Network Function (Common CPNF, or CCNF) shared among multiple NSIs.

Note that the N3IWF is an apparatus and/or a function deployed between non-3GPP access and 5GC in a case that the UE connects to the 5GS via non-3GPP access.

2.8. Apparatus Configuration of SMF

Next, an example of an apparatus configuration of the SMF will be described using FIG. 7. The SMF includes a controller_B 700, a network connection unit_B 720, and a storage unit_B 740. The controller_B 700, the network connection unit_B 720, and the storage unit_B 740 are connected to each other via a bus.

The controller_B 700 is a function unit for controlling overall operations and functions of the SMF. The controller_B 700 implements various types of processing in the SMF by reading out various programs stored in the storage unit_B 740 and performing the programs as necessary.

The network connection unit_B 720 is a function unit for the SMF to connect to the AMF, and/or the UPF, and/or the PCF, and/or the UDM. In other words, the SMF can transmit and/or receive user data and/or control information to and from the AMF, and/or the UPF, and/or the PCF, and/or the UDM using the network connection unit_B 720.

To describe in detail with reference to FIG. 2, the SMF in the 5GC can communicate with the AMF via the N11 interface, can communicate with the UPF via the N4 interface, can communicate with the PCF via the N7 interface, and can communicate with the UDM via the N10 interface using the network connection unit_A 620.

The storage unit_B 740 is a function unit for storing programs, user data, control information and the like necessary for each operation of the SMF.

The SMF has a session management function of establishing, modifying, releasing PDU sessions, or the like, a function of IP address allocation and management for the UE, a function of selecting and controlling the UPF, a function of configuring the UPF for routing traffic to an appropriate destination (transmission destination), a function of transmitting and/or receiving an SM portion of an NAS message, a function of reporting arrival of downlink data (Downlink Data Notification), a function of providing SM information unique to the AN (for each AN) to be transmitted to the AN via the AMF and the N2 interface, a function of determining a Session and Service Continuity (SSC) mode for a session, a roaming function, and the like.

2.9. Apparatus Configuration of UPF

Next, an example of an apparatus configuration of the UPF will be described using FIG. 7. The UPF includes a controller_B 700, a network connection unit_B 720, and a storage unit_B 740. The controller_B 700, the network connection unit_B 720, and the storage unit_B 740 are connected to each other via a bus.

The controller_B 700 is a function unit for controlling overall operations and functions of the UPF. The controller_B 700 implements various types of processing in the UPF by reading out various programs stored in the storage unit_B 740 and performing the programs as necessary.

The network connection unit_B 720 is a function unit for the UPF to connect to the base station apparatus (gNB) in the 5G AN, and/or the SMF and/or the DN. That is, the UPF can transmit and/or receive user data and/or control information to and from the base station apparatus (gNB) in the 5G AN and/or the SMF and/or the DN using the network connection unit_B 720.

To describe in detail with reference to FIG. 2, the UPF in the 5GC can communicate with the gNB via the N3 interface, can communicate with the SMF via the N4 interface, can communicate with the DN via the N6 interface, and can communicate with another UPF via an N9 interface using the network connection unit_A 620.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point for mutual connection to the DN (i.e., a function of transferring user data as a gateway between the DN and the core network_B), a packet routing & forwarding function, an uplink classifier (UL CL) function to support routing of multiple traffic flows for one DN, a branching point function to support a multi-homed PDU session, a QoS processing function for a user plane, an uplink traffic verification function, buffering of downlink packets, a function of triggering Downlink Data Notification, and the like.

Note that the UPF may serve as a gateway for IP communication and/or non-IP communication. Furthermore, the UPF may have a function of transferring IP communication or a function of performing conversion between non-IP communication and IP communication. Moreover, multiple gateways deployed may serve as gateways for connecting the core network_B to a single DN. Note that the UPF may have connectivity to another NF or may be connected to each apparatus via another NF.

2.10. Description of Other Apparatuses and/or Functions

Next, other apparatuses and/or functions will now be described.

The PCF has a function of providing policy rules.

Additionally, the UDM has an authentication information processing (Authentication credential processing) function, a user identification processing function, an access authentication function, a registration/mobility management function, a subscription information management (subscription management) function, and the like.

In addition, the PCRF is connected to the PGW and/or the PDN and has a function of performing QoS management for data delivery. For example, the PCRF manages QoS of a communication path between the UE_A 10 and the PDN. Furthermore, the PCRF may be an apparatus to create and/or manage a Policy and Charging Control (PCC) rule and/or a routing rule used by each apparatus for transmitting and/or receiving user data.

In addition, the HSS is connected to the MME and/or the SCEF, and has a function of managing subscription information, and the like. The subscription information of the HSS is referred to during access control of the MME, for example. Moreover, the HSS may be connected to a location management apparatus different from the MME.

In addition, the SCEF is connected to the DN and/or the PDN, the MME and the HSS, and serves as a relay apparatus that transfers user data as a gateway for connecting the DN and/or the PDN to the core network_A. Note that the SCEF may serve as a gateway for non-IP communication. Furthermore, the SCEF may have a function to perform conversion between non-IP communication and IP communication. In addition, multiple such gateways may be deployed in the core network_A. The SCEF may be configured outside or inside the core network.

3. Description of Terminology and Identification Information Used in Each Embodiment Next, technical terminology used in at least one of the embodiments and identification information used in procedures will now be described in advance.

First, an 11th state is a registration state in an EPC (EMM-REGISTERED). The 11th state may be a state of each apparatus in which EMM context is established or a state in which a default EPS bearer context is established. Note that in a case that each apparatus is in the 11th state, the UE_A 10 may initiate transmission and/or reception of user data or control messages, or may respond to paging. Furthermore, in a case that each apparatus is in the 11th state, the UE_A 10 may perform a tracking area update procedure.

In addition, a 12th state is a registration state in the EPC and a state in which a normal service is provided (EMM-REGISTERED.NORMAL-SERVICE). The 12th state may be one of the states constituting the 11th state or may be a substate of the 11th state. Further, the 12th state may be a substate first selected in a case that each apparatus transitions to the 11th state. Note that the normal service may be an EPS service.

In addition, a 13th state is a registration state in the EPC and a state in which there is no available cell (EMM-REGISTERED. NO-CELL-AVAILABLE). The 13th state may be one of the states constituting the 11th state or may be a substate of the 11th state. Further, the 13th state may be a state to which the UE_A 10 transitions in a case that there is no coverage of the E-UTRAN (not capable of communicating with the E-UTRAN). Further, the 13th state may be a state in which the UE_A 10 is not able to transmit an EMM message except in a case that the UE_A 10 reselects a cell and or a PLMN.

In addition, a 14th state is a non-registered state in the EPC (EMM-DEREGISTERED). The 14th state may be a state in which each apparatus has not established an EMM context, a state in which position information of the UE_A 10 is not known to the network, or a state in which the network is unreachable to the UE_A 10. Note that, in a case that each apparatus is in the 14th state, the UE_A 10 may initiate the attach procedure, and may establish the EMM context by performing the attach procedure.

In addition, a 15th state is a state in which tracking area update in the EPC is initiated (EMM-TRACKING-AREA-UPDATING-INITIATED). The 15th state may be a state to which each apparatus transitions after the tracking area update procedure is initiated. Furthermore, the 15th state may be a state in which the UE_A 10 is awaiting for a response message from the network to a tracking area update request message.

In addition, a 21st state is a registration state in the 5GC (5GMM-REGISTERED). The 21st state may be a state in which each apparatus has established a 5GMM context, or a state in which a PDU session context has been established. Note that, in a case that each apparatus is in the 21st state, the UE_A 10 may initiate transmission and/or reception of user data or control messages, or may respond to paging. Furthermore, in the case in which each apparatus is in the 21st state, the UE_A 10 may perform a registration procedure other than a registration procedure for initial registration and/or a service request procedure.

First, an 22nd state is a registration state in the 5GC and a state in which a normal service is provided (5GMM-REGISTERED. NORMAL-SERVICE). The 22nd state may be one of states constituting the 21st state or a substate of the 21st state. Further, the 22nd state may be the first selected substate in a case that each apparatus transitions to the 21st state. Further, the 22nd state may be a state to which each apparatus transitions in a case that a cell selected by the UE_A 10 is an allowed area. Note that the normal service may be a 5GS service. In addition, the UE is allowed to initiate communication with a network allowed by subscription information in an allowed area in a certain RAT.

In addition, a 23rd state is a registration state in the 5GC and a state in which there is no available cell (5GMM-REGISTERED. NO-CELL-AVAILABLE). The 23rd state may be one of states constituting the 21st state or a substate of the 21st state. Further, the 23rd state may be a state to which the UE_A 10 transitions without the coverage of an NG-RAN. Further, the 23rd state may be a state in which the UE_A 10 is not able to transmit a 5GMM message except in a case that the UE_A 10 reselects a cell and or a PLMN.

In addition, a 24th state is a non-registered state in the 5GC (5GMM-DEREGISTERED). The 24th state may be a state in which each apparatus has not established a 5GMM context, a state in which position information of the UE_A 10 is not known to the network, or a state in which the network is unreachable to the UE_A 10. Note that, in a case that each apparatus is in the 24th state, the UE_A 10 may initiate the registration procedure, and may establish the 5GMM context by performing the registration procedure.

In addition, a 25th state is a state in which the registration procedure in the 5GC is initiated (5GMM-REGISTERED-INITIATED). The 25th state may be a state to which each apparatus transitions after a registration procedure or a service request procedure is initiated. Furthermore, the 25th state may be a state in which the UE_A 10 is awaiting for a response message from the network to a registration request message or a service request message. The service request procedure is used by the UE in a CM-IDLE state UE to request establishment of a secure connection to the AMF. The service request procedure is used to activate the User Plane connection to an established PDU session.

In addition, a 31st state is a state in which the 12th state and the 23rd state are combined. A state of each apparatus being the 31st state may mean that each apparatus is in the 12th state and the 23rd state. Furthermore, the 31st state may be a state in which the 11th state and the 21st state are combined, a state in which the 11th state and the 23rd state are combined, or a state in which the 12th state and the 21st state are combined. Further, the 31st state may be a state in which an S1 mode has been selected in a case that the UE_A 10 is single registration mode. Note that the 31st state is not limited to those states.

In addition, a 32nd state is a state in which the 12th state and the 24th state are combined. A state of each apparatus being the 32nd state may mean that each apparatus is in the 12th state and the 24th state. Furthermore, the 32nd state may be a state in which the 11th state and the 24th state are combined. Note that the 32nd state is not limited to those states.

In addition, the 33rd state is a state in which the 14th state and the 22nd state are combined. A state of each apparatus being in the 33rd state may mean that each apparatus is in the 14th state and the 22nd state. Furthermore, the 33rd state may be a state in which the 14th state and the 21st state are combined. Note that the 33rd state is not limited to those states.

In addition, a 34th state is a state in which the 15th state and the 23rd state are combined. A state of each apparatus being the 34th state may mean that each apparatus is in the 15th state and the 23rd state. Furthermore, the 34th state may be a state in which the 15th state and the 21st state are combined. Note that the 34th state is not limited to those states.

In addition, a 41st state is a state in which the 22nd state and the 13th state are combined. A state of each apparatus being the 41st state may mean that each apparatus is in the 22nd state and the 13th state. Furthermore, the 41st state may be a state in which the 21st state and the 11th state are combined, a state in which the 21st state and the 13th state are combined, or a state in which the 22nd state and the 11th state are combined. Further, the 41st state may be a state in which an N1 mode has been selected in a case that the UE_A 10 is the single registration mode. Note that the 41st state is not limited to those states.

In addition, a 42nd state is a state in which the 22nd state and the 14th state are combined. A state of each apparatus being the 42nd state may mean that each apparatus is in the 22nd state and the 14th state. Furthermore, the 42nd state may be a state in which the 21st state and the 14th state are combined. Note that the 42nd state is not limited to those states.

In addition, a 43rd state is a state in which the 24th state and the 12th state are combined. A state of each apparatus being the 43rd state may mean that each apparatus is in the 24th state and the 12th state. Furthermore, the 43rd state may be a state in which the 24th state and the 11th state are combined. Note that the 43rd state is not limited to those states.

In addition, a 44th state is a state in which the 25th state and the 13th state are combined. A state of each apparatus being the 44th state may mean that each apparatus is in the 25th state and the 13th state. Furthermore, the 44th state may be a state in which the 25th state and the 11th state are combined. Note that the 44th state is not limited to those states.

In addition, a Session and Service Continuity (SSC) mode indicates a mode of Session and Service Continuity supported by a system and/or each apparatus in the 5G system (5GS). To be more specific, the SSC mode may be a mode indicating a type of the session and service continuity supported by a PDU session established between the UE_A 10 and the UPF. Note that the SSC mode may be a mode indicating a type of the session and service continuity configured for each PDU session. Furthermore, the SSC mode may include three modes of SSC mode 1, SSC mode 2, and SSC mode 3. Note that the SSC mode associated with a PDU session may not be changed while the PDU session continues.

In addition, the SSC mode 1 is a mode in which the network maintains connectivity services provided to the UE_A 10. Note that, in a case that a PDU session type associated with a PDU session is IPv4 or IPv6, the IP address may be maintained while the session service continues.

Furthermore, the SSC mode 1 is a mode of the session and service continuity in which the same UPF is continuously maintained regardless of an access technology to be used by the UE_A 10 to connect to the network. To be more specific, the SSC mode 1 may be a mode in which, even in a case that mobility of the UE_A 10 occurs, the session and service continuity is achieved without changing the UPF used by an established PDU session as a PDU session anchor.

In addition, the SSC mode 2 is also a mode in which a connectivity service provided to the UE_A 10 and a corresponding PDU session are released by the network. Note that, in a case that a PDU session type associated with a PDU session is IPv4 or IPv6, the IP address allocated to the UE_A 10 may be released while the session service continues.

Note that the SSC mode 2 may be a mode of the session and service continuity in which the same UPF is continuously maintained only in a serving area of the UPF. To be more specific, the SSC mode 2 may be a mode in which, as long as the UE_A 10 is in the serving area of the UPF, the session and service continuity is achieved without changing the UPF used by an established PDU session. Furthermore, the SSC mode 2 may be a mode in which, in a case that the mobility of the UE_A 10 to leave the serving area of the UPF occurs, the session and service continuity is achieved by changing the UPF used by the established PDU session.

Here, the serving area of the UPF may be an area in which one UPF can provide a session and service continuity function, or a subset of access networks such as the RAT or the cell used by the UE_A 10 to connect to a network. Furthermore, a subset of access networks may be networks constituted by one or multiple RATs and/or cells.

Additionally, the SSC mode 3 is a mode in which a change in the user plane is evident for the UE_A 10 while the network ensures that the connectivity will not be lost. Note that, for the SSC mode 3, a connection through a new PDU session anchor point may be established before the previous connection is disconnected to achieve a better connectivity service. Further, in a case that a PDU session type associated with a PDU session is IPv4 or IPv6, the IP address may not be maintained in the session and service continuity for transfer of the PDU session anchor.

Furthermore, the SSC mode 3 is a mode of the session and service continuity that allows a new PDU session and/or communication path to be established via a new UPF to the same DN before the PDU session and/or a communication path established between the UE_A 10 and the UPF is disconnected. Furthermore, the SSC mode 3 may be a mode of the session and service continuity that allows the UE_A 10 to be multi-homed. Furthermore, the SSC mode 3 may be a mode in which the session and service continuity using multiple PDU sessions and/or the UPF associated with multiple PDU sessions is allowed. In other words, in the case of the SSC mode 3, each apparatus may achieve the session and service continuity using multiple PDU sessions, or may achieve the session and service continuity using multiple UPFs.

Here, in the case in which each apparatus establishes a new PDU session and/or communication path, a new UPF may be selected by the network, and the new UPF may be an optimal UPF for a place at which the UE_A 10 connects to the network. Furthermore, in a case that multiple PDU sessions and/or UPFs used by the PDU sessions are effective, the UE_A 10 may associate communication for an application and/or flow with a newly established PDU session immediately or based on completion of communication.

In addition, a default SSC mode is an SSC mode used by the UE_A 10 and/or the network in a case that a specific SSC mode is not determined. Specifically, the default SSC mode may be an SSC mode used by the UE_A 10 in a case that there is no SSC mode requested from the application, and/or a case in which there is no policy of the UE_A 10 for determining an SSC mode for the application. In addition, the default SSC mode may be an SSC mode used by the network in the case in which there is no SSC mode requested from the UE_A 10.

Note that the default SSC mode may be configured for each PDN_A 5, or for each UE_A 10 and/or subscriber, based on subscription information and/or an operator policy and/or the policy of the UE_A 10. Furthermore, the default SSC mode may be information indicating the SSC mode 1, the SSC mode 2, or the SSC mode 3.

In addition, an EPS service may be a service provided by a PS domain, or may be a connection service provided using an EPC.

Furthermore, a non-EPS service may be a service provided by a CS domain, or may be a service other than an EPS service.

In addition, a 5GS service may be a connection service provided using the core network_B 190. Furthermore, the 5GS service may be a service different from the EPS service, or a similar service to the EPS service.

In addition, a non-5GS service may be a service other than the 5GS service, or may include an EPS service and/or a non-EPS service.

In addition, a single registration mode is a mode in which the UE_A 10 maintains a common registration state for 5GMM and EMM states in a case that the N1 and the S1 modes are available.

In addition, a dual registration mode is a mode in which the UE_A 10 maintains a registration state independently of the 5GMM and EMM states in a case that the N1 and S1 modes are available. Note that, in the case of the dual registration mode, the UE_A 10 may be registered in the network only in the N1 mode (i.e., registered only in 5GC), may be registered in the network only in the S1 mode (registered only in the EPC), or may be registered in the network in both the N1 mode and the S1 mode (registered in both the 5GC and the EPC).

In addition, the S1 mode is a mode in which the UE_A 10 is allowed to access the EPC via the E-UTRAN. In other words, the S1 mode may be a mode in which transmission and/or reception of a message using the S1 interface is performed. Note that the S1 interface may be configured with an S-MME interface and an S1-U interface.

In addition, the N1 mode is a mode in which the UE_A 10 is allowed to access the 5GC via a 5G access network. In other words, the N1 mode may be a mode in which transmission and/or reception of a message using the N1 interface is performed.

Additionally, in the EPS, the UE can transmit and/or receive user data to and from the PDN using a PDN connection by establishing the PDN connection via the access network_A and the core network_A.

In addition, although the PDN connection may be defined as association between the PDN and the UE, it may be connectivity established between the UE and an external gateway. The external gateway may be a PGW, a Service Capability Exposure Function (SCEF), or the like. The UE can transmit and/or receive user data to and/or from an apparatus located in the PDN such as an application server by using a PDN connection.

Note that, each apparatus (the UE, and/or an access network apparatus, and/or a core network apparatus) may be managed by associating one or more pieces of identification information with a PDN connection. Note that these pieces of identification information may include at least one of an Access Point Name (APN), a Traffic Flow Template (TFT), a PDN type, application identification information, or access network identification information, or may further include other information. Furthermore, in a case that multiple PDN connections are established, pieces of identification information associated with a PDN connection may be the same contents or may be different contents.

Note that, the APN may be identification information for identifying a core network and/or an external network such as a PDN. Furthermore, the APN can be used as information for selecting a gateway such as the PGW_A 30/UPF_A 235 for connecting the core network A_90.

In addition, the TFT indicates all packet filters associated with an EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. In addition, the TFT may associate the user data such as application data to be transmitted and/or received with an appropriate transfer path, and may be identification information for identifying the application data. In addition, the UE_A 10 may use a default bearer to transmit and/or receive the user data which cannot be identified by the TFT. In addition, the UE_A 10 may store in advance the TFT associated with the default bearer.

Additionally, the PDN type indicates the type of a PDN connection, and there are IPv4, IPv6, IPv4v6, and non-IP. In a case that IPv4 is specified, it indicates that IPv4 is used to transmit and/or receive data. In a case that IPv6 is specified, it indicates that IPv6 is used to transmit and/or receive data. In a case that IPv4v6 is specified, it indicates that IPv4 or IPv6 is used to transmit and/or receive data. In a case that non-IP is specified, it indicates that communication is performed using a communication method other than an IP, rather than communication using an IP.

In addition, the EPS bearer may be a logical communication path established between the UE and the PGW, or a communication path constituting a PDN connection. The EPS bearer includes a default bearer (also referred to as a default EPS bearer) and a dedicated bearer (also referred to as a dedicated EPS bearer).

In addition, the default bearer is an EPS bearer first established during a PDN connection, and only one bearer can be established during one PDN connection. The default bearer may be an EPS bearer that can be used for communication of user data not associated with a Traffic Flow Template (TFT).

In addition, the dedicated bearer is an EPS bearer established after the default bearer is established during a PDN connection, and at least one dedicated bearer can be established during one PDN connection. The dedicated bearer is an EPS bearer that can be used for communication of user data associated with the TFT.

Additionally, in the 5GS, the UE can transmit and/or receive user data to and from the DN using a PDU session by establishing the PDU session via the access network_B and the core network_B.

Although the PDU Session can be defined as association between the DN providing a PDU connectivity service and the UE, it may be connectivity established between the UE and an external gateway. The external gateway may be a UPF, an SCEF, etc. The UE can perform transmission and/or reception of user data to and/or from an apparatus deployed in the DN such as an application server using a PDU session.

Note that, each apparatus (the UE, and/or an access network apparatus, and/or a core network apparatus) may be managed by associating one or more pieces of identification information with a PDU session. Note that the identification information may include at least one of a DNN, a TFT, a PDU session type, application identification information, NSI identification information, access network identification information, or an SSC mode, or may further include other information. Furthermore, in a case that multiple PDU sessions are established, respective pieces of identification information associated with PDU sessions may be the same contents or may be different contents.

Note that, the DNN may be identification information for identifying a core network and/or an external network such as a DN. Furthermore, the DNN can also be used as information for selecting a gateway such as the PGW_A 30/the UPF_A 235 connecting the core network B 190.

In addition, a PDU session type indicates a type of a PDU session, and there are IPv4, IPv6, Ethernet, and Unstructured. In a case that IPv4 is specified, it indicates that IPv4 is used to transmit and/or receive data. In a case that IPv6 is specified, it indicates that IPv6 is used to transmit and/or receive data. In a case that Ethernet is specified, it indicates that an Ethernet frame is transmitted and/or received. Additionally, Ethernet may indicate that communication using IPs is not performed. In a case that Unstructured is specified, it indicates that a Point-to-Point (P2P) tunneling technique is used to transmit and/or receive data to and/or from an application server, etc. in the DN. The P2P tunneling technique may employ, for example, a UDP/IP encapsulation technique. Note that the PDU session type may include an IP in addition to the above. An IP can be specified in a case that the UE can use both IPv4 and IPv6.

In addition, the UE and/or a network can support a network slice (NW slice or NS) in the 5GS.

A network slice (NS) is a logical network that provides specific network performance and network capabilities.

Moreover, a network slice instance (NSI) is constituted by an instance (entity) of the network function (NF) and a set of required resources, and forms a deployed network slice. Here, the NF is a processing function in the network and is employed or defined by the 3GPP. The NSI is an entity of one or more NSs configured in the core network_B. In addition, the NSI may be constituted by a virtual Network Function (NF) generated using a Network Slice Template (NST). Here, the NST is associated with a resource request for providing a required communication service or capability, and is a logical expression of one or more NFs. That is, the NSI may be an aggregation constituted by multiple NFs in the core network_B 190. In addition, the NSI may be a logical network configured to classify user data delivered through a service or the like. An NS may include one or more NFs. An NF included in the NS may or may not be an apparatus shared with another NS. The UE and/or an apparatus in the network can be allocated to one or more NSs based on registration information such as NSSAI and/or S-NSSAI and/or UE usage type and/or one or more NSI IDs, and/or an APN. Note that the UE usage type is a parameter value which is included in registration information of the UE and used for identifying the NSI. The UE usage type may be stored in the HSS. The AMF may select the SMF and the UPF based on the UE usage type.

Additionally, Single Network Slice Selection Assistance Information (S-NSSAI) is information for identifying an NS. S-NSSAI may be constituted by only a Slice/Service type (SST) or may be constituted by both an SST and a Slice Differentiator (SD). Here, SST refers to information indicating an operation of an NS expected in terms of functions and services. In addition, the SD may be information for interpolating the SST in a case that one NSI is selected from multiple NSIs denoted by the SST. S-NSSAI may be unique information for each PLMN or may be standard information common between PLMNs. In addition, the network may store one or more pieces of S-NSSAI in the registration information of the UE as default S-NSSAI. Note that, in a case that the S-NSSAI is default S-NSSAI, the network may provide an NS related to the UE in a case that the UE does not transmit valid S-NSSAI to the network in a registration request message.

In addition, Network Slice Selection Assistance Information (NSSAI) is a group of S-NSSAI. Each piece of S-NSSAI included in NSSAI is information for assisting the access network or the core network to select an NSI. The UE may store NSSAI allowed from the network for each PLMN. Additionally, NSSAI may be information used to select an AMF.

In addition, the UE that supports both the 5GC and the EPC NAS can operate in the single registration mode and the dual registration mode for interworking of the 5GS and the EPC.

In addition, a 201st timer is a timer indicating an validity time of mapping by an SMF. Specifically, the timer is one indicating an validity time of mapping of a PDU session type and/or PDN type and/or S-NSSAI by the SMF in a handover procedure from the 5GS to the EPS to return to an original PDU session state in a case that a handover is performed from the 5GS to the EPS and then a handover is performed from the EPS to the 5GS again. In addition, the timer is one indicating an validity time of mapping of a PDU session type and/or PDN type and/or S-NSSAI by the SMF in a handover procedure from the EPS to the 5GS to return to an original PDN connection state in a case that a handover is performed from the EPS to the 5GS and then a handover is performed from the 5GS to the EPS again.

In addition, a 202nd timer is a timer indicating an validity time of mapping by the UE. Specifically, the timer is one indicating an validity time of mapping of a PDU session type and/or PDN type and/or S-NSSAI by the UE in a handover procedure from the 5GS to the EPS to return to an original PDU session state in a case that a handover is performed from the 5GS to the EPS and then a handover is performed from the EPS to the 5GS again. In addition, the timer is one indicating an validity time of mapping of a PDU session type and/or PDN type and/or S-NSSAI by the UE in a handover procedure from the EPS to the 5GS to return to an original PDN connection state in a case that a handover is performed from the EPS to the 5GS and then a handover is performed from the 5GS to the EPS again.

In addition, a network refers to at least some of the access network_B, the core network_B, and the DN. In addition, one or more apparatuses included in at least some of the access network_B, the core network_B, and the DN may also be referred to as a network or a network apparatus. That is, the expression "the network performs transmission and/or reception of a message and/or a procedure" signifies that "an apparatus in the network (network apparatus) performs transmission and/or reception of a message and/or a procedure."

In addition, A Session Management (SM) message (also referred to as a Non-Access-Stratum (NAS) SM message) may be an NAS message used in a procedure for the SM, or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification response message, and the like. In addition, the procedure for SM may include a PDU session establishment procedure.

In addition, an EMM context is a context established by the UE and an MME in a case that an attach procedure is completed. In addition, a 5GMM context is a context established by the UE and the AMF in a case that the registration procedure is completed. In addition, an EPS bearer context is a context established by the UE and the network for managing an EPS bearer. Furthermore, a context of a default EPS bearer may be expressed as a default EPS bearer context. In addition, a PDU session context is a context established by the UE and the network for managing a PDU session.

Furthermore, first identification information is information indicating a type of a registration procedure. The first identification information may be information indicating that the present procedure is a registration procedure at the time of an initial connection, or may be information indicating that the procedure is a registration procedure to be performed at a time when the UE_A 10 moves or to be performed regularly. Furthermore, the first identification information may be information indicating initial registration, may be information indicating mobility registration update, or may be information indicating periodic registration update.

In addition, 11th identification information is information indicating the SSC mode. The 11th identification information may be information indicating the SSC mode requested by the UE_A 10. More specifically, the 11th identification information may be information indicating the SSC mode associated with a PDU session established in the present procedure requested by the UE_A 10. Furthermore, the 11th identification information may be information indicating the SSC mode selected in a case that a PDN connection established in the present procedure requested by the UE_A 10 is mapped to a PDU session. Note that the 11th identification information may be information indicating the SSC mode 1, information indicating the SSC mode 2, or information indicating the SSC mode 3.

In addition, 12th identification information is information indicating a request type. The 12th identification information may be information indicating a type of a PDU session and/or a PDN connection of which establishment is requested by the UE_A 10. The 12th identification information may be information indicating an initial request or may be information indicating Handover.

In addition, 13th identification information is information indicating the type of a PDU session to be mapped to a PDN connection at the time of a handover from the 5GS to the EPS required by the UE_A 10. Here, the information indicating the type of the PDU session to be mapped to the PDN connection may be S-NSSAI, may be information for identifying an NSI, may be a DNN, or may be the SSC mode.

For example, the UE_A 10 may request mapping of a PDU session associated with specific S-NSSAI to a PDN connection at the time of a handover from the 5GS to the EPS by placing the specific S-NSSAI in the 13th identification information. For example, the UE_A 10 may request mapping of a PDU session associated with a specific NSI to a PDN connection at the time of a handover from the 5GS to the EPS by placing information for identifying the NSI in the 13th identification information.

Furthermore, the UE_A 10 may request mapping of a PDU session associated with a specific DNN to a PDN connection at the time of a handover from the 5GS to the EPS by placing the specific DNN in the 13th identification information. Furthermore, the UE_A 10 may request mapping of a PDU session associated with a specific SSC mode to a PDN connection at the time of a handover from the 5GS to the EPS by placing the specific SSC mode in the 13th identification information. Note that the UE_A 10 may include information indicating the specific SSC mode or may include information indicating multiple SSC modes in the 13th identification information.

In addition, 21st identification information is information indicating an SSC mode. The 21st identification information may be information indicating the SSC mode selected by the network. More specifically, the 21st identification information may be information indicating the SSC mode associated with a PDU session established in the present procedure selected by the network. Furthermore, the 21st identification information may be information indicating the SSC mode selected in a case that a PDN connection established in the present procedure selected by the network is mapped to a PDU session. Note that the SSC mode selected in mapping to the PDU session may be the SSC mode 1, the SSC mode 2, or the SSC mode 3. Further, the SSC mode selected in mapping to the PDU session may be an SSC mode selected based on the 11th identification information, and/or subscription information, and/or a network configuration. In addition, the SSC mode selected in mapping to the PDU session may be an SSC mode determined in units of APNs, and or units of PDN types, or may be the default SSC mode.

In addition, 23rd identification information is information indicating the type of a PDU session to be mapped to a PDN connection at the time of a handover from the 5GS to the EPS allowed by the network. Here, the information indicating the type of the PDU session to be mapped to the PDN connection may be S-NSSAI, may be information for identifying an NSI, may be a DNN, or may be the SSC mode.

For example, the network may indicate mapping of a PDU session associated with specific S-NSSAI to a PDN connection at the time of a handover from the 5GS to the EPS by placing the specific S-NSSAI in the 23rd identification information. For example, the network may indicate mapping of a PDU session associated with a specific NSI to a PDN connection at the time of a handover from the 5GS to the EPS by placing information for identifying the NSI in the 23rd identification information.

Furthermore, the network may indicate mapping of a PDU session associated with a specific DNN to a PDN connection at the time of a handover from the 5GS to the EPS by placing the specific DNN in the 23rd identification information. Furthermore, the network may indicate mapping of a PDU session associated with a specific SSC mode to a PDN connection at the time of a handover from the 5GS to the EPS by placing the specific SSC mode in the 23rd identification information. Note that the network may include information indicating a specific SSC mode or may include information indicating multiple SSC modes in the 23rd identification information.

Note that the selection and determination of information indicating the type of a PDU session mapped to a PDN connection may be performed based on the 13th identification information, or may be performed based on a configuration of the network. Furthermore, the selection and determination of information indicating the type of a PDU session mapped to a PDN connection may be performed based on subscription information, or may be performed based on an operator policy.

In addition, 31st identification information is a cause value indicating handover from the 5GC to the EPC and/or interworking. The 31st identification information may be information for indicating that initiation of the attach procedure is indicated to the UE_A 10 to achieve handover from the 5GC to the EPC and/or interworking. Furthermore, the 31st identification information may be information indicating being Implicitly detached, or may be information indicating that it is not possible to activate an EPS bearer context (No EPS bearer context activated).

Note that the UE_A 10 may transmit an attach request message to the EPC or may transition to a 31st state based on reception of the 31st identification information. Furthermore, the UE_A 10 may transmit, to the EPC, a PDN connectivity request message including the 12th identification information indicating handover, or may transmit the PDN connectivity request message included in the attach request message based on reception of the 31st identification information.

In addition, 32nd identification information is a cause value indicating that the acquisition of a context from the 5GC has failed. The 32nd identification information may be information indicating that a context of the UE_A 10 was not able to be obtained from the 5GC in a case that handover from the 5GC to the EPC and/or interworking is performed. Furthermore, the 32nd identification information may be information for indicating that initiation of the attach procedure is indicated to the UE_A 10 to achieve handover from the 5GC to the EPC and/or interworking. Furthermore, the 32nd identification information may be information indicating that it was not able to activate the EPS bearer context (No EPS bearer context activated), or may be information indicating failure of a service network (Service network failure).

Note that the UE_A 10 may transmit an attach request message to the EPC or may transition to the 31st state based on reception of the 32nd identification information. Furthermore, the UE_A 10 may transmit, to the EPC, a PDN connectivity request message including the 12th identification information indicating an initial request, or may transmit the PDN connectivity request message included in the attach request message based on reception of the 32nd identification information.

In addition, 33rd identification information is a cause value indicating that the 5GC is not available. The 33rd identification information may be information indicating that UE_A 10 is not capable of connecting to the 5GC in a case that handover from the 5GC to the EPC and/or interworking is performed, or may be information indicating that the connection of the UE_A 10 to the 5GC is no longer supported by the network. Further, the 33rd identification information may be information indicating that a 5GS service is not allowed (5GS services not allowed), or may be information indicating that the N1 mode is not allowed (N1 mode not allowed).

Note that the UE_A 10 may transmit an attach request message to the EPC or may transition to a 32nd state based on reception of the 33rd identification information. Furthermore, the UE_A 10 may transmit, to the EPC, a PDN connectivity request message including the 12th identification information indicating an initial request, or may transmit the PDN connectivity request message included in the attach request message based on reception of the 33rd identification information. In addition, the UE_A 10 may delete retained capability information (Capability) for the 5GC, may delete capability information for the N1 mode, or delete the radio capability information for the N1 mode based on reception of the 33rd identification information.

In addition, 34th identification information is a cause value indicating that connection to EPC is not possible. The 34th identification information may be information indicating that the network does not support a connection of the UE_A 10 to the EPC, or may be information indicating that the connection is not allowed. Further, the 34th identification information may be information indicating that EPS services are not allowed (EPS services not allowed), or may be information indicating that the S1 mode is not allowed (S1 mode not allowed).

Note that the UE_A 10 may transition to a 43rd state based on reception of the 34th identification information. Furthermore, the UE_A 10 may delete retained capability information (Capability) for the EPC, may delete capability information for the S1 mode, or delete radio capability information for the S1 mode based on reception of the 34th identification information. Furthermore, the UE_A 10 may attempt to connect to a 5G Access Network or attempt to connect to the 5GC based on the reception of the 34th identification information.

In addition, 35th identification information is information indicating that a tracking area update request message has been rejected. The 35th identification information may be a cause value indicating the cause of the rejection of the tracking area update request message. Furthermore, the 35th identification information may be identification information in which one or more pieces of identification information are combined in the 31st to the 34th identification information, or may be identification information having a meaning indicated by the one or more pieces of identification information.

In addition, 42nd identification information is a cause value indicating that the acquisition of a context from the EPC has failed. The 42nd identification information may be information indicating that a context of the UE_A 10 was not able to be obtained from the EPC in a case that handover from the EPC to the 5GC and/or interworking is performed. Furthermore, the 42nd identification information may be information for indicating that initiation of the registration procedure is indicated to the UE_A 10 again to achieve handover from the EPC to the 5GC and/or interworking. Furthermore, the 42nd identification information may be information indicating that it was not able to activate a PDU session context (No PDU session context activated), or may be information indicating failure of a service network (Service network failure).

Note that the UE_A 10 may transmit a registration request message including the first identification information indicating initial registration to the 5GC or may transition to the 41st state based on reception of the 42nd identification information. Furthermore, the UE_A 10 may transmit, to the 5GC, a PDU session establishment request message including the 12th identification information indicating an initial request, or may transmit the PDU session establishment request message including the 12th identification information indicating the initial request by including the PDU session establishment request message in a registration request message, based on the reception of the 42nd identification information.

In addition, 43rd identification information is a cause value indicating that the EPC is not available. The 43rd identification information may be information indicating that the UE_A 10 is not capable of connecting to the EPC in a case that handover from the EPC to the 5GC and/or interworking is performed, or may be information indicating that the connection of the UE_A 10 to the EPC is no longer supported by the network. Further, the 43rd identification information may be information indicating that EPS services are not allowed (EPS services not allowed), or may be information indicating that the S1 mode is not allowed (S mode not allowed).

Note that the UE_A 10 may transmit a registration request message including the first identification information indicating initial registration to the 5GC or may transition to the 42nd state based on reception of the 43rd identification information. Furthermore, the UE_A 10 may transmit, to the 5GC, a PDU session establishment request message including the 12th identification information indicating an initial request, or may transmit the PDU session establishment request message including the 12th identification information indicating the initial request included in a registration request message based on the reception of the 43rd identification information. Furthermore, the UE_A 10 may delete retained capability information (Capability) for the EPC, may delete capability information for the S1 mode, or delete radio capability information for the S1 mode based on reception of the 43rd identification information.

In addition, the 44th identification information is a cause value indicating that a connection to the 5GC is not possible. The 44th identification information may be information indicating that the network does not support a connection of the UE_A 10 to the 5GC, or may be information indicating that the connection is not allowed. Further, the 44th identification information may be information indicating that 5GS services are not allowed (5GS services not allowed), or may be information indicating that the N1 mode is not allowed (N1 mode not allowed).

Note that the UE_A 10 may transition to the 33rd state based on reception of the 44th identification information. In addition, the UE_A 10 may delete retained capability information (Capability) for the 5GC, may delete capability information for the N1 mode, or delete radio capability information for the N1 mode based on reception of the 44th identification information. Furthermore, the UE_A 10 may attempt to connect to the E-UTRAN or attempt to connect to the EPC based on the reception of the 44th identification information.

In addition, 45th identification information is information indicating that a registration request message has been rejected. The 45th identification information may be a cause value indicating the cause of the rejection of the registration request message. Furthermore, the 45th identification information may be identification information in which one or more pieces of identification information are combined in the 42nd to the 44th identification information, or may be identification information having a meaning indicated by the one or more pieces of identification information.

In addition, 101st identification information is identification information indicating a PDU session type requested by the UE. The 101st identification information may be, for example, as a type of one or more PDU sessions established after one or more PDN connections that have been attempted to be established in the EPS are handed over to the 5GS, a PDU session type desired by the UE_A 10, or may be a PDU session type for each PDU session desired by the UE.

Specifically, the PDU session type indicated by the 101st identification information may be "Ethernet" or "Unstructured" or "IP" or "IPv4" or "IPv6."

Further, the 101st identification information may be used by an apparatus within a core network to determine a PDU session type after handover in a handover procedure from the EPS to the 5GS.

Here, the apparatus within the core network using the 101st identification information may be one or more of the SMF and/or the PGW and/or the AMF and/or the MME and/or the PCF and/or the PCRF and/or the UDM and/or the HSS or an apparatus in which some of the apparatuses are combined. In other words, in a case that the 101st identification information is received, the apparatus within the core network may store (mapping) and retain the PDU session type indicated by the 101st identification information in association with a PDN connection or a PDU session.

In addition, 102nd identification information is information about a UE capability indicating the type of a PDU session (PDU session type) that can be established by the UE_A 10 at the time of a handover from the EPS to the 5GS. In other words, the 102nd identification information may include one or more (including all) PDU session types having capabilities used by the UE_A 10 in the 5GS, and may define a PDU session type established in the 5GS at the time of a handover.

Specifically, the PDU session type indicated by the 102nd identification information may include one or more of "Ethernet" and/or "Unstructured" and/or "IP" and/or "IPv4" and/or "IPv6."

Note that the 102nd identification information may include the PDU session type indicated by the 101st identification information. In other words, the PDU session type indicated by the 101st identification information may be selected from the PDU session type that can be established by the UE, and may be selected among the PDU session types indicated by the 102nd identification information.

In addition, 103rd identification information is a period requested by the UE as a period during which mapping is to be retained. Specifically, as a period during which each apparatus within the core network retains mapping in which the PDU session type indicated by the 101st identification information is associated with a PDN connection or a PDU session, a period requested by the UE may be indicated. In other words, each apparatus within the core network may configure a period indicated by the 103rd identification information as a period during which mapping for associating the PDU session type indicated by the 101st identification information with the PDN connection or PDU session is retained based on the 103rd identification information and may retain the mapping during the period. In addition, each apparatus within the core network may delete the mapping in a case that the period is exceeded. Further, the UE_A 10 and/or each apparatus within the core network may start to run a timer based on the 103rd identification information, or start to run the timer based on the 103rd identification information, the 101st identification information and/or the 102nd identification information.

Note that the apparatus within the core network operating based on the 103rd identification information may be one or more of the SMF and/or the PGW and/or the AMF and/or the MME and/or the PCF and/or the PCRF and/or the UDM and/or the HSS or an apparatus in which some of the apparatuses are combined.

In addition, 111th identification information is identification information indicating a type of a PDN connection (PDN type) requested by the UE. The 111th identification information may be, for example, a PDN type desired by the UE_A 10 as the type of one or more PDN connections established after one or more PDU sessions attempted to be established in the 5GS are handed over to the EPS, or may be a PDN type for each PDU session desired by the UE.

Specifically, the PDN type indicated by the 111th identification information may be "non IP (Non-IP)" or "IPv4" or "IPv6" or "IPv4v6."

Furthermore, the 11th identification information may be used by the apparatus within the core network in a handover procedure from the 5GS to the EPS to determine a PDN type after the handover. Here, the apparatus within the core network using the 11th identification information may be one or more of the SMF and/or the PGW and/or the AMF and/or the MME and/or the PCF and/or the PCRF and/or the UDM and/or the HSS or an apparatus in which some of the apparatuses are combined. In other words, in a case that the 111th identification information is received, the apparatus within the core network may store (mapping) and retain the PDN type that is indicated by the 11th identification information and associated with a PDN connection or a PDU session.

In addition, 112th identification information is information regarding a UE capability indicating the type of a PDN connection (PDN type) that can be established by the UE_A 10 at the time of a handover from the 5GS to the EPS. In other words, the 102nd identification information may include one or more (including all) PDN types having capabilities used by the UE_A 10 in the EPS, and may define a type of a PDN type established in the EPS at the time of a handover.

Specifically, the PDN type indicated by the 112th identification information may include one or more of "non IP (Non-IP)" and/or "IPv4" and/or "IPv6" and/or "IPv4v6."

Note that the 112th identification information may include the PDN type indicated by the 111th identification information. In other words, the PDN type indicated by the 111th identification information may be selected from the PDN type that can be established by the UE, and may be selected among the PDN types indicated by the 112th identification information.

In addition, 113th identification information is a period requested by the UE as a period during which mapping is to be retained. Specifically, as a period during which each apparatus within the core network retains mapping associated with the PDN type indicated by the 111th identification information with a PDN connection or a PDU session, a period requested by the UE may be indicated. In other words, each apparatus within the core network may configure a period indicated by the 113th identification information as a period during which mapping for associating the PDN type indicated by the 111th identification information with the PDN connection or the PDU session is retained in a case that the 113th identification information is received and retain the mapping during the period. In addition, each apparatus within the core network may delete the mapping in a case that the period is exceeded. Further, the UE_A 10 and/or each apparatus within the core network may start to run a timer based on the 113th identification information, or start to run the timer based on the 113th identification information, the 111th identification information and/or the 112th identification information.

Note that, the apparatus within the core network operating based on the 113th identification information may be one or more of the SMF and/or the PGW and/or the AMF and/or the MME and/or the PCF and/or the PCRF and/or the UDM and/or the HSS or an apparatus in which some of the apparatuses are combined.

In addition, 201st identification information is information indicating whether the UE supports non-IP as a PDN type in the EPS.

By receiving the 201st identification information, the SMF can recognize that the UE supports non-IP as a PDN type of a PDN connection established in the EPS. In addition, by receiving the 201st identification information, the SMF can recognize that the UE does not support non-IP as a PDN type of a PDN connection established in the EPS.

In addition, by receiving the 201st identification information, the SMF may recognize that a PDU session whose PDU session type is Ethernet or Unstructured can be mapped to a PDN connection of which a PDN type is non-IP. In addition, by receiving the 201st identification information, the SMF may recognize that a PDU session whose PDU session type is Ethernet or Unstructured is not able to be mapped to a PDN connection of which a PDN type is non-IP. In other words, the SMF can use the 201st identification information to determine whether a PDU session whose PDU session type is Ethernet or Unstructured can be mapped to a PDN connection of which a PDN type is non-IP.

In addition, 202nd identification information is information indicating whether the UE supports non-IP as a PDN type in the EPS.

By receiving the 202nd identification information, the SMF can recognize that the UE supports non-IP as a PDN type of a PDN connection established in the EPS. In addition, by not receiving the 202nd identification information, the SMF can recognize that the UE does not support non-IP as a PDN type of a PDN connection established in the EPS.

In addition, by receiving the 202nd identification information, the SMF may recognize that a PDU session whose PDU session type is Ethernet or Unstructured can be mapped to a PDN connection of which a PDN type is non-IP. In addition, by not receiving the 202nd identification information, the SMF may recognize that a PDU session whose PDU session type is Ethernet or Unstructured is not able to be mapped to a PDN connection of which a PDN type is non-IP. In other words, the SMF can use the 202nd identification information and/or information of whether the 202nd identification information has been received to determine whether a PDU session whose PDU session type is Ethernet or Unstructured can be mapped to a PDN connection of which a PDN type is non-IP.

In addition, 203rd identification information is information indicating whether the UE supports non-IP as a PDN type in the EPS.

By receiving the 203rd identification information, the SMF can recognize that the UE does not support non-IP as a PDN type of a PDN connection established in the EPS. In addition, by not receiving the 203rd identification information, the SMF can recognize that the UE supports non-IP as a PDN type of a PDN connection established in the EPS.

In addition, by receiving the 203rd identification information, the SMF may recognize that a PDU session whose PDU session type is Ethernet or Unstructured is not able to be mapped to a PDN connection of which a PDN type is non-IP. In addition, by not receiving the 203rd identification information, the SMF may recognize that a PDU session whose PDU session type is Ethernet or Unstructured can be mapped to a PDN connection of which a PDN type is non-IP. In other words, the SMF can use the 203rd identification information and/or whether the 203rd identification information has been received to determine whether a PDU session whose PDU session type is Ethernet or Unstructured can be mapped to a PDN connection of which a PDN type is non-IP.

In addition, 211th identification information is S-NSSAI used for mapping in the SMF. Specifically, the information is S-NSSAI used for mapping of a PDU session type and/or PDN type and/or S-NSSAI by the SMF in a handover procedure from the 5GS to the EPC to return to an original PDU session in a case that a handover is performed from the 5GS to the EPC and then a handover is performed from the EPC to the 5GS again. The SMF can share information regarding the PDU session established in the 5GS with the UE by notifying the UE of the 211th identification information in addition to the PDU session type and the PDN type.

Note that, in a case that NSs are not supported in the 5GS, the SMF does not use S-NSSAI in the mapping described above. In other words, in the mapping described above, mapping of the PDU session type and the PDN type is performed. At this time, the SMF need not transmit the 211th identification information to the UE.

In addition, 212th identification information is information indicating an validity time of mapping of the SMF. Specifically, the information is information indicating the validity time of mapping of a PDU session type and/or PDN type and/or S-NSSAI by the SMF in a handover procedure from the 5GS to the EPC to return to an original PDU session in a case that a handover is performed from the 5GS to the EPC and then a handover is performed from the EPC to the 5GS again. The SMF can share the validity time of the mapping with the UE by notifying the UE of the 212th identification information.

Note that the 212th identification information may be related to a 201st timer. For example, the 212th identification information desirably has the same value as the 201st timer configured in the SMF, and may have a different value. For example, the 212th identification information may be a value obtained by increasing or decreasing a value of the 201st timer by a prescribed value. By sharing information of the prescribed value between the SMF and the UE, the 212th identification information can be a value different from the value of the 201st timer. In this way, in a case that the 212th identification information has a value obtained by increasing or decreasing the value of the 201st timer by the prescribed value, the 212th identification information may include the above-described prescribed value in addition to the information indicating the validity time. However, in a case that a unique value is standardized in a specification, the UE and the SMF inherently know the prescribed value, and thus there is no need to transmit the prescribed value as an explicit signal from the SMF to the UE, and there is no need to include the prescribed value in the 212th identification information.

In addition, the 212th identification information may be related to a 202nd timer. For example, in a case that the 212th identification information has the same value as the 201st timer, the 202nd timer configured in the UE may be configured to the value indicated by the 212th identification information. In this case, the value of the 202nd timer can match the value of the 201st timer, and the validity times of the mapping of the SMF and the UE can be synchronized.

In addition, even in a case that the 212th identification information has the same value as the 201st timer, the 202nd timer configured in the UE can be configured to a different value from the value indicated by the 212th identification information. In this case, although the value of the 202nd timer does not match the value of the 201st timer, a flexible configuration can be made, for example, by configuring the validity time of the mapping in the SMF to be longer than the validity time of the mapping in the UE.

In addition, in a case that the 212th identification information has a value obtained by increasing or decreasing the value of the 201st timer by a prescribed value and information of the prescribed value is shared between the SMF and the UE, the 202nd timer can increase or decrease the value indicated by the 212th identification information by the prescribed value such that the value of the 202nd timer may match the value of the 201st timer.

Note that, in a case that the validity time of the mapping in the SMF is standardized to a unique value in the specification, the UE and the SMF inherently know the validity time, so it is not necessary to transmit the 212th identification information as an explicit signal from the SMF to the UE.

In addition, 213th identification information is information indicating an validity time of mapping of the UE. Specifically, the information is information indicating the validity time of mapping of a PDU session type and/or PDN type and/or S-NSSAI by the UE in a handover procedure from the 5GS to the EPC to return to an original PDU session in a case that a handover is performed from the 5GS to the EPC and then a handover is performed from the EPC to the 5GS again. The UE can share the validity time of the mapping with the SMF by notifying the SMF of the 213th identification information.

Note that the 213th identification information may be related to the 202nd timer. For example, the 213th identification information desirably has the same value as the 202nd timer configured in the UE, and may have a different value. For example, the 213th identification information may be a value obtained by increasing or decreasing a value of the 202nd timer by a prescribed value. By sharing information of the prescribed value between the SMF and the UE, the 213th identification information can be a value different from the value of the 202nd timer. In this way, in a case that the 213th identification information has a value obtained by increasing or decreasing the value of the 202nd timer by the prescribed value, the 213th identification information may include the above-described prescribed value in addition to the information indicating the validity time. However, in a case that a unique value is standardized in the specification, the UE and the SMF inherently know the prescribed value, and thus there is no need to transmit the prescribed value as an explicit signal from the SMF to the UE, and there is no need to include the prescribed value in the 213th identification information.

In addition, the 213th identification information may be related to the 201st timer. For example, in a case that the 213th identification information has the same value as the 202nd timer, the 201st timer configured in the SMF can be configured to the value indicated by the 213th identification information. In this case, the value of the 201st timer can match the value of the 202nd timer, and the validity times of the mapping of the SMF and the UE can be synchronized.

In addition, even in a case that the 213th identification information has the same value as the 202nd timer, the 201st timer configured in the SMF can be configured to a different value from the value indicated by the 213th identification information. In this case, although the value of the 201st timer does not match the value of the 202nd timer, a flexible configuration can be made, for example, by configuring the validity time of the mapping in the SMF to be longer than the validity time of the mapping in the UE.

In addition, in a case that the 213th identification information has a value obtained by increasing or decreasing the value of the 202nd timer by a prescribed value and information of the prescribed value is shared between the SMF and the UE, the 201st timer can increase or decrease the value indicated by the 213th identification information by the prescribed value such that the value of the 201st timer may match the value of the 201st timer.

Note that, in a case that the validity time of the mapping in the UE is standardized to a unique value in the specification, the UE and the SMF inherently know the validity time, so it is not necessary to transmit the 213th identification information as an explicit signal from the UE to the SMF.

The SMF first configures a value of the 201st timer in the above-described mapping, then generates the 212th identification information, and transmits the information to the UE. The UE can configure a value of the 202nd timer based on the 212th identification information received from the SMF, then generate the 213th identification information, and transmit the information to the SMF. In a case that the 213th identification information is received from the UE, the SMF checks the content of the information and reconfigure/modify the value of the 201st timer if necessary.

4. First Embodiment

Next, a first embodiment will be described using drawings. In the first embodiment, UE first carries out a Registration procedure in the 5GS. Next, in the 5GS, the UE performs a PDU session establishment procedures to establish a PDU session and performs communication with a DN using the PDU session. Next, a handover procedure from the 5GS to an EPS can be performed to switch at least a portion of the PDU session in the 5GS to communication using a PDN connection in the EPS. The UE then can perform a handover procedure from the EPS to the 5GS to perform communication using a PDU session originally performed in the 5GS. Hereinafter, each of the procedures will be described in the order described above.

Note that, in the present embodiment, a case in which a PDN and a DN are configured as the same network will be described as illustrated in FIG. 1. However, the contents described in the present embodiment are applicable even in a case that the PDN and the DN are configured as different networks.

Also, in the present embodiment, a case in which an HSS and a UDM, a PCF and a PCRF, an SMF and a PGW-C, a UPF and a PGW-U are each configured as the same device (i.e., the same physical hardware, or the same logical hardware, or the same software) as described in FIG. 2 will be described. However, the contents described in the present embodiment can also be applied even in a case that they are configured as different apparatuses (i.e., different physical hardware, or different logical hardware, or different software). For example, the apparatuses may transmit and/or receive data directly, transmit and/or receive data via an N26 interface between AMF-MME, or transmit and/or receive data via the UE.

4.1. Registration Procedure in 5GS

First, a registration procedure in the 5GS will be described using FIG. 8. The registration procedure is a procedure for registration in the access network_B, and/or the core network_B, and/or the DN initiated by the UE. In a case that the UE is not registered in the network, the UE can perform the present procedure at any timing, for example, in a case that power is input. In other words, the UE may initiate the present procedure at any timing in a non-registered state (RM-DEREGISTERED state). In addition, each apparatus (particularly, the UE and the AMF) can transition to a registration state (RM-REGISTERED state) based on the completion of the registration procedure.

Furthermore, the registration procedure may be a procedure for updating location registration information of the UE on the network, and/or regularly notifying the network of a state of the UE from the UE, and/or updating a specific parameter related to the UE in the network.

The UE may initiate a registration procedure in a case that the UE has mobility across a TA. In other words, the UE may initiate the registration procedure in a case that the UE moves to a TA different from a TA indicated in a TA list retained by the UE. Furthermore, the UE may initiate the present procedure in a case that a running timer expires. Furthermore, the UE may initiate the registration procedure in a case that a context of each apparatus needs to be updated due to disconnection or deactivation of a PDU session. Furthermore, the UE may initiate the registration procedure in a case that a change occurs in capability information and/or preference for PDU session establishment of the UE. Furthermore, the UE may initiate the registration procedure regularly. Note that, the embodiment is not limited to the above, and the UE can perform the registration procedure at any timing.

First, the UE transmits a registration request message to an AMF via a 5G AN (or gNB) (S800) (S802) (S804) to initiate the registration procedure. Specifically, the UE transmits an RRC message including the registration request message to the 5G AN (or gNB) (S800). Note that the registration request message is an NAS message. In addition, the RRC message may be a control message transmitted and/or received between the UE and the 5G AN (or gNB). Furthermore, the NAS message may be processed in an NAS layer, and the RRC message may be processed in an RRC layer. Note that the NAS layer is a layer higher than the RRC layer.

Here, although the UE can transmit 13th identification information, and/or 111th identification information, and/or 112th identification information, and/or 113th identification information, and/or 201st identification information, and/or 202nd identification information, and/or 203rd identification information included in the registration request messages and/or the RRC message, the UE may transmit such identification information included in a control message different from the above, for example, a control message of a lower layer than the RRC layer (e.g., an MAC layer, an RLC layer, or a PDCP layer). These pieces of identification information may be included in these messages to indicate a request of the UE. Furthermore, two or more pieces of the identification information may be configured as one or more pieces of identification information.

By transmitting the 13th identification information, the UE may indicate the type of a PDU session to be mapped to a PDN connection at the time of a handover from the 5GS to the EPS requested by the UE_A 10.

In addition, by transmitting the 111th identification information, the UE can report a preference of a type of a PDN connection (PDN type) established in the EPS at the time of a handover from the 5GS to the EPS. Specifically, as the 111th identification information, the UE can report a PDN type desired by the UE by specifying any one of "non-IP" or "IPv4" or "IPv6" or "IPv4v6."

In addition, by transmitting the 112th identification information, the UE can report a type that the UE supports (i.e., a UE capability) as a type of the PDN connection (PDN type) established in the EPS in a case that the UE performs a handover from the 5GS to the EPS. Specifically, as the 112th identification information, the UE can report a PDN type supported by the UE by specifying any one of "non-IP" or "IPv4" or "IPv6" or "IPv4v6."

Additionally, by transmitting the 113th identification information, the UE may request a period during which PDN types and PDU session types are associated and stored (mapped). That is, by transmitting the 113th identification information, the UE can request a period during which the relation between a PDU session established in the 5GS and a PDN connection established thereafter in the EPS by a handover procedure from the 5GS to the EPS is stored.

In addition, by transmitting the 201st identification information, the UE can indicate whether the UE supports non-IP as a PDN type of a PDN connection established in the EPS. That is, the UE can indicate that, as a PDN type, the UE supports non-IP or does not support non-IP.

In addition, since the UE transmits the 202nd identification information, the UE can indicate that the UE supports non-IP as a PDN type of a PDN connection established in the EPS. In addition, since the UE does not transmit the 202nd identification information, the UE can indicate that the UE does not support non-IP as a PDN type of a PDN connection established in the EPS.

In addition, since the UE transmits the 203rd identification information, the UE can indicate that the UE does not support non-IP as a PDN type of a PDN connection established in the EPS. In addition, since the UE does not transmit the 203rd identification information, the UE can indicate that the UE supports non-IP as a PDN type of a PDN connection established in the EPS.

In addition, the UE can include Requested NSSAI in the registration request message and/or RRC message in a case that the UE supports an NS. The requested NSSAI may include multiple pieces of S-NSSAI.

In addition, the UE transmits an SM message (e.g., a PDU session establishment request message) included in the registration request message, or transmits the SM message (e.g., the PDU session establishment request message) along with the registration request message to initiate a PDU session establishment procedure during the registration procedure.

In a case that the RRC message including the registration request message is received, the 5G AN (or gNB) selects an AMF to forward the registration request message (S802). Note that the 5G AN (or gNB) can select the AMF based on the registration request message and/or information included in the RRC message. The 5G AN (or gNB) retrieves the registration request message from the received RRC message and forwards the registration request message to the selected AMF (S804).

The AMF can perform first condition determination in a case that the registration request message is received. The first condition determination is intended to determine whether the network (or AMF) accepts a request from the UE. The AMF initiates the procedure (A) of FIG. 8 in a case that the first condition determination is true, and initiates the procedure (B) of FIG. 8 in a case that the first condition determination is false.

Note that the first condition determination may be performed based on reception of the registration request message, and/or identification information and/or subscription information, and/or an operator policy included in the registration request message. For example, in a case that the network accepts a request of the UE, the first condition determination is true, and in a case that the network does not accept requests of the UE, the first condition determination may be false. Furthermore, the first condition determination may be true in a case that the network that is a registration destination of the UE and/or an apparatus within the network supports a function requested by the UE, and the first condition determination may be false in a case that the network and/or the apparatus does not support the function requested by the UE. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

First, a case in which the first condition determination is true will be described. In the procedure illustrated in (A) of FIG. 8, the AMF can first perform fourth condition determination. The fourth condition determination is to determine whether the AMF transmits and/or receives an SM message to/from the SMF.

Note that the fourth condition determination may be performed based on whether the AMF has received an SM message. In addition, the fourth condition determination may be performed based on whether an SM message is included in the registration request message. For example, the fourth condition determination may be true in a case that the AMF receives the SM message and/or the SM message is included in the registration request message, and the fourth condition determination may be false in a case that the AMF does not receive the SM message and/or the SM message is not included in the registration request message. Note that conditions for determining whether the fourth condition determination is true or false may not be limited to the above-described conditions.

In a case that the fourth condition determination is true, the AMF selects the SMF and transmits and/or receives the SM message to and/or from the selected SMF, whereas, in a case that the fourth condition determination is false, the AMF does not perform the process (S806). Additionally, even in a case that the fourth condition determination is true, in a case that an SM message indicating rejection is received from the SMF, the AMF may cease the procedure (A) of FIG. 8. At this time, the AMF may initiate the procedure (B) of FIG. 8.

Note that the AMF can notify the SMF of the identification information received in the registration request message in a case that the SM message is transmitted and/or received to and from the SMF in S806. The SMF can obtain identification information received from the AMF through SM message transmission and/or reception to and from the AMF.

Next, the AMF transmits a registration accept message to the UE via the 5G AN (or gNB) as a response message to the registration request message based on the reception of the registration request message and/or the completion of SM message transmission and/or reception to and from the SMF (S808). For example, in a case that the fourth condition determination is true, the AMF may transmit a registration accept message based on reception of the registration request message from the UE. In addition, in a case that the fourth condition determination is false, the AMF may transmit a registration accept message based on the completion of the SM message transmission and/or reception to and from the SMF. Furthermore, although the registration accept message may be an NAS message to be transmitted and/or received on the N1 interface, the UE and the 5G AN (gNB) transmit and/or receive the message included in an RRC message.

The AMF may transmit the registration accept message including the 23rd identification information. By transmitting the 23rd identification information, the AMF may indicate the type of a PDU session to be mapped to a PDN connection at the time of a handover from the 5GS to the EPS allowed by the network. Furthermore, the UE may authenticate or store the type of the PDU session that can be mapped to the PDN connection at the time of the handover from the 5GS to the EPS in a case that the 23rd identification information is received.

In addition, the AMF can transmit an SM message included in the registration accept message (e.g., a PDU session establishment accept message) or transmit the SM message (e.g., a PDU session establishment accept message) along with the registration accept message. In addition, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF can indicate that a procedure for SM has been accepted in the registration procedure by performing such a transmission method.

In addition, the AMF may indicate that a request of the UE has been accepted by transmitting a registration accept message based on the received identification information and/or network capability information and/or an operator policy and/or a network status and/or user registration information.

Also, in a case that Requested NSSAI is included in the registration request message and the AMF authorizes one or more pieces of S-NSSAI included in the Requested NSSAI, the AMF can include Allowed NSSAI in the registration accept message. Allowed NSSAI includes one or more pieces of S-NSSAI allowed by the AMF.

Furthermore, the AMF may transmit information indicating that some requests of the UE have been rejected included in the registration accept message or may indicate the cause of the rejection of some requests of the UE by transmitting information indicating that some requests of the UE have been rejected. Furthermore, the UE may receive information indicating that some requests of the UE have been rejected to recognize the cause of the rejection of some requests of the UE. Note that the cause for rejection may be information indicating that the content indicated by the identification information that the AMF received is not allowed.

The UE receives a registration accept message via the 5G AN (gNB) (S808). The UE receives the registration accept message to recognize the acceptance of the requests of the UE made in the registration request message and the contents of various types of identification information included in the registration accept message.

The UE can transmit a registration complete message to the AMF via the 5G AN (gNB) as a response message to the registration accept message (S810). Note that, in a case that the UE receives an SM message such as a PDU session establishment accept message, the UE may transmit the SM message such as a PDU session establishment complete message included in the registration complete message, or may indicate that the procedure for SM has been completed by including the SM message. Here, although the registration complete message is an NAS message transmitted and/or received on the N1 interface, the UE and the 5G AN (gNB) transmit and/or receive the message included in an RRC message.

The AMF receives the registration complete message via the 5G AN (gNB) (S810). In addition, each apparatus completes the procedure (A) of FIG. 8 based on the transmission and/or reception of the registration accept message and/or the registration complete message.

Next, a case in which the first condition determination is false will be described. In the procedure (B) of FIG. 8, the AMF transmits a registration reject message to the UE via the 5G AN (gNB) as a response message to the registration request message (S812). Here, although the registration reject message is an NAS message transmitted and/or received on the N1 interface, the UE and the 5G AN (gNB) transmit and/or receive the message included in an RRC message.

Note that the AMF may indicate that the request of the UE using the registration request message has been rejected by transmitting the registration reject message. Furthermore, the AMF may transmit the registration reject message including information indicating the cause for the rejection, or may indicate the cause for the rejection by transmitting the cause for the rejection. Furthermore, the UE may receive the information indicating the cause for the rejection of the request of the UE to recognize the cause of the rejection of the request of the UE. Note that the cause for rejection may be information indicating that the content indicated by the identification information that the AMF received is not allowed.

The UE receives the registration reject message via the 5G AN (gNB) (S812). The UE receives the registration reject message to recognize the rejection of the request of the UE made in the registration request message and the contents of various types of identification information included in the registration reject message. In addition, the UE may recognize that the request of the UE has been rejected in a case that the registration reject message is not received even after a prescribed period of time elapses after the registration request message is transmitted. Each apparatus completes the procedure (B) in the present procedure based on the transmission and/or reception of the registration reject message.

Figure 8:
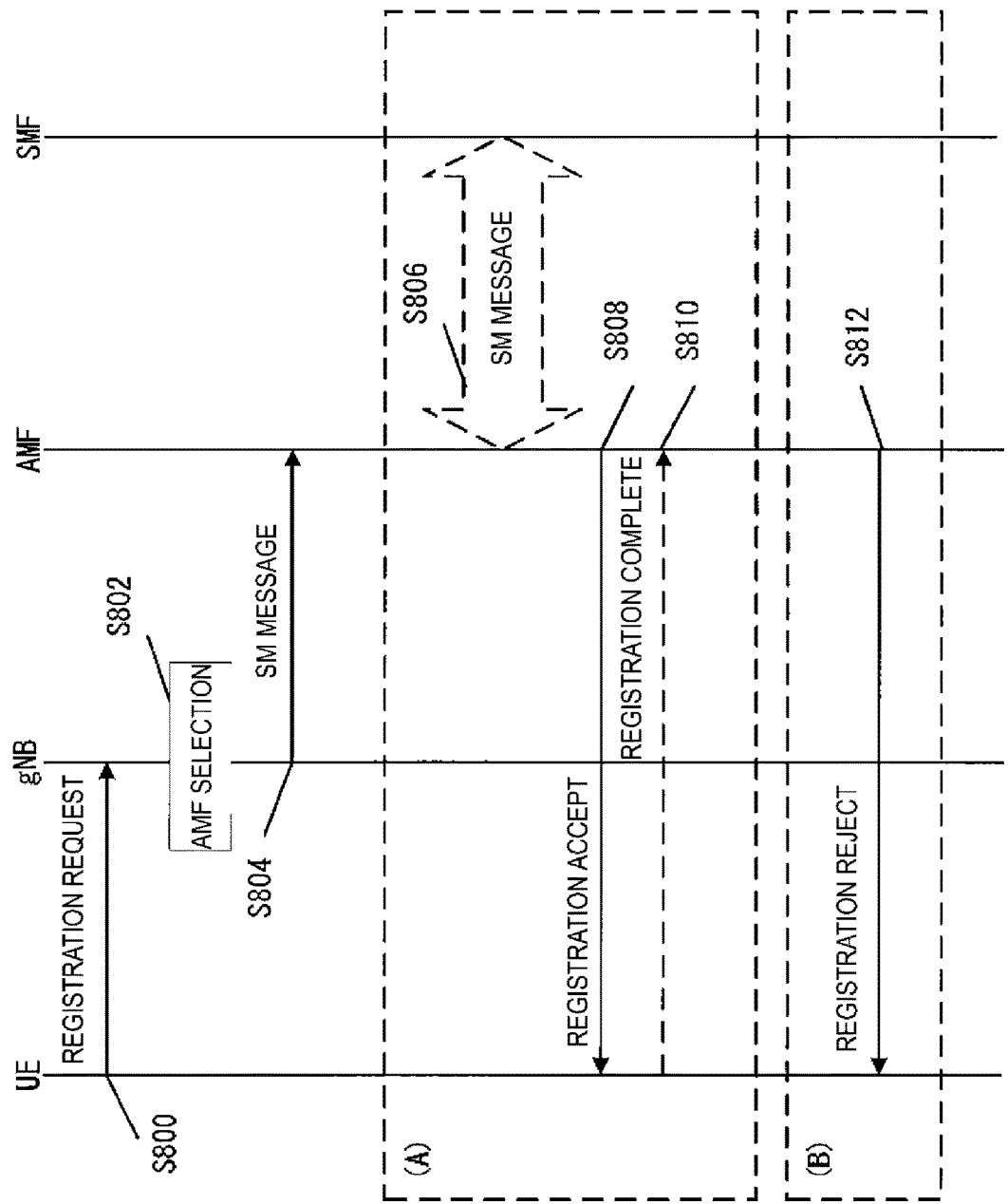
FIG. 8 is a diagram illustrating a registration procedure in the 5GS.

Note that the procedure (B) of FIG. 8 may be initiated in a case that the procedure (A) of FIG. 8 is canceled. Note that, in a case that the fourth condition determination is true in the procedure (A) of FIG. 8, the AMF may transmit an SM message indicating rejection such as a PDU session establishment reject message included in the registration reject message, or may include the SM message indicating rejection therein to indicate that the procedure for SM has been rejected. In that case, the UE may further receive the SM message indicating rejection such as the PDU session establishment reject message, or may recognize that the procedure for SM has been rejected.

Each apparatus completes the registration procedure based on the completion of the procedure (A) or (B) of FIG. 8. Note that each apparatus may transition to a state in which the UE is registered in the network (RM_REGISTERED state) based on the completion of the procedure (A) of FIG. 8, may maintain a state in which the UE is not registered in the network (RM_DEREGISTERED state) based on the completion of the procedure (B) of FIG. 8, or may transition to a state in which the UE is not registered in the network. In addition, a transition to each state of each apparatus may be performed based on completion of the registration procedure, or may be performed based on establishment of a PDU session.

Furthermore, each apparatus may perform processing based on information transmitted and/or received in the registration procedure based on completion of the registration procedure.

4.2. PDU Session Establishment Procedure in 5GS

Next, an overview of the PDU session establishment procedure performed to establish a PDU session for the DN in the 5GS will be described using FIG. 9. The PDU session establishment procedure is a procedure for each apparatus to establish a PDU session. Note that each apparatus can initiate the PDU session procedure at any timing at which the registration procedure has been completed and is in a registered state. In addition, each apparatus can perform the PDU session procedure in the registration procedure. In addition, each apparatus may establish the PDU session, based on completion of the PDU session establishment procedure. Note that each apparatus can perform the PDU session procedure multiple times to establish multiple PDU sessions.

First, the UE initiates a PDU session establishment procedure by transmitting an NAS message including a PDU session establishment request message to the SMF via the 5G AN (gNB) and the AMF (S900) (S902) (S904).

Specifically, the UE transmits the NAS message including the PDU session establishment request message to the AMF via the 5G AN (gNB) using the N1 interface (S900).

Here, the UE can transmit the 13th identification information and/or the 11th identification information and/or the 112th identification information and/or the 113th identification information and/or the 201st identification information and/or the 202nd identification information and/or the 203rd identification information included in the PDU Session establishment request message and/or the NAS message, and may transmit such identification information in a control message different from the messages, for example, a control message of a lower layer than the RRC layer (e.g., the MAC layer, the RLC layer, or the PDCP layer) and transmit them. These pieces of identification information may be included in these messages to indicate a request of the UE. Furthermore, two or more pieces of the identification information may be configured as one or more pieces of identification information.

By transmitting the 13th identification information, the UE may indicate the type of a PDU session to be mapped to a PDN connection at the time of a handover from the 5GS to the EPS requested by the UE_A 10. In addition, by transmitting and/or receiving the 13th identification information, the UE may request establishment of a PDU session that can be mapped to a PDN connection or may request establishment of a PDU session that cannot be mapped to a PDN connection at the time of a handover from the 5GS to the EPS.

In addition, by transmitting the 111th identification information, the UE can report a preference of a type of a PDN connection (PDN type) established in the EPS at the time of a handover from the 5GS to the EPS. Specifically, as the 111th identification information, the UE can report a PDN type desired by the UE by specifying any one of "non-IP" or "IPv4" or "IPv6" or "IPv4v6."

In addition, by transmitting the 112th identification information, the UE can report a type that the UE supports (i.e., a UE capability) as a type of the PDN connection (PDN type) established in the EPS in a case that the UE performs a handover from the 5GS to the EPS. Specifically, as the 112th identification information, the UE can report a PDN type supported by the UE by specifying any one of "non-IP" or "IPv4" or "IPv6" or "IPv4v6."

Additionally, by transmitting the 113th identification information, the UE may request a period during which PDN types and PDU session types are associated and stored (mapped). That is, by transmitting the 113th identification information, the UE can request a period during which the relation between a PDU session established in the 5GS and a PDN connection established thereafter in the EPS by a handover procedure from the 5GS to the EPS is stored.

In addition, by transmitting the 201st identification information, the UE can indicate whether the UE supports non-IP as a PDN type of a PDN connection established in the EPS. That is, the UE can indicate that, as a PDN type, the UE supports non-IP or does not support non-IP.

In addition, since the UE transmits the 202nd identification information, the UE can indicate that the UE supports non-IP as a PDN type of a PDN connection established in the EPS. In addition, since the UE does not transmit the 202nd identification information, the UE can indicate that the UE does not support non-IP as a PDN type of a PDN connection established in the EPS.

In addition, since the UE transmits the 203rd identification information, the UE can indicate that the UE does not support non-IP as a PDN type of a PDN connection established in the EPS. In addition, since the UE does not transmit the 203rd identification information, the UE can indicate that the UE supports non-IP as a PDN type of a PDN connection established in the EPS.

Note that the NAS message transmitted in S900 can include S-NSSAI, and/or Data Network Name (DNN), and/or a PDU session ID and/or a request type and/or a PDU type and/or an SSC mode. Note that the PDU type and/or the SSC mode is preferably included in the PDU session establishment request message.

The UE can include S-NSSAI in a case that S-NSSAI is to be changed. Also, in a case that the UE desires to connect to a DN, a DNN corresponding to the DN can be included. In addition, the UE can generate and include a PDU session ID in a case that there is a PDU session of which establishment is requested. In addition, the UE can include a request type indicating the purpose for PDU session establishment. The request type includes an initial request, an existing PDU session, and an initial emergency request. The initial request is designated in a case that establishment of a new non-emergency PDU session is requested. The existing PDU session is designated in a case that a handover of the non-emergency PDU session between 3GPP access and non-3GPP access or a transfer of a PDN connection from the EPS to the 5GS is performed. The initial emergency request is designated in a case that establishment of a new emergency PDU session is requested.

In addition, the UE can designate a PDU type indicating the type of the PDU session of which establishment is to be requested. As the PDU type, any one of IPv4, IPv6, IP, Ethernet, and Unstructured can be designated as described above. In addition, the UE can include an SSC mode of the PDU session of which establishment is to be requested.

Note that, in a case that the UE transmits, in the registration request message, the 13th identification information and/or the 111th identification information, and/or the 12th identification information, and/or the 113th identification information and/or the 201st identification information and/or the 202nd identification information and/or the 203rd identification information, the UE may not include the above identification information in the PDU session establishment request message. In addition, in a case that the UE does not transmit, in the registration request message, the 13th identification information and/or the 111th identification information, and/or the 112th identification information, and/or the 113th identification information and/or the 201st identification information and/or the 202nd identification information and/or the 203rd identification information, the UE may include the above identification information in the PDU session establishment request message.

In a case that the AMF receives the NAS message including the PDU session establishment request message (S900), the AMF retrieves the PDU session establishment request message from the NAS message, and selects the SMF as a forward destination of the PDU session establishment request message (S902). Note that, the AMF may select the SMF as a forward destination based on each piece of identification information included in the PDU session establishment request message, and/or the NAS message, and/or the subscription information and/or the capability information of the network and/or the operator policy and/or the state of the network and/or the context retained by the AMF.

The AMF transfers the PDU session establishment request message to the selected SMF via the N11 interface (S904).

In a case that the PDU session establishment request message is received (S904), the SMF recognizes the various types of identification information included in the PDU session establishment request message. Then, the SMF performs third condition determination. The third condition determination is to determine whether the SMF accepts a request of the UE. In the third condition determination, the SMF determines whether the third condition determination is true or false. In a case that the third condition determination is true, the SMF initiates the procedure (A) of FIG. 9, and in a case that the third condition determination is false, the SMF initiates the procedure (B) of FIG. 9.

Note that the third condition determination may be performed based on the PDU session establishment request message, and/or the identification information included in the PDU session establishment request message, and/or the subscription information, and/or the operator policy. For example, the third condition determination may be true in a case that the network allows the request of the UE. In addition, the third condition determination may be false in a case that the network does not allow the request of the UE. Furthermore, the third condition determination may be true in a case that the network as a connect destination of the UE and/or an apparatus within the network supports a function requested by the UE, and the third condition determination may be false in a case that the network and/or the apparatus does not support the function requested by the UE. Furthermore, in a case that the identification information to be transmitted and/or received is allowed, the third condition determination may be true, and in a case that the identification information to be transmitted and/or received is not allowed, the third condition determination may be false. Note that conditions determining whether the third condition determination is true or false may not be limited to the above-described conditions.

Next, steps in a case that the third condition determination is true, in other words, each step of the procedure (A) of FIG. 9, will be described. The SMF selects the UPF to which the PDU session is established, transmits a session establishment request message to the selected UPF via the N4 interface (S906), and initiates the procedure (A) of FIG. 9.

Here, the SMF may select one or more UPFs based on each piece of identification information acquired based on the reception of the PDU session establishment request message, and/or the capability information of the network, and/or the subscription information, and/or the operator policy, and/or the status of the network, and/or the context already retained by the SMF. Note that, in a case that multiple UPFs are selected, the SMF may transmit the session establishment request message to each of the UPFs.

The UPF receives the session establishment request message from the SMF (S906) and creates context for the PDU session via the N4 interface. Furthermore, the UPF transmits a session establishment response message to the SMF via the N4 interface based on the reception of the session establishment request message and/or the creation of the context for the PDU session (S908).

The SMF receives the session establishment response message from the UPF via the N4 interface as a response message to the session establishment request message (S908). The SMF may perform address assignment of an address to be assigned to the UE based on the reception of the PDU session establishment request message and/or the selection of the UPF and/or the reception of the session establishment response message.

The SMF transmits a PDU session establishment accept message to the UE via the AMF based on the reception of the PDU session establishment request message, and/or the selection of the UPF, and/or the reception of the session establishment response message, and/or the completion of the address assignment of the address to be assigned to the UE (S910) (S912).

Specifically, in a case that the SMF transmits the PDU session establishment accept message to the AMF via the N11 interface (S910), the AMF that has received the PDU session establishment request message transmits an NAS message including the PDU session establishment accept message to the UE via the N1 interface (S912). Note that the PDU session establishment accept message is an NAS message, and may be a response message to the PDU session establishment request message. In addition, the PDU session establishment accept message can indicate that the establishment of the PDU session has been accepted.

Here, the SMF and the AMF may transmit the PDU session establishment accept message to indicate that the request of the UE using the PDU session establishment request has been accepted.

The SMF and the AMF may include the 23rd identification information in the PDU session establishment accept message and transmit the information. By transmitting the 23rd identification information, the SMF and the AMF may indicate the type of the PDU session to be mapped to a PDN connection at the time of a handover from the 5GS to the EPS, the handover allowed by the network. Furthermore, by transmitting the 23rd identification information, the SMF and the AMF may indicate whether the PDU session established in the present procedure can be mapped to the PDN connection at the time of the handover from the 5GS to the EPS.

Furthermore, the UE may authenticate or store the type of the PDU session that can be mapped to the PDN connection at the time of the handover from the 5GS to the EPS in a case that the 23rd identification information is received. Further, in a case that the 23rd identification information is received, the UE may recognize whether the PDU session established in the present procedure can be mapped to the PDN connection at the time of the handover from the 5GS to the EPS. and may store whether the established PDU session can be mapped to the PDN connection in association with the PDU session.

Furthermore, the SMF may transmit information indicating that some requests of the UE have been rejected by including the information in the PDU session accept message, or may indicate the cause of the rejection of some requests of the UE by transmitting the information indicating that some requests of the UE have been rejected. Furthermore, the UE may receive information indicating that some requests of the UE have been rejected to recognize the cause of the rejection of some requests of the UE. Note that the cause for rejection may be information indicating that the content indicated by the identification information that the SMF received is not allowed.

In a case that the NAS messages including PDU session establishment accept message is received from the AMF via the N1 interface (S912), the UE transmits a PDU session establishment complete messages to the SMF via the AMF (S914) (S916). The UE receives the PDU session establishment accept message to detect that the request of the UE using the PDU session establishment request has been accepted.

Specifically, the UE transmits the PDU session establishment complete message to the AMF via the N1 interface (S914). In a case that the PDU session establishment complete message is received from the UE, the AMF transmits the PDU session establishment complete message to the SMF via the N11 Interface (S916).

Noted that the PDU session establishment complete message that the AMF transmits to the SMF may be a response message to the PDU session establishment accept message transmitted from the SMF to the AMF in S910. In addition, the PDU session establishment complete message may be an NAS message. In addition, the PDU session establishment complete message may be a message indicating that the PDU session establishment procedure has been completed.

The SMF can perform second condition determination in a case that the PDU session establishment complete message is received from the AMF via the N1 interface (S916). The second condition determination is to determine a type of the message on the N4 interface to be transmitted and/or received. In a case that the second condition determination is true, in a case that the SMF transmits, via the N4 interface, a session change request message to the UPF (S918), the SMF receives a session modification accept message transmitted from the UPF as a response message (S920). In a case that the second condition determination is false, in a case that the SMF transmits, via the N4 interface, the session establishment request message to the UPF (S918), the SMF receives a session modification accept message transmitted from the UPF as a response message (S920).

Note that the second condition determination may be performed based on whether the session on the N4 interface for the PDU session has been established. For example, in a case that the session on the N4 interface for the PDU session is established, the second condition determination may be true, and in a case that the session on the N4 interface for the PDU session is not established, the second condition determination may be false. Conditions for determining true or false of the second condition determination need not be limited to the above-described conditions.

Each apparatus completes the procedure (A) in the PDU session procedure based on the transmission and/or reception of the PDU session establishment complete message, and/or the transmission and/or reception of the session change response message, and/or the transmission and/or reception of the session establishment response message. In a case that the procedure (A) in the present procedure is completed, the UE is in a state in which the PDU session for the DN is established.

Next, each step of the procedure (B) in the PDU session procedure will be described. The SMF transmits a PDU session establishment reject message to the UE via the AMF (S922) (S924). Specifically, the SMF transmits the PDU session establishment reject message to the AMF via the N11 interface (S922). Specifically, in a case that the PDU session establishment request message is received from the SMF via the N11 interface (S922), the AMF transmits the PDU session establishment reject message to the UE using the N1 interface (S924).

Note that, the PDU session establishment reject message may be an NAS message. In addition, the PDU session establishment reject message may be a message indicating that establishment of the PDU session has been rejected.

Here, the SMF may transmit the PDU session establishment reject message to indicate that the request of the UE using the PDU session establishment request has been rejected. Furthermore, the SMF may include information indicating the cause for the rejection in the PDU session establishment reject message and transmit the information, or may indicate the cause for the rejection by transmitting the cause for the rejection. Furthermore, the UE may receive the information indicating the cause for the rejection of the request of the UE to recognize the cause of the rejection of the request of the UE. Note that the cause for rejection may be information indicating that the content indicated by the identification information that the SMF received is not allowed.

The UE can receive the PDU session establishment reject message to recognize the rejection of the request of the UE made using the PDU session establishment request and the contents of various types of identification information included in the PDU session establishment reject message.

Figure 9:
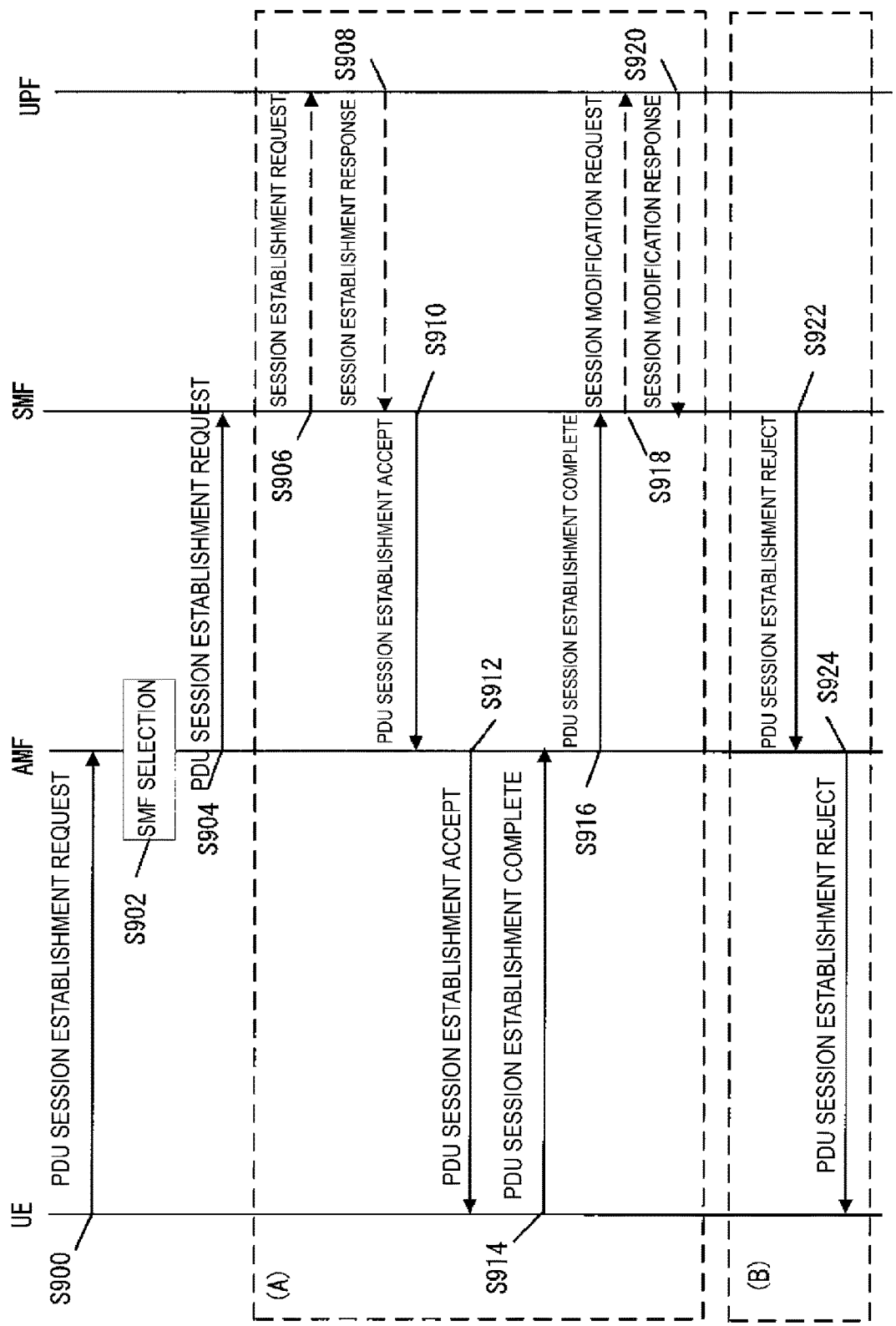
FIG. 9 is a diagram illustrating a PDU session establishment procedure in the 5GS.

Each apparatus completes the PDU session procedure based on the completion of the procedure (A) or (B) of FIG. 9. Note that each apparatus may transition to a state in which the PDU session is established based on the completion of the procedure (A) of FIG. 9, may recognize that the PDU session procedure has been rejected, or may transition to a state in which the PDU session is not established based on the completion of the procedure (B) of FIG. 9. Furthermore, each apparatus may perform processing based on the information transmitted and/or received in the PDU session procedure based on the completion of the PDU session procedure. The UE can communicate with the DN using the established PDU session by completing the procedure (A) of FIG. 9.

4.3. Handover Procedure from 5GS to EPS

Figure 10:
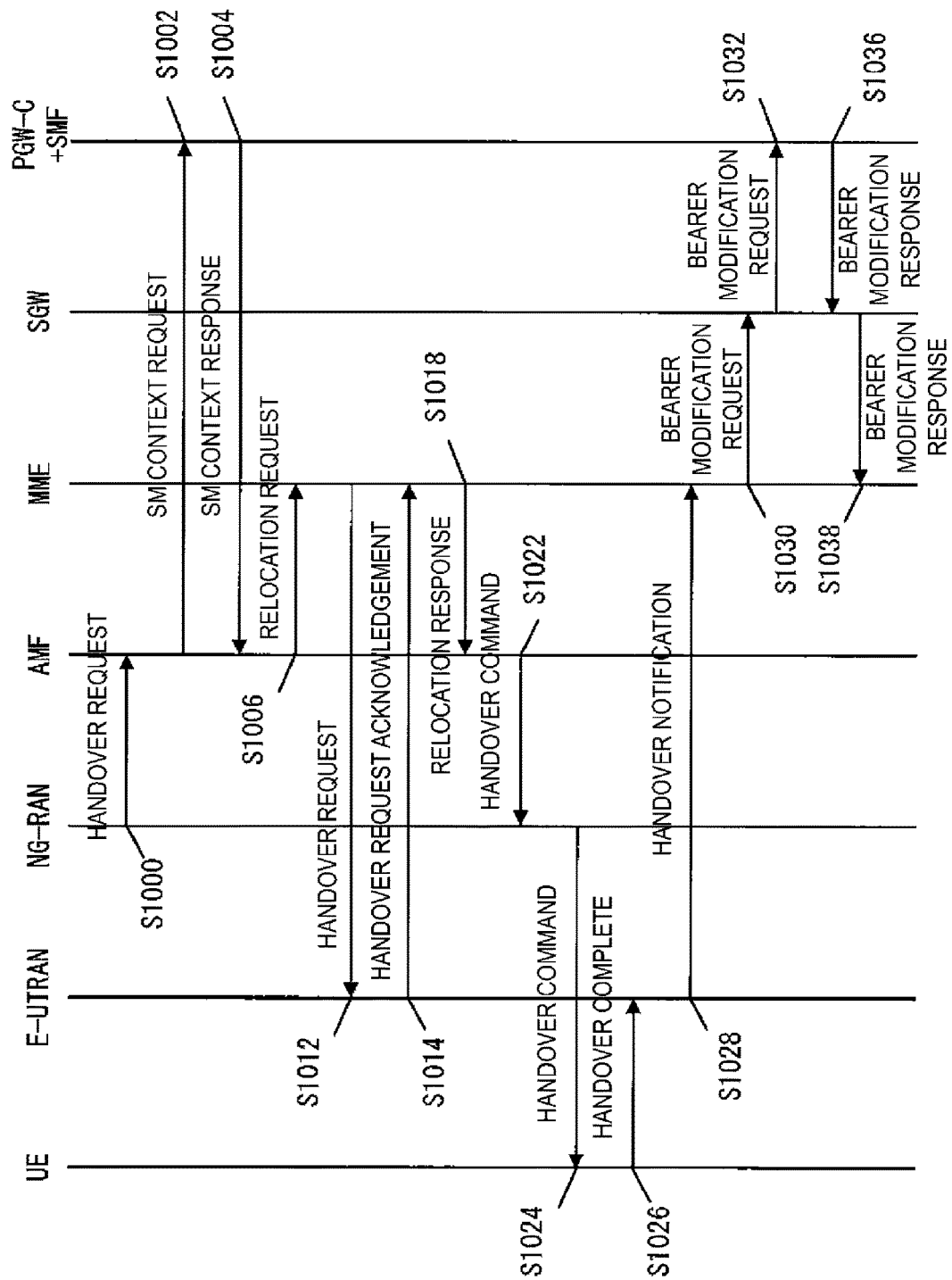
FIG. 10 is a sequence diagram of a handover from the 5GS to the EPS for a single-registration mode using an N26 interface.

Next, a handover procedure from the 5GS to the EPS for single registration using the N26 interface will be described using FIG. 10. The handover procedure can be performed in a case that the UE establishes a PDU session in the 5GS. Furthermore, the handover procedure may be performed in the case of a 5GMM connection mode and/or an EMM connection mode.

First, an NG-RAN (gNB) transmits a handover request to the AMF in a case that the UE is determined to be handed over to E-UTRAN (eNB) and/or the EPC and/or the EPS (S1000). The NG-RAN (gNB) may determine whether to perform a handover based on radio conditions between the NG-RAN (gNB) and the UE, a traffic load status in the 5GS, and the fact that a specific service is not provided in the 5GS and/or is provided only in the EPS. Note that the handover request includes a Target eNB ID for indicating the base station apparatus (eNB) serving as a handover destination.

Next, in a case that the AMF receives the handover request (S1000), the AMF identifies that the handover type is a handover to the E-UTRAN based on the Target eNB ID included in the handover request, and selects an MME based on capability information of the MME. Note that, in a case that the AMF selects an MME supporting non-IP, the AMF assigns an EPS Bearer ID corresponding to the default bearer, but in a case that the AMF selects an MME not supporting non-IP, the AMF does not assign an EPS Bearer ID corresponding to the default bearer.

Then, the AMF transmits an SM context request to the SMF (S1002). Note that the SM context request includes the capability information of the MME. In a case that the EPS Bearer ID corresponding to the default bearer is assigned, the AMF includes the EPS Bearer ID in the SM context request. In a case that the EPS Bearer ID corresponding to the default bearer is not assigned, the AMF does not include the EPS Bearer ID in the SM context request.

Next, in a case that the SM context request is received (S1002), the SMF checks the capability information of the MME included in the SM context request and the EPS Bearer ID corresponding to the default bearer. Here, the SMF can detect that MME supports non-IP by checking the capability information of the MME or based on the fact that the EPS Bearer ID corresponding to the default bearer is included. Additionally, the MME can detect that the MME does not support non-IP by checking the capability information of the MME or based on the fact that the EPS Bearer ID corresponding to the default bearer is not included.

In a case that the SMF detects that the MME supports non-IP, the SMF generates EPS bearer context for non-IP, and in a case that the SMF detects that the MME does not support non-IP, the SMF does not generate EPS bearer context for non-IP.

Additionally, in a case that the PDU session type indicating the type of the PDU session established in the 5GS is Ethernet or Unstructured, the SMF can store the PDN type by associating the type with non-IP (hereinafter also referred to as mapping). In addition, the SMF can map the PDN type as IPv4 in a case that the PDU session type is IPv4. In addition, the SMF can map the PDN type as IPv6 in a case that the PDU session type is IPv6.

In addition, in a case that mapping is performed as such, the SMF may set the validity time of the mapping (a period during which the mapping is maintained). The validity time of the mapping may use the 201st timer. In a case that the validity time of the mapping is set, the SMF can start (e.g., count down) the 201st timer at the same time as performing the mapping. In addition, the SMF can delete this mapping in a case that the 201st timer expires. In addition, the SMF can delete this mapping, for example, after a handover complete message is received from the AMF (S1424) in a case that a notification of the successful handover from the EPS to the 5GS is received before the 201st timer expires. In addition to the above, the SMF can maintain this mapping. In addition, in a case that the validity time of the mapping is set, the SMF can generate the 212th identification information.

In addition, in a case that the 5GS supports the NS, the SMF can map and store information for identifying the NS(S-NSSAI NSSAI, NSI, etc.). In this case, the SMF can generate the 211th identification information.

By configuring as described above, the PDU session type, the PDN type, and the information for identifying the NS can be mapped, and the validity time of this mapping can be set.

Note that, in a case that this mapping is performed, the SMF can consider the 13th identification information and/or the 23rd identification information, the 111th identification information, and/or the 112th identification information and/or the 113th identification information and/or the 201st identification information and/or the 202nd identification information and/or the 203rd identification information that are transmitted and/or received in the registration procedure and/or the PDU session establishment procedure.

For example, even in a case that the PDU session type is Ethernet or Unstructured, the SMF is not able to establish a PDN connection in the PDN type in a case that the SMF detects that the UE does not support non-IP as a type of the PDN connection (PDN type) established in the EPS based on the acquired 112th identification information and/or the 201st to 203rd identification information, and thus the mapping may not be performed. Also, even in a case that the PDU session type is Ethernet or Unstructured, the SMF is able to establish the PDN connection in the PDN type in a case that the SMF detects that the UE supports non-IP as the type of the PDN connection (PDN type) established in the EPS based on the acquired 112th identification information and/or the 201st to 203rd identification information, and thus the mapping can be performed.

In addition, the SMF may not perform the mapping in a case that mapping in the PDN type indicated by the acquired 111th identification information is not allowed in performing the mapping. In addition, the SMF may not perform the mapping in a case that mapping in the PDN type indicated by the acquired 11th identification information is allowed in performing the mapping.

In addition, the SMF may not perform the mapping in a case that the validity time indicated by the acquired 113th identification information is not allowed in performing the mapping. In addition, in a case that the SMF allows the validity time indicated by the acquired 113th identification information in performing the mapping, the SMF can set a value of the 201st timer to the value indicated by the 113th identification information.

Additionally, in a case that the 13th identification information is received in the registration procedure and/or the PDU session establishment procedure and the 23rd identification information is transmitted, the SMF can perform the mapping according to the 23rd identification information. That is, the PDU session associated with specific S-NSSAI and/or specific NSSAI and/or a specific DNN and/or a specific SSC mode may be mapped to the PDN connection. In other words, the PDU session associated with specific S-NSSAI and/or specific NSSAI and/or a specific DNN and/or a specific SSC mode may not be mapped to the PDN connection. Note that even in a case that mapping of the PDU session and PDN with the mapping is performed, information of the S-NSSAI and/or the DNN and/or the SSC mode associated with the PDU session may be continuously stored.

Note that the selection and determination of information indicating the type of a PDU session mapped to a PDN connection may be performed based on the 13th identification information, or may be performed based on a configuration of the network. Furthermore, the selection and determination of information indicating the type of a PDU session mapped to a PDN connection may be performed based on subscription information, or may be performed based on an operator policy.

In a case that mapping was not performed as described above, the SMF may transmit, to the AMF, an SM context response that is a response to the SM context request including the fact that mapping was not performed. In a case that such an SM context response is received, the AMF may transmit a Handover Rejection to the NG-RAN, and step S1006 and subsequent steps may not be performed.

Then, the SMF transmits an SM context response as a response to the SM context request to the AMF (S1004). Note that, in a case that EPS bearer context for non-IP is generated, the SMF may include the EPS bearer context for non-IP. In addition, in a case that the mapping is performed as described above, the SMF can include the 211th identification information and/or the 212th identification information in the SM context response.

In a case that the SM context response is received (S1004), the AMF transmits a relocation request to the MME (S1006). The relocation request may include, as information on the default bearer, EPS bearer context for non-IP included in the SM context response.

Next, in a case that the relocation request is received (S1006), the MME requests establishment of the default bearer by transmitting a handover request to the E-UTRAN (eNB) (S1012). The handover includes the EPS Bearer ID of the default bearer to be configured.

Next, the E-UTRAN (eNB) transmits a handover request acknowledgement to the MME as a response to the handover request (S1014). The handover request acknowledgement includes information indicating a configurable bearer and information indicating a non-configurable bearer.

Next, in a case that the handover request acknowledgement is received (S1014), the MME transmits a relocation response to the AMF as a response to the relocation request (S1018). The relocation response includes information indicating a configurable bearer.

Next, in a case that the relocation response is received, the AMF transmits a handover command to the UE via the NG-RAN (gNB) to indicate, to the UE, a handover to the E-UTRAN (S1022) (S1024). The handover command includes the EPS Bearer ID for identifying the bearer to be configured. In addition, the AMF can include, in the handover command, at least part of the information received from the SMF in the SM context response (including the 211th identification information and/or the 212th identification information)(S1004).

Next, in a case that the handover command is received (S1022) (S1024), the UE checks the information included in the handover command. The UE can check the EPS Bearer ID and delete a QoS flow without an assigned EPS Bearer ID. That is, the UE may not perform a handover to the EPS for a QoS flow within the PDU session established in the 5GS, and may not continue communication in the 5GS.

Additionally, in a case that the PDU session type indicating the type of the PDU session established in the 5GS is Ethernet or Unstructured based on the information included in the handover command, the UE can store the PDN type by associating the type with non-IP (mapping). In addition, the UE can map the PDN type as IPv4 in a case that the PDU session type is IPv4. In addition, the UE can map the PDN type as IPv6 in a case that the PDU session type is IPv6.

In addition, in a case that mapping is performed as such, the UE may set the validity time of the mapping (a period during which the mapping is maintained). The validity time of the mapping may use the 202nd timer. In a case that the validity time of the mapping is set, the UE can start (e.g., count down) the 202nd timer at the same time as performing the mapping. In addition, the UE can delete this mapping in a case that the 202nd timer expires. In addition, in a case that the handover from the EPS to the 5GS is successful even before the 202nd timer expires, for example, in a case that a handover command is received from the E-UTRAN (S1502), or after a handover acknowledgement message is transmitted to the NG-RAN (S1504), the UE can delete the mapping. In addition to the above, the UE can maintain this mapping. In addition, in a case that the validity time of the mapping is set, the SMF can generate the 213th identification information.

In addition, in a case that the 211th identification information is received and/or the UE supports an NS, the UE can map and store information for identifying the NS (S-NSSAI, NSSAI, NSI, etc.).

By configuring as described above, the PDU session type, the PDN type, and the information for identifying the NS can be mapped, and the validity time of this mapping can be set.

Next, in a case that UE successfully connects to the E-UTRAN (eNB), the UE transmits a handover complete message to the E-UTRAN (eNB) (S1026). In a case that the 213th identification information is generated, the UE can include the 213th identification information in the handover complete message.

Next, in a case that the handover complete message is received, the E-UTRAN (eNB) transmits to the MME a handover notification message (S1028). In a case that the 213th identification information is included in the handover complete message, the E-UTRAN (eNB) can include the 213th identification information in the handover notification message.

Next, in a case that the handover notification message is received, the MME transmits, to the SGW, a bearer modification request message to each PDN connection to report that the entity (MME) takes responsibility for all established bearers (S1030). In a case that the handover notification message includes the 213th identification information, the MME can include the 213th identification information in the bearer modification request message.

Next, the SGW transmits the bearer modification request message for each PDN connection to the PGW-C to report that the relocation is completed (S1032). In a case that the 213th identification information is included in the bearer modification request message from the MME, the SGW can include the 213th identification information in the bearer modification request message to be transmitted to the PGW-C.

Next, in a case that the bearer modification request message is received (S1032), the PGW-C can transfer the information included in the bearer modification request message to the SMF. In a case that the information included in the bearer modification request message is received from the PGW-C, the SMF can interpret the content.

In a case that a value of the 201st timer is set and the 213th identification information is included in the bearer modification request message in the mapping described above, the SMF can reset the 201st timer. Additionally, in a case that a value of the 201st timer is not set and the 213th identification information is included in the bearer modification request message in the above-described mapping, the SMF can set the value of the 201st timer to the value included in the 213th identification information and start the timer.

Next, the PGW-C transmits a bearer modification response message to the SGW as a response to the bearer modification request message (S1036).

Next, in a case that the bearer modification response message is received (S1036), the SGW transmits the bearer modification response message to the MME to report that the U-Plane path has been switched (S1038).

By performing as described above, the handover procedure from the 5GS to the EPS is completed. In a case that the handover procedure from the 5GS to the EPS is completed, the UE can transition to a state in which communication with the PDN using the PDN connection can be performed in the EPS. Furthermore, by performing the processing using the mapping in the SMF and the UE in the handover procedure, the UE can perform communication using the PDN connection in the EPS while maintaining the PDU session status originally established in the 5GS.

4.4. Handover Procedure from EPS to 5GS

Figure 14:
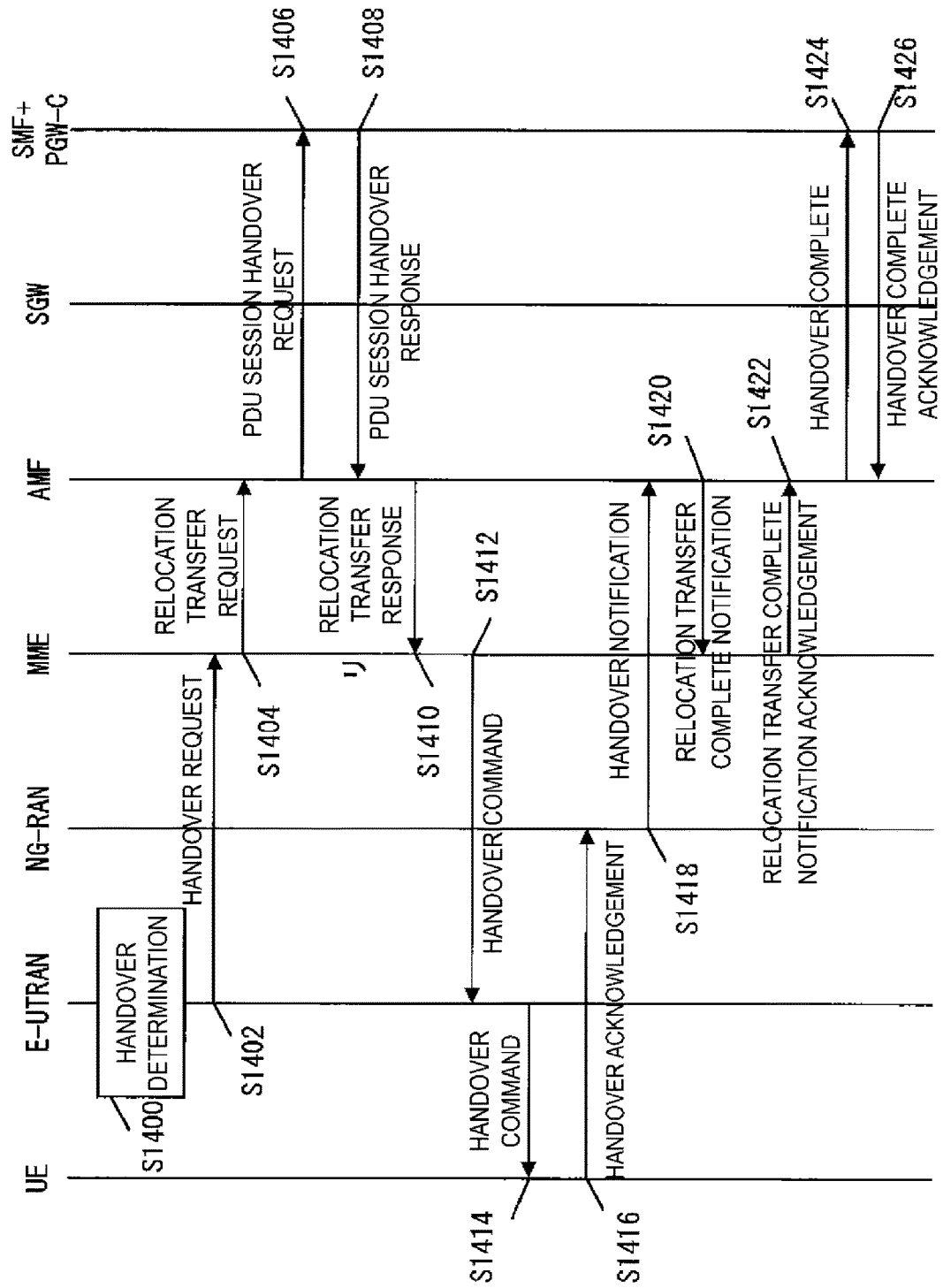
FIG. 14 is a sequence diagram of a handover from the EPS to the 5GS for a single-registration mode using the N26 interface.

Next, a handover procedure from the EPS to the 5GS for a single registration mode by using the N26 interface will be described using FIG. 14. The handover procedure can be performed in a case that a PDN connection is established by the UE in the EPS. Furthermore, the handover procedure may be performed in a case of a 5GMM connection mode and/or an EMM connection mode.

First, in a case that the E-UTRAN (eNB) determines that the UE is subject to a handover to the NG-RAN (gNB) (S1400), the E-UTRAN transmits a handover request to the MME (S1402). The E-UTRAN (eNB) may determine whether to perform a handover based on radio conditions between the E-UTRAN (eNB) and the UE, a traffic load status in the EPS, and the fact that a specific service is not provided in the EPS and/or is provided only in the 5GS, with respect to whether to perform a handover. Note that the handover request may include a PDN connection type (PDN type) for the EPS.

Next, the MME selects the AMF and transmits a relocation transfer request (Forward Relocation Request) (S1404). Note that the relocation transfer request may include the PDN type.

Next, in a case that the relocation transfer request is received (S1404), the AMF transmits a PDU session handover request to the SMF (S1406). Note that the PDU session handover request may include the PDN type.

Next, in a case that the SMF receives the PDU session handover request (S1406), the SMF checks the PDN type. This PDN type can be performed by checking the contents of the PDU session handover request.

Then, in a case that the PDN type is non-IP and the PDU session type corresponding to the PDN type is mapped as Ethernet, the SMF sets the type of the PDU session (PDU session type) established in the 5GS to Ethernet. In addition, in a case that the PDN type is non-IP and the PDU session type corresponding to the PDN type is mapped as Unstructured, the SMF sets the type of the PDU session (PDU session type) established in the 5GS to Unstructured. In addition, in a case that the PDN type is IPv4 and the PDU session type corresponding to the PDN type is mapped as IPv4, the SMF sets the type of the PDU session (PDU session type) established in the 5GS to IPv4. In a case that the PDN type is IPv6 and the PDU session type corresponding to the PDN type is mapped as IPv6, the SMF sets the type of the PDU session (PDU session type) established in the 5GS to IPv6.

Note that, in a case that the validity time of the mapping in the SMF is managed by the 201st timer, this operation can be performed as long as the 201st timer does not expire. In other words, in a case that the 201st timer expires, this operation cannot be performed.

In addition, in the mapping in the SMF, in a case that the PDN type and the PDU session types as well as information for identifying an NS (S-NSSAI, NSSAI, NSI, etc.) are also mapped, it is configured to establish a PDU session via a core network apparatus (e.g., the UPF) corresponding to the information for identifying the NS.

Further, in the mapping of the SMF, in a case that information identifying an SSC mode is also mapped, the stored SSC mode may be set to an SSC mode of the PDU session established in the 5GS.

As described above, mapping of the PDU session type, the PDN type, the information for identifying the NS, and the SSC mode can be used to communicate using the PDU session originally established in the 5GS.

Note that, although the mapping can be deleted at any timing after the operation described above is performed, it is preferable to delete the mapping, for example, after the handover complete message (S1424) is received from the AMF, for example, in a case that there is a notification that the handover from the EPS to the 5GS has succeeded.

Next, the SMF transmits, to the AMF, the PDU session handover response (S1408) as a response to the PDU session handover request (S1406). Note that the PDU session handover response may include information for identifying the PDU session type and the NS.

Next, the AMF transmits a relocation transfer response (Forward Relocation Response) to the MME (S1410) as a response to the relocation transfer request (S1404). Note that the relocation transfer response may include the information for identifying the PDU session type and the NS.

Next, the MME transmits a handover command to the E-UTRAN (eNB) (S1412). Note that the handover command may include the information for identifying the PDU session type and the NS.

Next, in a case that the handover command is received (S1412). the E-UTRAN (eNB) transmits the handover command to the UE to indicate a handover to the NG-RAN (gNB) (S1414). Note that the handover command may include the information for identifying the PDU session type and the NS.

Next, in a case that the handover command is received (S1414), the UE determines that the EPS bearer has been successfully handed over based on the information included in the handover command. The UE sets the type of the PDU session (PDU session type) to be established in the 5GS to Ethernet in a case that the PDN type is non-IP and the PDU session type corresponding to the PDN type is mapped as Ethernet. In addition, in a case that the PDN type is non-IP and the PDU session type corresponding to the PDN type is mapped as Unstructured, the UE sets the type of the PDU session (PDU session type) established in the 5GS to Unstructured. In addition, in a case that the PDN type is IPv4 and the PDU session type corresponding to the PDN type is mapped as IPv4, the UE sets the type of the PDU session (PDU session type) established in the 5GS to IPv4. In a case that the PDN type is IPv6 and the PDU session type corresponding to the PDN type is mapped as IPv6, the UE sets the type of the PDU session (PDU session type) established in the 5GS to IPv6.

Note that, in a case that the validity time of the mapping in the UE is managed by the 202nd timer, this operation can be performed as long as the 202nd timer does not expire. In other words, in a case that the 202nd timer expires, it is not possible to perform this operation.

In addition, in the mapping in the UE, in a case that the PDN type and the PDU session types as well as the information for identifying the NS (S-NSSAI, NSSAI, NSI, etc.) are also mapped, it is configured to establish a PDU session via a core network apparatus (e.g., the SMF and/or UPF) corresponding to the information for identifying the NS.

Further, in the mapping of the UE, in a case that information identifying an SSC mode is also mapped, the stored SSC mode may be set to an SSC mode of the PDU session established in the 5GS.

As described above, mapping of the PDU session type, the PDN type, the information for identifying the NS, and the SSC mode can be used to communicate using the PDU session originally established in the 5GS.

Note that, although the mapping can be deleted at any timing after the operation described above is performed, it is preferable to delete the mapping, for example, in a case that the handover from the EPS to the 5GS succeeds, for example, in a case that the handover command is received from the E-UTRAN (eNB) (S1414), or after a handover acknowledgement message is transmitted to the NG-RAN (gNB) (S1416).

Next, the UE synchronizes with the NG-RAN (eNB) as it moves from the E-UTRAN (eNB) and transmits a handover acknowledgement to the NG-RAN (gNB) (S1416).

Next, the NG-RAN (gNB) notifies the AMF of the fact that the UE has performed a handover to the NG-RAN by transmitting a handover notification (S1418).

Next, by receiving the handover notification, the AMF recognizes that the UE has performed the handover, and transmits a relocation transfer complete notification (Forward Relocation Complete Notification) to the MME to report that the AMF has recognized the handover of the UE (S1420).

Next, in a case that the relocation transfer complete notification is received, the MME transmits a relocation transfer complete notification acknowledgement (Forward Relocation Complete Notification ACK) to the AMF to report that the MME has recognized the handover of the UE (S1422).

Next, the AMF transmits a handover complete to the SMF (S1424) in a case that the relocation transfer complete notification acknowledgement is received.

Next, the SMF transmits a handover complete acknowledgement to the AMF (S1426) in a case that the handover complete is received.

In the above, the handover procedure from the EPS to the 5GS is completed. In a case that the handover procedure from the EPS to the 5GS is completed, the UE can transition to a state in which communication with the DN using the PDU session can be performed in the 5GS. Furthermore, by performing the processing using the mapping in the SMF and the UE in the handover procedure, the UE can perform communication in the PDU session status originally established in the 5GS. In addition, in the mapping in the SMF and the UE, in a case that the information for identifying the NS is also used, a PDU session via the core network apparatus (e.g., the UPF) corresponding to the information for identifying the NS can be established.

In addition, in the present embodiment, although it is assumed that the UE and the SMF retain the information regarding mapping, the present invention is not limited thereto. For example, apparatuses and functions other than the UE and the SMF, for example, PCF+PCRF, HSS+UDM, and the like, may retain the information regarding the mapping described above. In other words, in the handover procedure from the 5GS to the EPS, the SMF transmits the information regarding mapping to PCF+PCRF, HSS+UDM, and the like so that PCF+PCRF, HSS+UDM, and the like can store the information regarding mapping. Additionally, in the handover procedure from the EPS to the 5GS, the SMF can acquire the information regarding the mapping from PCF+PCRF, HSS+UDM, and the like, and communicate using the original PDU session.

5. Second Embodiment

Next, a second embodiment will be described using drawings. In the second embodiment, the UE first performs an Attach procedure in the EPS. Next, In the EPS, a PDN Connectivity procedure is performed to establish a PDN connection, and communication with the PDN using the PDN connection is performed. Next, the handover procedure from the EPS to the 5GS can be performed to switch at least a part of the PDN connection in the EPS to communication using a PDU session in the 5GS. Then, the UE can then perform a handover procedure from the 5GS to the EPS to perform communication using the PDN connection originally performed in the EPS. Hereinafter, each of the procedures will be described in the order described above.

Note that, in the present embodiment, a case in which a PDN and a DN are configured as the same network will be described as illustrated in FIG. 1. However, the contents described in the present embodiment are applicable even in a case that the PDN and the DN are configured as different networks.

Also, in the present embodiment, a case in which an HSS and a UDM, a PCF and a PCRF, an SMF and a PGW-C, a UPF and a PGW-U are each configured as the same device (i.e., the same physical hardware, or the same logical hardware, or the same software) as described in FIG. 2 will be described. However, the contents described in the present embodiment can also be applied even in a case that they are configured as different apparatuses (i.e., different physical hardware, or different logical hardware, or different software). For example, the apparatuses may transmit and/or receive data directly, transmit and/or receive data via an N26 interface between AMF-MME, or transmit and/or receive data via the UE.

5.1. Attach Procedure in EPS

Figure 11:
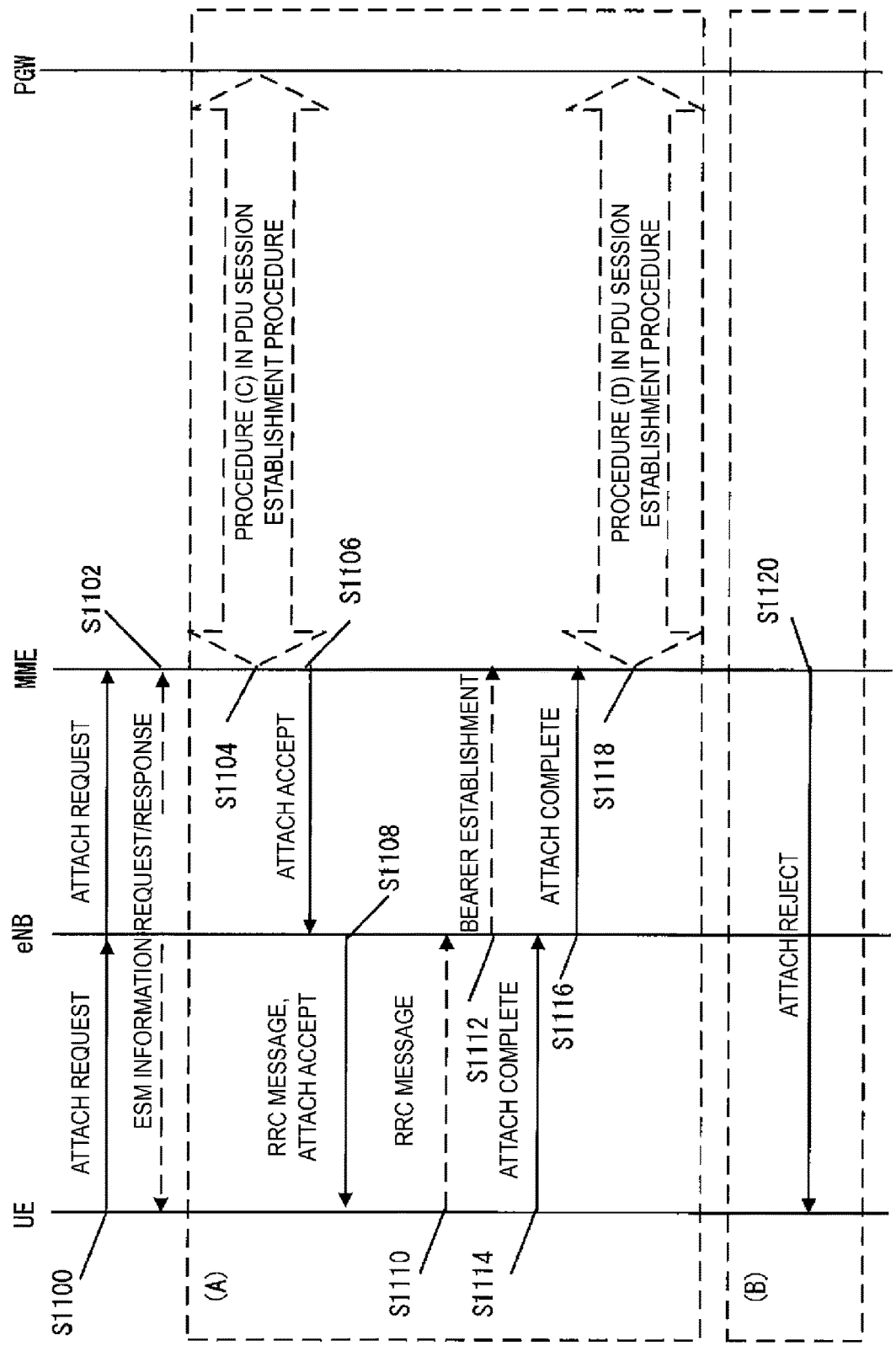
FIG. 11 is a diagram illustrating an attach procedure in the EPS.

First, an attach procedure in the EPS will be described using FIG. 11. The present procedure hereinafter refers to an attach procedure in the EPS. The present procedure is a procedure for the UE to be registered in the core network_A. Each step of the present procedure will be described below.

First, the UE transmits an attach request message to the MME via the eNB (S1100) to initiate an attach procedure. The UE may transmit the attach request message including the PDN connectivity request message, or may request to perform a PDN connectivity procedure in an attach procedure, by including the PDN connectivity request message.

Here, the UE may include one or more pieces of identification information of the 101st to the 103rd identification information in the attach request message. The UE may include the identification information in the attach request message to indicate the request of the UE.

By transmitting the 101st identification information, the UE can report a preference of a type of a PDU session (PDU session type) established in the 5GS at the time of a handover from the EPS to the 5GS. Specifically, the UE can specify, as the 101st identification information, any one of "Ethernet" or "Unstructured" or "IP" or "IPv4" or "IPv6."

In addition, by transmitting the 102nd identification information, the UE can report a type that the UE supports (i.e., a UE capability) as a type of a PDU session (PDU session type) established in the 5GS at the time of the handover from the EPS to the 5GS. Specifically, the UE can specify, as the 102nd identification information, any one of "Ethernet" or "Unstructured" or "IP" or "IPv4" or "IPv6."

Additionally, by transmitting the 103rd identification information, the UE can request a period during which PDN types and PDU session types are associated and stored (mapped). That is, by transmitting the 103rd identification information, the UE can request a period during which a relation between a PDN connection established in the EPS and a PDU session established thereafter in the 5GS in the handover procedure from the EPS to the 5GS is stored.

Note that the UE may transmit these pieces of identification information included in a control message different from the attach request message (e.g., an ESM information request/response message, etc.) (S1102).

The MME receives the attach request message and/or the control message different from the attach request message, and performs the first condition determination. The MME initiates the procedure (A) in the present procedure in a case that the first condition is true, and initiates the procedure (B) in the present procedure in a case that the first condition is false.

Note that the first condition determination may be performed based on the reception of the attach request message, and/or the identification information and/or subscription information, and/or operator policies included in the attach request message. For example, in a case that the network accepts a request of the UE, the first condition determination is true, and in a case that the network does not accept requests of the UE, the first condition determination may be false. Furthermore, the first condition determination may be true in a case that the network that is a registration destination of the UE and/or an apparatus within the network supports a function requested by the UE, and the first condition determination may be false in a case that the network and/or the apparatus does not support the function requested by the UE. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

Each step of the procedure of (A) in the present procedure will be described below. The MME performs the fourth condition determination, and initiates the procedure (A) in the present procedure. In the fourth condition determination, the MME determines whether the fourth condition is true or false. The MME initiates the procedure (C) in a PDN connectivity procedure in a case that the fourth condition is true, and omits the procedure in a case that the fourth condition is false (S1104).

Note that, in S1104, in a case that the procedure (C) in the PDN connectivity procedure with respect to the PGW (PGW-C) is performed, the MME may notify the PGW (PGW-C) of the identification information received in the attach request message. The PGW (PGW-C) can obtain the identification information received from the AMF.

Furthermore, the MME transmits an attach accept message to the eNB based on the reception of the attach request message and/or a session creation response message, and/or completion of the procedure (C) in the PDN connectivity procedure (S1106). Note that, in a case that a session creation reject message is received, the MME may not continue the procedure (A) in the present procedure and may initiate the procedure (B) in the present procedure.

The eNB receives the attach accept message and transmits an RRC message (e.g., which may be an RRC message such as an RRC Connection Reconfiguration message, an RRC Connection Setup message, or an RRC Direct Transfer message) and/or the attach accept message to the UE (S1108). Note that the attach accept message may be included in the RRC message and transmitted and/or received. In addition, in a case that the fourth condition is true, the MME may transmit the above-described PDN connectivity accept message included in the attach accept message, or may indicate that the PDN connectivity procedure has been accepted by including a PDN connectivity accept message.

Note that the MME may transmit the attach accept message to indicate that the request of the UE reported in the attach request message has been accepted. Furthermore, the MME may transmit information indicating that some requests of the UE have been rejected included in the attach accept message or may transmit information indicating that some requests of the UE have been rejected to indicate the cause of the rejection of some requests of the UE. Furthermore, the UE may receive information indicating that some requests of the UE have been rejected to recognize the cause of the rejection of some requests of the UE. Note that the cause for rejection may be information indicating that the content indicated by the identification information that the MME received is not allowed.

Here, the fourth condition determination is for the MME to determine whether to perform the PDN connectivity procedure. The fourth condition being true may be a case in which a PDN connectivity request message has been received, or may be a case in which the PDN connectivity procedure is also performed in the present procedure. In addition, the fourth condition being false may be a case in which the PDN connectivity request message has not been received, may be a case in which the PDN connectivity procedure is not performed in the present procedure, or may be a case in which the fourth condition is not determined to be true.

Then, in a case that the RRC message is received from the eNB, the UE transmits an RRC connection message (e.g., which may be an RRC message such as an RRC Connection Reconfiguration Complete message, an RRC Connection Setup Complete message, an RRC Direct Transfer message, or the like) to the eNB (S1110). The eNB receives the RRC message and transmits a bearer configuration message to the MME (S1112). Furthermore, the MME receives the bearer configuration message.

In a case that the attach accept message is received, the UE transmits an attach complete message to the MME through the eNB (S1114), (S1116). In addition, the MME receives the attach complete message.

Note that, by receiving the attach accept message, the UE can detect that the request of the UE reported in the attach request message has been accepted.

Furthermore, in a case that the fourth condition is true, the MME performs second condition determination. The second condition determination is for the MME to determine whether to request a modification of a bearer from the SGW. In a case that the second condition is true, the MME initiates and performs the procedure (D) in the PDN connectivity procedure (S1118). Each apparatus completes the procedure (A) in the present procedure, based on transmission and/or reception of the attach complete message and/or the completion of the procedure (D) in the PDN connectivity procedure.

Note that, in a case that a PDN connectivity accept message is received, the UE may include the above-described PDN connectivity complete message in the attach complete message and transmit the message, or may indicate completion of the PDN connectivity procedure, by including the PDN connectivity complete message.

Next, each step of the procedure (B) in the present procedure will be described. The MME transmits an attach reject message to the UE via the eNB and initiates the procedure (B) in the present procedure (S1120). Furthermore, the UE receives the attach reject message, and recognizes that the request of the UE has been rejected. Each apparatus completes the procedure (B) in the present procedure, based on transmission and/or reception of the attach reject message. Note that, in a case that the fourth condition is true, the MME may transmit the above-described PDN connectivity reject message included in the attach reject message, or may indicate that the PDN connectivity procedure has been rejected by including the PDN connectivity reject message. In that case, the UE may further receive the PDN connectivity reject message, or may authenticate that the PDN connectivity procedure has been rejected.

Note that, the MME may transmit the attach reject message to indicate that the request of the UE reported in the attach request message has been rejected. Furthermore, the MME may transmit the attach reject message including information indicating the cause for the rejection, or may indicate the cause for the rejection by transmitting the cause for the rejection. Furthermore, the UE may receive the information indicating the cause for the rejection of the request of the UE to recognize the cause of the rejection of the request of the UE. Note that the cause for rejection may be information indicating that the content indicated by the identification information that the MME received is not allowed.

Each apparatus completes the present procedure, based on completion of the procedure (A) or (B) in the present procedure. Note that each apparatus may transition to a state in which the UE is connected to the network and/or a registered state, based on the completion of the procedure (A) in the present procedure, may recognize that the present procedure has been rejected, or may transition to a state in which each apparatus is not able to be connected to the network, based on the completion of the procedure (B) in the present procedure. Transition to each state of each apparatus may be performed based on completion of the present procedure, or may be performed based on an establishment of a PDU session.

Furthermore, each apparatus may perform processing based on identification information transmitted and/or received in the present procedure, based on completion of the present procedure. For example, in a case that the information indicating that some requests of the UE have been rejected is transmitted and/or received, each apparatus may recognize the cause for the rejection of the request of the UE. In addition, each apparatus may perform the present procedure again, based on the cause for the rejection of the request of the UE, or may perform an attach procedure for the core network_A or another cell.

The above-described first condition determination to the fourth condition determination may be performed based on identification information, and/or subscription information, and/or an operator policy included in the attach request message. Conditions for determining whether the first condition to the fourth condition is true or false may not be limited to the above-described conditions.

In addition, for example, the third condition determination may be similar to the example of the above-described PDN connectivity procedure.

5.2. PDN Connectivity Procedure in EPS

Figure 12:
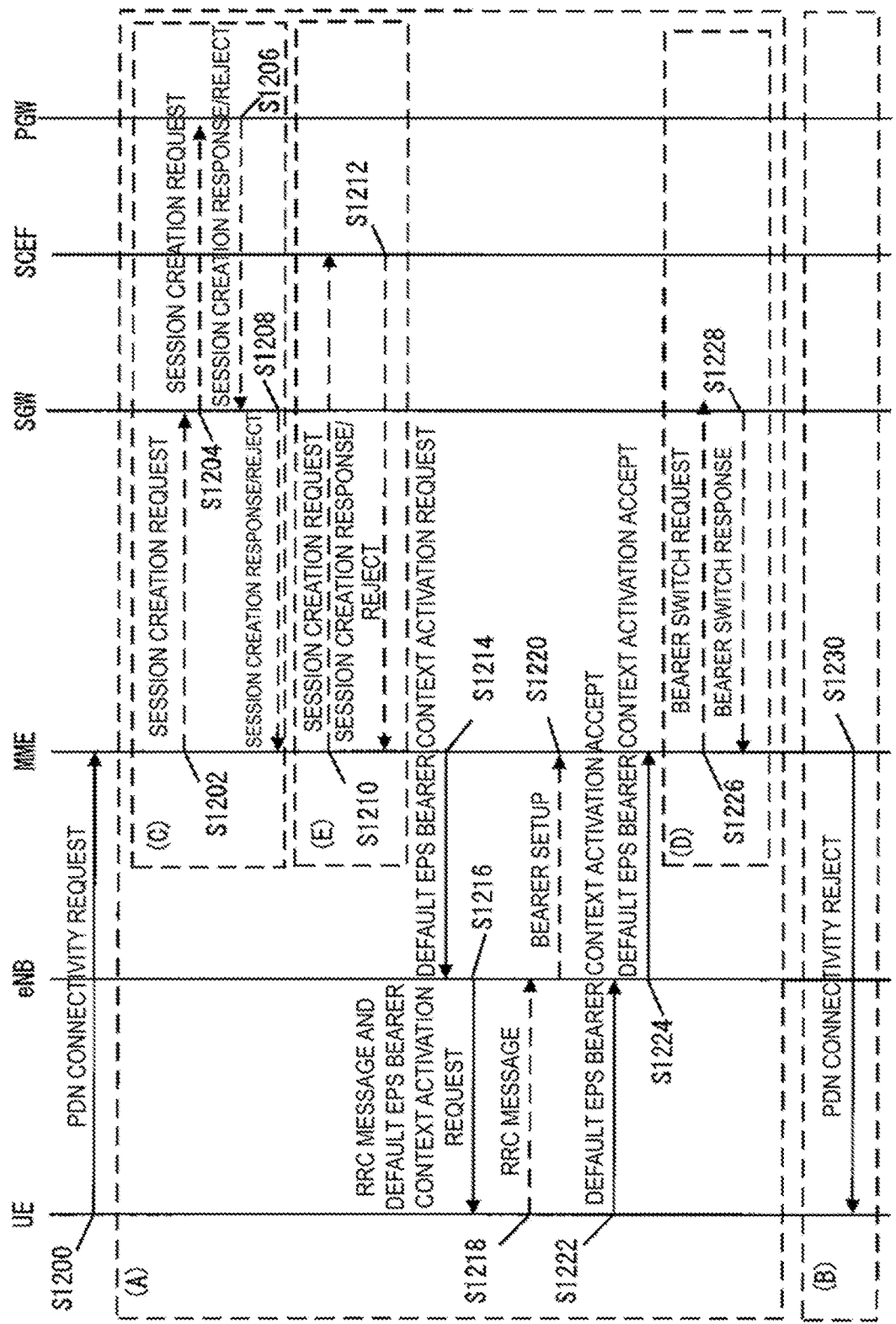
FIG. 12 is a diagram illustrating a PDN connectivity procedure in the EPS.

First, a PDN Connectivity procedure in the EPS will be described using FIG. 12. As follows, the present procedure refers to a PDN connectivity procedure. The present procedure is a procedure for each apparatus to establish a PDN connection. Note that each apparatus may perform the present procedure in a state after an attach procedure is completed, or may perform the present procedure in the attach procedure. In addition, each apparatus may initiate the present procedure at any timing after the attach procedure. In addition, each apparatus may establish a PDN connection based on completion of the PDN connectivity procedure. Furthermore, each apparatus may perform the present procedure multiple times to establish multiple PDN connections.

First, the UE transmits a PDN connectivity request message to the MME via the eNB (S1200) to initiate the PDN connectivity procedure. Note that the PDN connectivity request message is not limited to thereto, and may be a message for requesting establishment of a PDN connection.

Here, the UE may include one or more pieces of identification information of the 11th identification information and/or the 101st to the 103rd identification information in the PDN connectivity request message. The UE may include the identification information in the PDN connectivity request message to indicate a request of the UE.

The UE may transmit the 11th identification information to report an SSC mode of a PDU session established in the 5GS in a case that a handover from the EPS to the 5GS is performed. Specifically, the UE can specify, as the 11th identification information, any one of "SSC mode 1" or "SSC mode 2" or "SSC mode 3."

In addition, the UE may transmit the 11th identification information to indicate the SSC mode requested by the UE. That is, the UE transmits the 11th identification information to request also mapping of the SSC mode indicated in the 11th identification information in a case that a relation between a PDN connection established in the EPS and a PDU session thereafter established in the 5GS in the handover procedure from the EPS to the 5GS is stored (mapped).

By transmitting the 101st identification information, the UE can report a preference of a type of a PDU session (PDU session type) established in the 5GS at the time of a handover from the EPS to the 5GS. Specifically, the UE can specify, as the 101st identification information, any one of "Ethernet" or "Unstructured" or "IP" or "IPv4" or "IPv6."

In addition, by transmitting the 102nd identification information, the UE can report a type that the UE supports (i.e., a UE capability) as a type of a PDU session (PDU session type) established in the 5GS at the time of the handover from the EPS to the 5GS. Specifically, the UE can specify, as the 102nd identification information, any one of "Ethernet" or "Unstructured" or "IP" or "IPv4" or "IPv6."

Additionally, by transmitting the 103rd identification information, the UE can request a period during which PDN types and PDU session types are associated and stored (mapped). That is, by transmitting the 103rd identification information, the UE can request a period during which a relation between a PDN connection established in the EPS and a PDU session established thereafter in the 5GS in the handover procedure from the EPS to the 5GS is stored.

The MME receives a PDN connectivity request message, and performs the first condition determination. The first condition determination is for the MME to determine whether to accept a request of the UE. In the first condition determination, the MME determines whether the first condition is true or false. The MME initiates the procedure (A) in the present procedure in a case that the first condition is true, and initiates the procedure (B) in the present procedure in a case that the first condition is false. Note that steps in the case in which the first condition is false will be described below.

Note that the first condition determination may be performed based on reception of the PDN connectivity request message, and/or identification information and/or subscription information, and/or an operator policy included in the PDN connectivity request message. For example, in a case that the network accepts a request of the UE, the first condition determination is true, and in a case that the network does not accept requests of the UE, the first condition determination may be false. Furthermore, the first condition determination may be true in a case that the network that is a registration destination of the UE and/or an apparatus within the network supports a function requested by the UE, and the first condition determination may be false in a case that the network and/or the apparatus does not support the function requested by the UE. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

Steps in a case that the first condition is true, i.e., each step of the procedure (A) in the present procedure, will be described below. The MME performs the procedure (C) or (E) in the present procedure, and initiates the procedure (A) in the present procedure. In a case that the PGW is selected as an external gateway, the MME may perform the procedure (C) in the present procedure and initiate the procedure (A) in the present procedure, or in a case that the SCEF is selected as an external gateway, the MME may perform the procedure (E) in the present procedure and initiate the procedure (A) in the present procedure. First, each step of the procedure (C) in the present procedure will be described. The MME transmits a session creation request message to the SGW and initiates the procedure (C) in the present procedure (S1202). Furthermore, the SGW that has received the session creation request message transmits the session creation request message to the PGW (S1204).

Here, the MME and the SGW may include one or more pieces of identification information of the 11th identification information and/or the 101st to the 103rd identification information in the session creation request message (S1202) (S1204) and may transfer the request of the UE using the PDN connectivity request message to the PGW (PGW-C) by including the identification information.

Furthermore, the PGW receives the session creation request message and performs third condition determination. Note that the third condition determination is for the PGW to determine whether to accept the request of the UE. The third condition being true may be a case in which the request of the UE is accepted and a case in which the request of the UE is allowed. In addition, the third condition being false may be a case in which the request of the UE is rejected and a case in which the third condition is determined not to be true.

In addition, the third condition determination may be performed by another apparatus (e.g., the PCRF), rather than the PGW. In that case, the PGW performs an IP-CAN session establishment procedure with the PCRF. More specifically, the PGW transmits a request message in an IP-CAN session establishment procedure to the PCRF. Furthermore, the PCRF receives the request message in the IP-CAN session establishment procedure, determines the third condition, and transmits a response message in the IP-CAN session establishment procedure to the PGW. Furthermore, the PGW receives the response message in the IP-CAN session establishment procedure and recognizes the result of the third condition determination.

Note that, in a case that the PCRF performs the third condition determination, the PGW may perform the third condition determination, based on the result of the third condition determination received from the PCRF. For example, in a case that the PCRF accepts the request of the UE, the PCRF and the PGW may regard the third condition as being true, and in a case that the PCRF rejects the request of the UE, the PCRF and the PGW may regard the third condition as being false.

In the third condition determination, the PGW determines whether the third condition is true or false. In a case that the third condition is true, the PGW transmits a session creation response message to the SGW (S1206).

Furthermore, the SGW that has received the session creation response message transmits the session creation response message to the MME (S1208). In addition, the MME receives the session creation response message.

In addition, the PGW and the SGW may transmit the session creation response message to indicate that the request of the UE has been allowed.

In addition, in a case that the third condition is false, the PGW transmits a session creation reject message to the SGW (S1206). Furthermore, the SGW that has received the session creation reject message transmits the session creation reject message to the MME (S1208). Note that the session creation reject message may be a session creation response message including the cause for rejection (Reject cause).

In addition, the PGW may transmit the session creation reject message to indicate that the request of the UE has been rejected.

Each apparatus completes the procedure (C) in the present procedure, based on the transmission and/or reception of the session creation response message and/or the session creation reject message.

In addition, each step of the procedure (E) in the present procedure will be described. The MME transmits a session creation request message to the SCEF and initiates the procedure (E) in the present procedure (S1210).

Here, the MME may transmit the session creation request message to transfer the request of the UE using the PDN connectivity request message.

In addition, the SCEF receives the session creation request message and performs the fourth condition determination. Note that the fourth condition determination is for the SCEF to determine whether to accept the request of the UE. The fourth condition being true may be a case in which the request of the UE is accepted and a case in which the request of the UE is allowed. In addition, the fourth condition being false may be a case in which the request of the UE is rejected and a case in which the fourth condition is determined not to be true.

In the fourth condition determination, the SCEF determines whether the fourth condition is true or false. In a case that the fourth condition is true, the SCEF transmits a session creation response message to the MME (S1212). In addition, the MME receives the session creation response message.

In addition, the SCEF may transmit the session creation response message to indicate that the request of the UE has been allowed.

In addition, in a case that the fourth condition is false, the SCEF transmits a session creation reject message to the MME (S1212). Note that the session creation reject message may be a session creation response message including the cause for rejection (Reject cause).

In addition, the SCEF may transmit the session creation reject message to indicate that the request of the UE has been rejected.

Each apparatus completes the procedure (E) in the present procedure, based on the transmission and/or reception of the session creation response message and/or the session creation reject message.

The MME transmits the PDN connectivity accept message to the eNB based on the reception of the session creation response message and/or the completion of the procedure (C) or (E) in the present procedure (S1214). Note that, in a case that a session creation reject message is received, the MME may not continue the procedure (A) in the present procedure and may initiate the procedure (B) in the present procedure. In addition, the PDN connectivity accept message may be a default EPS bearer context activation request (Activate default EPS bearer context request) message. In addition, the PDN connectivity accept message may be a response message to the PDN connectivity request message, but is not limited to this, and may be a message to accept the PDN connectivity request message.

Here, the MME may include the 21st identification information in the PDN connectivity accept message, or may indicate that the request of the UE using the PDN connectivity request message has been allowed, by including the identification information.

The eNB receives the PDN connectivity accept message, and transmits an RRC message (e.g., which may be an RRC message such as an RRC Connection Reconfiguration message, an RRC Connection Setup message, an RRC Direct Transfer message, etc.) and/or the PDN connectivity accept message to the UE (S1216). Note that the PDN connectivity accept message may be included in the RRC message and transmitted and/or received.

Furthermore, each apparatus may transmit and/or receive the 21st identification information to indicate the SSC mode selected by the network. Specifically, the MME and/or the PGW-C may transmit the 21st identification information to report the SSC mode of the PDU session established in the 5GS at the time of the handover from the EPS to the 5GS. Specifically, the MME and/or the PGW-C may specify, as the 21st identification information, any one of "SSC mode 1" or "SSC mode 2" or "SSC mode 3." Furthermore, in a case that the 21st identification information is received, the UE may store the information SSC mode indicated by the 21st identification information in association with the PDN connection established in the present procedure, and may configure the SSC mode of the PDU session established in 5GS in the 21st identification information at the time of the handover from the EPS to the 5GS.

Furthermore, the MME may transmit information indicating that some requests of the UE have been rejected included in the PDN connectivity accept message or may transmit information indicating that some requests of the UE have been rejected to indicate the cause of the rejection of some requests of the UE. Furthermore, the UE may receive information indicating that some requests of the UE have been rejected to recognize the cause of the rejection of some requests of the UE. Note that the cause for rejection may be information indicating that the contents indicated by the identification information that the MME and/or the PGW-C received are not allowed.

In a case that the RRC message is received, the UE transmits an RRC message (e.g., which may be an RRC message such as an RRC Connection Reconfiguration Complete message, an RRC Connection Setup Complete message, an RRC Direct Transfer message, or the like) to the eNB (S1218). The eNB receives the RRC message and transmits a bearer configuration message to the MME (S1220). Furthermore, the MME receives the bearer configuration message.

In a case that the PDN connectivity accept message is received, the UE transmits a PDN connectivity complete (PDN Connectivity complete) message to the MME via the eNB (S1222) (S1224). Furthermore, the MME receives the PDN connectivity complete message and performs the second condition determination. Note that the PDN connectivity complete message may be a default EPS bearer context activation accept (Activate default EPS bearer context accept) message. In addition, the PDN connectivity complete message may be a response message to the PDN connectivity accept message and is not limited to this, and may be a message indicating that the PDN connectivity procedure is completed.

The second condition determination is for the MME to determine whether to request a modification of a bearer from the SGW. In a case that the second condition is true, the MME initiates the procedure (D) in the present procedure. In addition, in a case that the second condition determination is false, the MME does not perform the procedure (D) in the present procedure.

Each step of the procedure (D) in the present procedure will be described below. The MME transmits a bearer switch request message to the SGW (S1226) and initiates the procedure (D) in the present procedure. Furthermore, the SGW receives the bearer switch request message and transmits a bearer switch response message to the MME (S1228). Furthermore, the MME receives the bearer switch response message and completes the procedure (D) in the present procedure. Furthermore, each apparatus completes the procedure (A) in the present procedure based on transmission and/or reception of the PDN connectivity complete message in a case that the second condition determination is false, and based on completion of the procedure (D) in the present procedure in a case that the second condition determination is true.

Next, each step of the procedure (B) in the present procedure will be described. The MME transmits a PDN connectivity reject message to the UE via the eNB (S1230) and initiates the procedure (B) in the present procedure. Furthermore, the UE receives the PDN connectivity reject message and recognizes that the request of the UE has been rejected. Each apparatus completes the procedure (B) in the present procedure, based on the transmission and/or reception of the PDN connectivity reject message. The PDN connectivity reject message may include an appropriate cause for rejection. Note that a PDN connectivity reject message may be a response message for a PDN connectivity request message but not limited to this, and may be a message to reject a PDN connectivity request message.

Additionally, the MME may transmit the PDN connectivity reject message to indicate that the request of the UE has been rejected. Furthermore, the MME may transmit information indicating the cause for rejection included in the PDN connectivity reject message or may indicate the cause for the rejection by transmitting the cause for the rejection. Furthermore, the UE may receive the information indicating the cause for the rejection of the request of the UE to recognize the cause of the rejection of the request of the UE. Note that the cause for rejection may be information indicating that the contents indicated by the identification information that the MME and/or the PGW-C received are not allowed.

Furthermore, the UE may receive the PDN connectivity reject message to recognize that the request of the UE using the PDN connectivity request has been rejected and the contents of various types of identification information included in the PDN connectivity reject message.

Each apparatus completes the present procedure, based on completion of the procedure (A) or (B) in the present procedure. Note that each apparatus may transition to a state in which the PDU session is established, based on the completion of the procedure (A) in the present procedure, may recognize that the present procedure has been rejected, or may transition to a state in which the PDU session is not established, based on the completion of the procedure (B) in the present procedure.

Furthermore, each apparatus may perform processing based on identification information transmitted and/or received in the present procedure, based on completion of the present procedure. For example, in a case that the information indicating that some requests of the UE have been rejected is transmitted and/or received, each apparatus may recognize the cause for the rejection of the request of the UE. In addition, each apparatus may perform the present procedure again, based on the cause of the rejection of the request of the UE, or may perform the PDN connectivity procedure in another cell.

The previously described first condition determination to the fourth condition determination may be performed based on identification information, and/or subscription information, and/or operator policies included in a PDN connectivity request message. Conditions that true or false of the first condition to the fourth condition is determined may not be limited to the previously described conditions.

For example, the first condition and/or the third condition and/or the fourth condition may be true in a case that the UE requests establishment of a session and the network allows the request. In addition, the first condition, and/or the third condition, and/or the fourth condition may be false in a case that the UE requests establishment of a session and the network does not allow the request. In addition, the first condition and/or the third condition and/or the fourth condition may be false in a case that the network as a connection destination of the UE and/or an apparatus within the network does not support establishment of a session that the UE requests.

5.3. Handover Procedure from EPS to 5GS

Next, a handover procedure from the EPS to the 5GS for a single registration mode by using the N26 interface will be described using FIG. 14. The handover procedure can be performed in a case that the UE establishes a PDN connection in the EPS. Furthermore, the handover procedure may be performed in the case of a 5GMM connection mode and/or an EMM connection mode.

First, in a case that the E-UTRAN (eNB) determines that the UE is subject to a handover to the NG-RAN (gNB) (S1400), the E-UTRAN transmits a handover request to the MME (S1402). The E-UTRAN (eNB) may determine whether to perform a handover based on radio conditions between the E-UTRAN (eNB) and the UE, a traffic load status in the EPS, and the fact that a specific service is not provided in the EPS and/or is provided only in the 5GS, with respect to whether to perform a handover. Note that the handover request may include a PDN type in the EPS.

Next, the MME selects the AMF and transmits a relocation transfer request (Forward Relocation Request) (S1404). Note that the relocation transfer request may include a PDN type in the EPS.

Next, in a case that the relocation transfer request is received (S1404), the AMF transmits a PDU session handover request to the SMF (S1406). Note that the PDU session handover request may include the PDN type in the EPS.

Next, the SMF receives a PDU session handover request (S1406). The SMF confirms the PDN type in the EPS. The PDN type in the EPS may be acquired by checking the contents of the PDU session handover request or may be acquired from the PGW-C. Additionally, the SMF may acquire the 11th identification information from the PGW-C.

In addition, the SMF can store PDU session types by associating the types with Ethernet or Unstructured (also referred to as mapping below) in a case that the PDN type indicating the type of the PDN connection established in the EPS is non-IP. In addition, the SMF can map a PDU session type as IPv4 in a case that the PDN type is IPv4. In addition, the SMF can map the PDU session type as IPv6 in a case that the PDN type is IPv6.

In addition, the SMF can map the SSC mode for each PDU session as the SSC mode 1, the SSC mode 2, or the SSC mode 3.

In addition, in a case that mapping is performed as such, the SMF may set the validity time of the mapping (a period during which the mapping is maintained). The validity time of the mapping may use the 201st timer. In a case that the validity time of the mapping is set, the SMF can start (e.g., count down) the 201st timer at the same time as performing the mapping. In addition, the SMF can delete this mapping in a case that the 201st timer expires. In addition, in a case that the SMF receives a notification that the handover from the 5GS to the EPS is successful before the 201st timer expires, for example, the SMF may delete this mapping, for example, after the bearer modification request message is receive from the SGW (S1032). In addition to the above, the SMF can maintain this mapping. In addition, in a case that the validity time of the mapping is set, the SMF can generate the 212th identification information.

In addition, in a case that the 5GS supports the NS, the SMF can map and store information for identifying the NS(S-NSSAI NSSAI, NSI, etc.). In this case, the SMF can generate the 211th identification information.

By configuring as described above, the PDU session type, the PDN type, the information for identifying the NS, and the SSC mode can be mapped, and an validity time of this mapping can be set.

Note that, in a case that this mapping is performed, the SMF can consider information indicated by the 11th identification information and/or the 101st identification information and/or the 102nd identification information and/or the 103rd identification information that are acquired in the attach procedure and/or PDN connectivity procedure.

For example, even in a case that the PDN type is non-IP, in a case that the SMF detects that the UE does not support either Ethernet or Unstructured as the type of the PDU session (PDU session type) established in the 5GS based on the acquired 102nd identification information, it is not possible to establish the PDU session of the PDU session type, and thus the SMF may not perform mapping. In addition, even in a case that the PDN type is non-IP, in a case that the SMF detects that the UE does not support Ethernet but supports Unstructured as the type of the PDU session (PDU session type) established in the 5GS based on the acquired 102nd identification information, the SMF can map the PDU session type to Ethernet. In addition, even in a case that the PDN type is non-IP, in a case that the UE detects that Ethernet is not supported but Unstructured is supported as the type of the PDU session (PDU session type) established in the 5GS based on the acquired 102nd identification information, the SMF can map the PDU session type to Unstructured.

In addition, in a case that the mapping in the PDU session type indicated by the acquired 101st identification information is not allowed in a case that this mapping is performed, the SMF may not perform the mapping. In addition, in a case that the mapping in the PDU session type indicated by the acquired 101st identification information is allowed in a case that this mapping is performed, the SMF can perform the mapping.

In addition, in a case that the validity time indicated by the acquired 103rd identification information is not allowed in a case that this mapping is performed, the SMF may not perform the mapping. In addition, in a case that the validity time indicated by the acquired 103rd identification information is allowed in a case that this mapping is performed, the SMF can configure a value of the 201st timer to the value indicated by the 103rd identification information.

In addition, in a case that this mapping is performed, the SMF may set the SSC mode of the PDU session established in the 5GS to an SSC mode associated with a target PDN connection or to a default SSC mode. Note that the SSC mode associated with the PDN connection may be the SSC mode indicated by the 11th identification information transmitted and/or received in the PDN connectivity procedure, or may be an SSC mode determined for each APN. Furthermore, the SSC mode associated with the PDN connection may be an SSC mode configured by a network, or an SSC mode determined based on an operator policy and/or subscription information.

In a case that mapping was not performed as described above, the SMF may perform transmission to AMF, including the fact that mapping was not performed in a PDU session handover response, which is a response to the PDU session handover. In a case that such a PDU session handover response is received, the AMF may transmit, to the MME, a relocation transfer response indicating that mapping was not possible. In a case that such a relocation transfer response is received, the MME may transmit to the E-UTRAN, a handover rejection (Handover Reject) and each step from S1414 may not be performed.

Next, the SMF transmits, to the AMF, the PDU session handover response (S1408) as a response to the PDU session handover request (S1406). In addition, in a case that the mapping is performed, the SMF can include the SSC mode associated with the 211th identification information and/or the 212th identification information and/or each PDU session in the PDU session handover response.

Next, the AMF transmits a relocation transfer response (Forward Relocation Response) message to the MME (S1410) as a response to the relocation transfer request (S1404). In addition, the AMF can include at least a part of information received in the PDU session handover response (including the 211th identification information and/or the 212th identification information, and/or the SSC mode associated with each PDU session) in the relocation transfer response.

Next, the MME transmits a handover command to the E-UTRAN (eNB) (S1412). In addition, the MME can include at least a part of the information received in the relocation transfer response message (including the 211th identification information and/or the 212th identification information and/or the SSC mode associated with each PDU session) in the handover command.

Next, in a case that the handover command is received (S1412). the E-UTRAN (eNB) transmits the handover command to the UE to indicate a handover to the NG-RAN (gNB) (S1414). In addition, the E-UTRAN (eNB) can include at least a part of information received in the handover command received from the MME (including the 211th identification information and/or the 212th identification information, and/or the SSC mode associated with each PDU session) in the handover command to be transmitted to the UE.

Next, in a case that the handover command is received (S1414), the UE checks the information included in the handover command. Then, the UE determines that the handover of the EPS bearer has succeeded based on the information included in the handover command.

Additionally, in a case that the PDN type indicating the type of the PDN connection established in the EPS is non-IP based on the information included in the handover command, the UE can store the PDU session type by associating the type with Ethernet or Unstructured (also referred to as mapping below). In addition, the UE can map the PDU session type as IPv4 in a case that the PDN type is IPv4. In addition, the UE can map the PDU session type as IPv6 in a case that the PDN type is IPv6.

In addition, the UE can map the SSC mode for each PDU session as the SSC mode 1, the SSC mode 2, or the SSC mode 3 based on the information included in the handover command.

Note that in a case that the SSC mode of the PDU session established in the handover procedure from the EPS to the 5GS is an unexpected SSC mode, the UE may reconfigure the SSC mode by establishing a PDU session of the requested SSC mode after disconnecting the target PDU session.

In addition, in a case that mapping is performed as such, the UE may set the validity time of the mapping (a period during which the mapping is maintained). The validity time of the mapping may use the 202nd timer. In a case that the validity time of the mapping is set, the UE can start (e.g., count down) the 202nd timer at the same time as performing the mapping. In addition, the SMF can delete this mapping in a case that the 202nd timer expires. In addition, the UE can delete the mapping in a case that a handover from the 5GS to the EPS is successful even before the 202nd timer expires, for example, in a case that the handover command is received from the NG-RAN (gNB) (S1024) or after a handover complete message is transmitted to the E-UTRAN (eNB) (S1026). In addition to the above, the UE can maintain this mapping. In addition, in a case that an validity time of the mapping is set, the UE can generate the 213th identification information. Note that a value of the 202nd timer may be set to the value indicated by the 212th identification information.

In addition, in a case that the 211th identification information is received and/or the UE supports an NS, the UE can map and store information for identifying the NS (S-NSSAI, NSSAI, NSI, etc.).

By configuring as described above, the PDU session type, the PDN type, the information for identifying the NS, and the SSC mode can be mapped, and an validity time of this mapping can be set.

Next, the UE synchronizes with the NG-RAN (eNB) as it moves from the E-UTRAN (eNB) and transmits a handover acknowledgement message to the NG-RAN (gNB) (S1416). In a case that the 213th identification information is generated, the UE can include the 213th identification information in the handover acknowledgement message.

Then, the NG-RAN (gNB) transmits a handover notification message to notify the AMF of the fact that the UE has performed a handover to the NG-RAN (S1418). In a case that the 213th identification information is included in the handover acknowledgement message, the NG-RAN (gNB) can include the 213th identification information in the handover notification message.

Next, the AMF receives the handover notification message to recognize that the UE has been handed over, and transmits a relocation transfer complete notification (Forward Relocation Complete Notification) message to notify the MME of the fact that the handover of the UE has recognized (S1420).

Next, in a case that the relocation transfer complete notification message is received, the MME transmits the relocation transfer complete notification acknowledgement (Forward Relocation Complete Notification ACK) message to notify the AMF of the fact that the MME has recognized the handover of the UE (S1422).

Next, in a case that the relocation transfer complete notification acknowledgement message is received, the AMF transmits a handover complete message to the SMF (S1424). In a case that the handover notification message includes the 213th identification information, the AMF can include the 213th identification information in the handover complete message.

Next, in a case that the handover complete message is received, the SMF checks the information included in the handover complete message.

In a case that a value of the 201st timer is set and the 213th identification information is included in the handover complete message in the mapping described above, the SMF can reset the 201st timer. Additionally, in a case that a value of the 201st timer is not set and the 213th identification information is included in the handover complete message in the above-described mapping, the SMF can set the value of the 201st timer to the value included in the 213th identification information and start the timer.

Then, the SMF transmits a handover complete acknowledgement message to the AMF (S1426).

In the above, the handover procedure from the EPS to the 5GS is completed. In a case that the handover procedure from the EPS to the 5GS is completed, the UE can transition to a state in which communication with the DN using the PDU session can be performed in the 5GS. Furthermore, by performing the processing using the mapping in the SMF and the UE in the handover procedure, the UE can perform communication using the PDU session in the 5GS while maintaining the status of the PDN connection originally established in the EPS.

5.4. Handover Procedure from 5GS to EPS

Next, a handover procedure from the 5GS to the EPS for a single registration mode (single-registration mode) using the N26 interface will be described using FIG. 10. The handover procedure can be performed in a case that a PDU session is established by the UE in the 5GS. Furthermore, the handover procedure may be performed in the case of a 5GMM connection mode and/or an EMM connection mode.

First, an NG-RAN (gNB) transmits a handover request to the AMF in a case that the UE is determined to be handed over to E-UTRAN (eNB) and/or the EPC and/or the EPS (S1000). The NG-RAN (gNB) may determine whether to perform a handover based on radio conditions between the NG-RAN (gNB) and the UE, a traffic load status in the 5GS, and the fact that a specific service is not provided in the 5GS and/or is provided only in the EPS. Note that the handover request includes a Target eNB ID indicating the base station apparatus (eNB) serving as a handover destination. Note that the handover request may include the type of a PDU session (PDU session type) in the 5GS.

Next, in a case that the AMF receives the handover request (S1000), the AMF identifies that the handover type is a handover to the E-UTRAN based on the Target eNB ID included in the handover request, and selects an MME based on capability information of the MME. Note that, in a case that the AMF selects an MME supporting non-IP, an EPS Bearer ID corresponding to the default bearer is assigned, but in a case that the AMF selects an MME not supporting non-IP, an EPS Bearer ID corresponding to the default bearer is not assigned.

Then, the AMF transmits an SM context request to the SMF (S1002). Note that the SM context request includes the capability information of the MME. In a case that the EPS Bearer ID corresponding to the default bearer is assigned, the AMF includes the EPS Bearer ID in the SM context request. In a case that the EPS Bearer ID corresponding to the default bearer is not assigned, the AMF does not include the EPS Bearer ID in the SM context request. Note that the SM context request may include the type of the PDU session (PDU session type) in the 5GS.

Next, in a case that the SM context request is received (S1002), the SMF checks the capability information of the MME included in the SM context request and the EPS Bearer ID corresponding to the default bearer. Here, the SMF can detect that MME supports non-IP by checking the capability information of the MME or based on the face that the EPS Bearer ID corresponding to the default bearer is included. Additionally, the MME can detect that the MME does not support non-IP by checking the capability information of the MME or based on the fact that the EPS Bearer ID corresponding to the default bearer is not included.

In a case that the SMF detects that the MME supports non-IP, the SMF generates EPS bearer context for non-IP, and in a case that the SMF detects that the MME does not support non-IP, the SMF does not generate EPS bearer context for non-IP.

Then, in a case that the PDU session type is Ethernet and the PDN type corresponding to the PDU session type is mapped as non-IP, the SMF sets the type of the PDN connection (PDN type) established in the EPS to Ethernet. In addition, in a case that the PDU session type is Unstructured and the PDN type corresponding to the PDU session type is mapped as non-IP, the SMF sets the type of the PDN connection (PDN type) established in the EPS to Unstructured. In addition, in a case that the PDU session type is IPv4 and the PDN type corresponding to the PDU session type is mapped as IPv4, the SMF sets the type of the PDN connection (PDN type) established in the EPS to IPv4. In addition, in a case that the PDU session type is IPv4 and the PDN type corresponding to the PDU session type is mapped as IPv6, the SMF sets the type of the PDN connection (PDN type) established in the EPS to IPv6.

Note that, in a case that the validity time of the mapping in the SMF is managed by the 201st timer, this operation can be performed as long as the 201st timer does not expire. In other words, in a case that the 201st timer expires, it is not possible to perform this operation.

As described above, using mapping between the PDU session type and the PDN type enables communication using the PDN connection originally established in the EPS.

Note that, although the mapping can be deleted at any timing after the operation described above is performed, it is preferable to delete the mapping, for example, in a case that there is a notification that the handover from the 5GS to the EPS has succeeded, for example, after the bearer modification request message (S1032) is received from the SGW.

Then, the SMF transmits an SM context response as a response to the SM context request to the AMF (S1004). Note that, in a case that EPS bearer context for non-IP is generated, the SMF may include the EPS bearer context for non-IP. In addition, the SM context response may include the PDN type.

Next, in a case that the SM context response is received (S1004), the AMF transmits a relocation request to the MME (S1006). The relocation request may include, as information on the default bearer, EPS bearer context for non-IP included in the SM context response.

Next, in a case that the relocation request is received (S1006), the MME requests establishment of the default bearer by transmitting a handover request to the E-UTRAN (eNB) (S1012). The handover includes the EPS Bearer ID of the default bearer for which a configuration is necessary.

Next, the E-UTRAN (eNB) transmits a handover request acknowledgement to the MME as a response to the handover request (S1014). The handover request acknowledgement includes information indicating a configurable bearer and information indicating a non-configurable bearer.

Next, in a case that the handover request acknowledgement is received (S1014), the MME transmits a relocation response to the AMF as a response to the relocation request (S1018). The relocation response includes information indicating a configurable bearer. In addition, the relocation response may include the PDN type.

Next, in a case that the relocation response is received, the AMF transmits a handover command to the UE via the NG-RAN (gNB) to indicate, to the UE, a handover to the E-UTRAN (S1022) (S1024). The handover command includes the EPS Bearer ID for identifying the configurable bearer. In addition, the AMF can also include at least a part of the information (including the PDN type) received in the SM context response (S1004) in the handover command.

Next, in a case that the handover command is received (S1022) (S1024), the UE checks the information included in the handover command. The UE may confirm the PDN type included in the handover command. The UE can check the EPS Bearer ID and delete a QoS flow without an assigned EPS Bearer ID. That is, the UE may not perform a handover to the EPS for a QoS flow within the PDU session established in the 5GS, and may not continue communication in the 5GS.

In addition, in a case that the PDU session type is Ethernet and the PDN type corresponding to the PDU session type is mapped as non-IP, the UE sets the type of the PDN connection (PDN type) established in the EPS to Ethernet. In addition, in a case that the PDU session type is Unstructured and the PDN type corresponding to the PDU session type is mapped as non-IP, the UE sets the type of the PDN connection (PDN type) established in the EPS to Unstructured. In addition, in a case that the PDU session type is IPv4 and the PDN type corresponding to the PDU session type is mapped as IPv4, the UE sets the type of the PDN connection (PDN type) established in the EPS to IPv4. In addition, in a case that the PDU session type is IPv4 and the PDN type corresponding to the PDU session type is mapped as IPv6, the UE sets the type of the PDN connection (PDN type) established in the EPS to IPv6.

Note that, in a case that the validity time of the mapping in the UE is managed by the 202nd timer, this operation can be performed as long as the 202nd timer does not expire. In other words, in a case that the 202nd timer expires, it is not possible to perform this operation.

As described above, using mapping between the PDU session type and the PDN type enables communication using the PDN connection originally established in the EPS.

Note that, although the mapping can be deleted at any timing after the above operations are performed, it is preferable to delete the mapping, for example, in a case that a handover from the 5GS to the EPS is successful, for example, in a case that a handover command is received from the NG-RAN (gNB) (S1024) or after a handover complete message is transmitted to the E-UTRAN (eNB) (S1026).

Next, in a case that UE successfully connects to the E-UTRAN (eNB), the UE transmits a handover complete message to the E-UTRAN (eNB) (S1026).

Next, in a case that the handover complete message is received, the E-UTRAN (eNB) transmits to the MME a handover notification message (S1028).

Next, in a case that the handover notification message is received, the MME transmits, to the SGW, a bearer modification request message to each PDN connection to report that the entity (MME) takes responsibility for all established bearers (S1030).

Next, the SGW transmits the bearer modification request message for each PDN connection to the PGW-C to report that relocation is finished (S1032).

Next, in a case that the bearer modification request message is received (S1032), the PGW-C can transfer the information included in the bearer modification request message to the SMF. In a case that the information included in the bearer modification request message is received from the PGW-C, the SMF can interpret the content.

Next, the PGW-C transmits a bearer modification response message to the SGW as a response to the bearer modification request message (S1036).

Next, in a case that the bearer modification response message is received (S1036), the SGW transmits the bearer modification response message to the MME to report that the U-Plane path has been switched (S1038).

By performing as described above, the handover procedure from the 5GS to the EPS is completed. In a case that the handover procedure from the 5GS to the EPS is completed, the UE can transition to a state in which communication with the PDN using the PDN connection can be performed in the EPS. In addition, by performing processing using the mapping in the SMF and the UE in the handover procedure, the UE can perform communication in the status of the PDN connection originally established in the EPS.

In addition, in the present embodiment, although it is assumed that the UE and the SMF retain the information regarding mapping, the present invention is not limited thereto. For example, apparatuses and functions other than the UE and the SMF, for example, PCF+PCRF, HSS+UDM, and the like, may retain the information regarding the mapping described above. In other words, in the handover procedure from the EPS to the 5GS, the SMF transmits the information regarding mapping to PCF+PCRF, HSS+UDM, and the like so that PCF+PCRF, HSS+UDM, and the like can store the information regarding mapping. Additionally, in the handover procedure from the 5GS to the EPS, the SMF can acquire the information regarding the mapping from PCF+PCRF, HSS+UDM, and the like, and communicate using the original PDN connection.

6. Third Embodiment

Next, a third embodiment of the present invention will be described using drawings. In the third embodiment, the UE first carries out the registration procedure in the 5GS. Note that, in the 5GS, prior to initiating the registration procedure, the UE may perform the attach procedure in the EPS or the PDN connectivity procedure. Next, in the 5GS, the UE performs a PDU session establishment procedure to establish a PDU session and communication with the DN using the PDU session. Next, in the case of an EMM non-connection mode, the UE performs a Tracking Area Update Procedure in the EPS. In a case that the tracking area update procedure is performed and rejected, the attach procedure and/or the PDN connectivity procedure may be performed to establish a PDN connection and communication can be performed using the PDN connection. Hereinafter, each of the procedures will be described in the order described above.

Note that, in the present embodiment, a case in which a PDN and a DN are configured as the same network will be described as illustrated in FIG. 1. However, the contents described in the present embodiment are applicable even in a case that the PDN and the DN are configured as different networks.

Also, in the present embodiment, a case in which an HSS and a UDM, a PCF and a PCRF, an SMF and a PGW-C, a UPF and a PGW-U are each configured as the same device (i.e., the same physical hardware, or the same logical hardware, or the same software) as described in FIG. 2 will be described. However, the contents described in the present embodiment can also be applied even in a case that they are configured as different apparatuses (i.e., different physical hardware, or different logical hardware, or different software). For example, the apparatuses may transmit and/or receive data directly, transmit and/or receive data via an N26 interface between AMF-MME, or transmit and/or receive data via the UE.

6.1. Registration Procedure in 5GS

First, the registration procedure in the 5GS will be described with reference to FIG. 8, however, description of the procedure may be omitted because the procedure has the same contents as that described in Section 4.1. of the first embodiment.

Note that the AMF may include an information element indicating the presence or absence of the N26 interface, which is an interface between the 5GC and the EPC, in the registration accept message during the present registration procedure. Additionally, the UE may authenticate the presence or absence of the N26 interface based on the received information element. Furthermore, in a case that there is not the N26 interface, the tracking area update procedure in the present embodiment may be replaced with the attach procedure.

6.2. PDU Session Establishment Procedure in 5GS

Next, a PDU Session establishment procedure in the 5GS will be described with reference to FIG. 9, however, description of the procedure may be omitted because the procedure has the same contents as that described in Section 4.2. of the first embodiment.

Note that, in a case that the PDU session establishment procedure is completed, the UE can transition to a 41st state. In a case that the UE moves from the communication area of the 5GS to the communication area of the EPS, the UE can transition to the 31st state. Further, the UE may transition from the 41st state to the 31st state by changing the connection destination from the 5GC to the EPC. Further, the UE may transition from the 41st state to the 31st state by switching the mode of the UE from an N1 mode to an S1 mode. Note that conditions of the status of the UE for transitioning from the 41st state to the 31st state are not limited thereto.

6.3. Tracking Area Update Procedure in EPS

Next, an overview of the tracking area Update procedure will be described. The present procedure hereinafter refers to a tracking area update procedure. The present procedure is a procedure to update location registration information of the UE in the network (the access network, and/or the core network_A), and/or to give a regular notification of a status of the UE from the UE to the network, and/or to update specific parameters related to the UE in the network. In a case that a PDN connection is established, the UE can perform the present procedure at any timing. The tracking area update procedure can be performed in a case that the UE is in the 31st state. In addition, the UE can periodically perform the present procedure. Note that the UE may initiate the present procedure based on the transition to the 31st state, or may initiate the present procedure based on movement of the UE.

Figure 13:
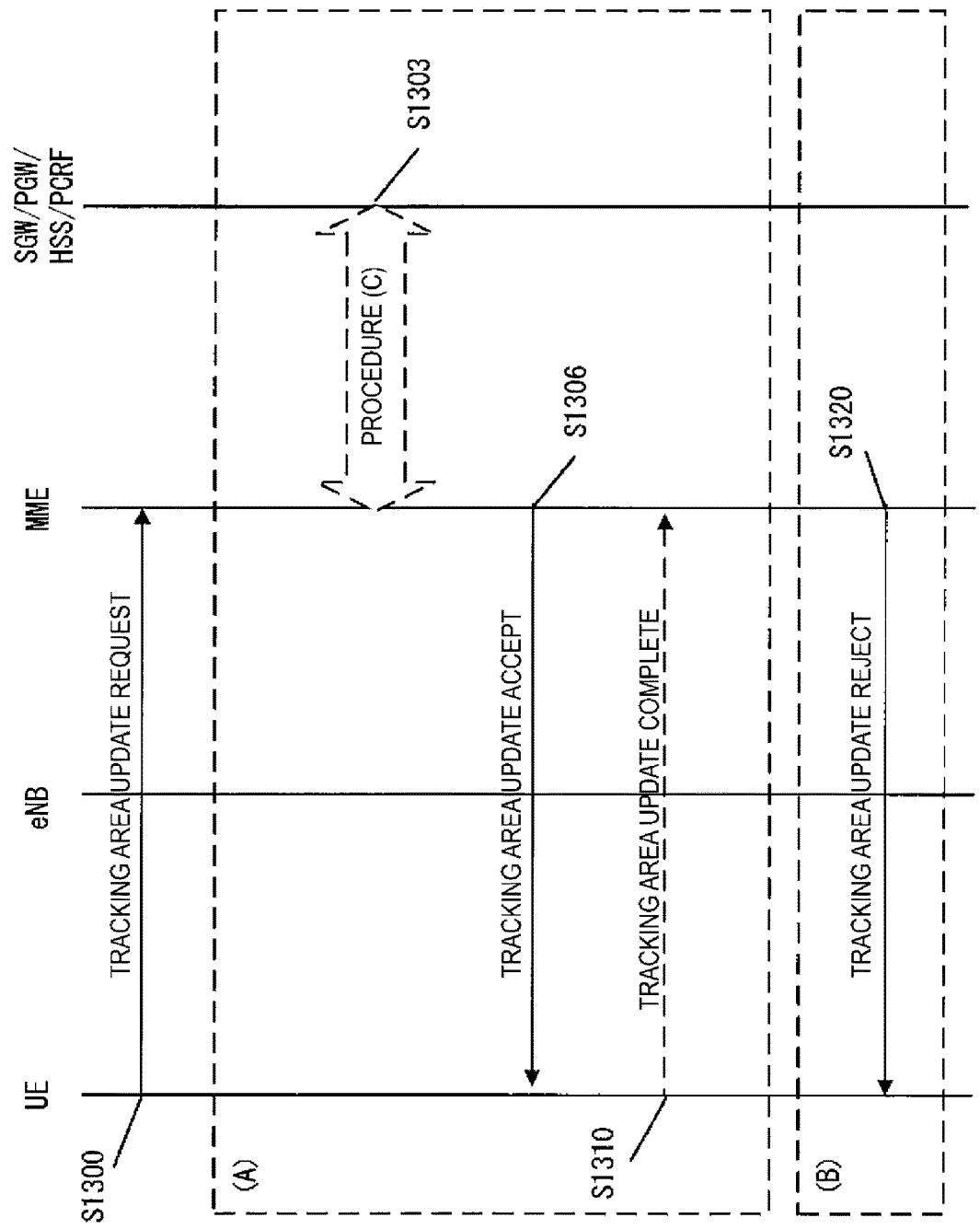
FIG. 13 is a diagram illustrating a tracking area update procedure in the EPS.

With reference to FIG. 13, an example of a procedure for performing the tracking area update procedure will be described. Each step of the present procedure will be described below. First, the UE transmits a tracking area update request message to the MME via the eNB (S1300) and initiates the tracking area update procedure.

Here, the UE may transmit a tracking area update request message to indicate a request of the UE. Additionally, in a case that the tracking area update request message is transmitted, the UE can transition to the 34th state.

The MME receives the tracking area update request message, and performs the first condition determination. In the first condition determination, the MME determines whether the first condition is true or false. The MME initiates the procedure (A) in the present procedure in a case that the first condition is true, and initiates the procedure (B) in the present procedure in a case that the first condition is false. Note that steps in the case in which the first condition is false will be described below.

Furthermore, the first condition determination may be performed based on the reception of the tracking area update request message, identification information and/or subscription information, and/or an operator policy included in the tracking area update request message. For example, in a case that the network accepts a request of the UE, the first condition determination is true, and in a case that the network does not accept requests of the UE, the first condition determination may be false. Furthermore, the first condition determination may be true in a case that the network that is a registration destination of the UE and/or an apparatus within the network supports a function requested by the UE, and the first condition determination may be false in a case that the network and/or the apparatus does not support the function requested by the UE. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

Steps in a case that the first condition is true, i.e., each step of the procedure (A) in the present procedure, will be described below. The MME performs the fourth condition determination, and initiates the procedure (A) in the present procedure. In the fourth condition determination, the MME determines whether the fourth condition is true or false. The MME initiates the procedure (C) in the present procedure in a case that the fourth condition is true, and omits the procedure (C) in a case that the fourth condition is false (S1303).

Here, the fourth condition determination is intended to determine whether or there is a need for a procedure for modifying and/or adding and/or deleting a PDN connection.

Here, the MME may transmit a message in the procedure (C) in the present procedure to transfer the request of the UE to each apparatus.

Furthermore, the MME performs the third condition determination after completion of the procedure (C). Here, the third condition determination is intended to determine whether the MME accepts the request of the UE, and the third condition determination may be determined based on information received from any apparatus in the procedure (C). In the third condition determination, the MME determines whether the third condition is true or false.

The MME transmits a tracking area update accept message to the UE via the eNB (S1306) the procedure (C) in the present procedure in a case that the third condition is true, and the MME stops the procedure (A) in the present procedure and initiates the procedure (B) in the present procedure in a case that the third condition is false. The tracking area update accept message may include an appropriate cause for acceptance. Note that the tracking area update accept message may be a response message to the tracking area update request message, however, the tracking area update accept message is not limited to this, and may be a message for accepting a request for a tracking area update.

Here, the MME may transmit the tracking area update accept message to indicate that the request of the UE has been accepted.

In a case that the UE receives the tracking area update accept message, the UE transmits a tracking area update complete message to the MME via the eNB (S1310). Each apparatus completes the procedure (A) in the present procedure, based on transmission and/or reception of a tracking area update complete message.

Note that the UE may transition to the 31st state based on the reception of the tracking area update accept message. Furthermore, the UE may initiate the PDN connectivity procedure to establish the PDN connection corresponding to the PDU session established in the 5GC after the completion of the present procedure.

Next, each step of the procedure (B) in the present procedure will be described. The MME transmits a tracking area update reject message to the UE via the eNB (S1320). Furthermore, the UE receives the tracking area update reject message and recognizes that the request of the UE using the tracking area update request message has been rejected. Each apparatus completes the procedure (B) in the present procedure, based on transmission and/or reception of the tracking area update reject message. The tracking area update reject message may include an appropriate cause for rejection. Note that the tracking area update reject message may be a response message to the tracking area update request message, however, the tracking area update reject message is not limited to this, and may be a message for rejection the request for a tracking area update.

Here, the MME may include one or more pieces of the 31st identification information to the 35th identification information in the tracking area update reject message, or may indicate that the request of the UE has been rejected, by including these pieces of identification information.

More specifically, the MME may include the 31st identification information and/or 34th identification information and/or 35th identification information in the tracking area update reject message in a case that the MME has the N26 interface that is the interface between the EPC and the 5GC. Furthermore, in a case that the MME does not have the N26 interface, the MME may include the 32nd identification information and/or the 33rd identification information and/or the 34th identification information and/or the 35th identification information in the tracking area update reject message and transmit the information.

Note that the UE_A 10 may transmit an attach request message to the EPC or may transition to the 31st state based on reception of the 31st identification information and/or the 35th identification information including the meaning indicated by the 31st identification information. Furthermore, the UE_A 10 may transmit, to the EPC, a PDN connectivity request message including the 12th identification information indicating a handover, or may transmit the PDN connectivity request message included in the attach request message based on the reception of the 31st identification information and/or the 35th identification information including the meaning indicated by the 31st identification information. Furthermore, the UE may initiate the PDN connectivity procedure to establish the PDN connection corresponding to the PDU session established in the 5GC after the completion of the present procedure.

Furthermore, the UE_A 10 may transmit the attach request message to the EPC or may transition to the 31st state based on the reception of the 32nd identification information and/or the 35th identification information including the meaning indicated by the 32nd identification information. Furthermore, the UE_A 10 may transmit, to the EPC, a PDN connectivity request message including the 12th identification information indicating an initial request, or may include the PDN connectivity request message in the attach request message and transmit the message based on the reception of the 32nd identification information and/or the 35th identification information including the meaning indicated by the 32nd identification information. Furthermore, the UE may initiate the PDN connectivity procedure to establish the PDN connection corresponding to the PDU session established in the 5GC after the completion of the present procedure.

Furthermore, the UE_A 10 may transmit the attach request message to the EPC or may transition to the 32nd state based on the reception of the 33rd identification information and/or the 35th identification information including the meaning indicated by the 33rd identification information. Furthermore, the UE_A 10 may transmit, to the EPC, the PDN connectivity request message including the 12th identification information indicating an initial request, or may include the PDN connectivity request message in the attach request message and transmit the message based on the reception of the 33rd identification information and/or the 35th identification information including the meaning indicated by the 33rd identification information. In addition, the UE_A 10 may delete retained capability information (Capability) for the 5GC, may delete capability information for the N1 mode, or may delete radio capability information for the N1 mode based on the reception of the 33rd identification information and/or the 35th identification information including the meaning indicated by the 33rd identification information.

Furthermore, the UE_A 10 may transition to the 43rd state based on the reception of the 34th identification information and/or the 35th identification information including the meaning indicated by the 34th identification information. Furthermore, the UE_A 10 may delete retained capability information (Capability) for the EPC, may delete capability information for the S1 mode, or may delete radio capability information for the S1 mode based on the reception of the 34th identification information and/or the 35th identification information including the meaning indicated by the 34th identification information. Furthermore, the UE_A 10 may attempt to connect to a 5G Access Network or attempt to connect to the 5GC based on the reception of the 34th identification information and/or the 35th identification information including the meaning indicated by the 34th identification information.

Each apparatus completes the present procedure, based on completion of the procedure (A) or (B) in the present procedure. Furthermore, each apparatus may perform processing based on the identification information transmitted and/or received in the present procedure, based on the completion of the present procedure.

The previously described first condition determination, and/or the third condition determination, and/or the fourth condition determination may be performed based on identification information, and/or subscription information, and/or an operator policy included in the tracking area update request message. Conditions with which true or false of the first condition, and/or the third condition, and/or the fourth condition is determined may not be limited to the previously described conditions.

For example, the first condition, and/or the third condition, and/or the fourth condition may be true in a case that the UE requests a tracking area update and the network allows the request. In addition, the first condition, and/or the third condition, and/or the fourth condition may be false in a case that the UE requests a tracking area update but the network does not allow the request. Furthermore, the first condition, and/or the third condition, and/or the fourth condition may be false in a case that the network serving as the connection destination of the UE and/or an apparatus within the network do not support the tracking area update requested by the UE.

7. Fourth Embodiment

Now, a fourth embodiment will be described below using drawings. In the fourth embodiment, the UE first performs an attach procedure in the EPS. Note that, in the EPS, prior to initiating the attach procedure, the UE may perform the registration procedure, the PDU session establishment procedure, or the tracking area update procedure in the 5GS. Next, by performing the PDN connectivity procedure, a PDN connection is established and communication is performed with the PDN using the PDN connection in the EPS. Next, in the case of the 5GMM non-connection mode, the UE performs the registration procedure in the 5GS. Note that, in a case that the registration procedure is performed and rejected, the UE may perform the registration procedure again to establish a PDU session and perform communication using the PDU session. Hereinafter, each of the procedures will be described in the order described above.

Note that, in the present embodiment, a case in which a PDN and a DN are configured as the same network will be described as illustrated in FIG. 1. However, the contents described in the present embodiment are applicable even in a case that the PDN and the DN are configured as different networks.

Also, in the present embodiment, a case in which an HSS and a UDM, a PCF and a PCRF, an SMF and a PGW-C, a UPF and a PGW-U are each configured as the same device (i.e., the same physical hardware, or the same logical hardware, or the same software) as described in FIG. 2 will be described. However, the contents described in the present embodiment can also be applied even in a case that they are configured as different apparatuses (i.e., different physical hardware, or different logical hardware, or different software). For example, the apparatuses may transmit and/or receive data directly, transmit and/or receive data via an N26 interface between AMF-MME, or transmit and/or receive data via the UE.

7.1. Attach Procedure in EPS

First, the attach procedure in the EPS will be described with reference to FIG. 11, however, description of the procedure may be omitted because the procedure has the same contents as that described in Section 5.1. of second embodiment.

Note that the MME may include an information element indicating the presence or absence of the N26 interface, which is an interface between the EPC and the 5GC, in an attach accept message during the present attach procedure. Additionally, the UE may authenticate the presence or absence of the N26 interface based on the received information element. Furthermore, in a case that there is not the N26 interface, the registration procedure in the present embodiment may be replaced with a registration procedure for initial registration. In this case, the first identification information included in the registration request message transmitted and/or received during the registration procedure in the present embodiment may be replaced with the first identification information indicating the initial registration.

7.2. PDN Connectivity Procedure in EPS

First, the PDN connectivity procedure in the EPS will be described with reference to FIG. 12, however, description of the procedure may be omitted because the procedure has the same contents as that described in Section 5.2. of the second embodiment.

Note that, in a case that the PDN connectivity procedure is completed, the UE can transition to the 31st state. In a case that the UE moves from the communication area of the EPS to the communication area of the 5GS, the UE can transition to the 41st state. Further, the UE may transition from the 31st state to the 41st state by changing the connection destination from the EPC to the 5GC. Further, the UE may transition from the 41st state to the 31st state by switching the mode of the UE from the S1 mode to the N1 mode. Note that conditions of the status of the UE for transitioning from the 31st state to the 41st state are not limited thereto.

7.3. Registration Procedure in 5GS

Next, a registration procedure in the 5GS will be described using FIG. 8. The registration procedure is a procedure for registration in the access network_B, and/or the core network_B, and/or the DN initiated by the UE. In a case that the UE is not registered in the network, the UE can perform the present procedure at any timing, for example, in a case that power is input. In other words, the UE may initiate the present procedure at any timing in a non-registered state (RM-DEREGISTERED state). The registration procedure can be performed in a case that the UE is in the 41st state. In addition, each apparatus (particularly, the UE and the AMF) can transition to a registration state (RM-REGISTERED state) based on the completion of the registration procedure.

Furthermore, the registration procedure may be a procedure for updating location registration information of the UE on the network, and/or regularly notifying the network of a state of the UE from the UE, and/or updating a specific parameter related to the UE in the network.

The UE may initiate a registration procedure in a case that the UE has mobility across a TA. In other words, the UE may initiate the registration procedure in a case that the UE moves to a TA different from a TA indicated in a TA list retained by the UE. Furthermore, the UE may initiate the present procedure in a case that a running timer expires. Furthermore, the UE may initiate the registration procedure in a case that a context of each apparatus needs to be updated due to disconnection or deactivation of a PDU session. Furthermore, the UE may initiate the registration procedure in a case that a change occurs in capability information and/or preference for PDU session establishment of the UE. Furthermore, the UE may initiate the registration procedure regularly. Note that, the configuration is not limited thereto, and the UE can perform the registration procedure at any timing as long as a PDU session is established. Note that the UE may initiate the present procedure based on the transition to the 41st state, or may initiate the present procedure based on movement of the UE.

First, the UE transmits a registration request message to an AMF via a 5G AN (or gNB) (S800) (S802) (S804) to initiate the registration procedure. Specifically, the UE transmits an RRC message including the registration request message to the 5G AN (or gNB) (S800). Note that the registration request message is an NAS message. In addition, the RRC message may be a control message transmitted and/or received between the UE and the 5G AN (or gNB). Furthermore, the NAS message may be processed in an NAS layer, and the RRC message may be processed in an RRC layer. Note that the NAS layer is a layer higher than the RRC layer. In addition, the UE can transition to the 44th state in a case that the registration request message is transmitted.

Here, the UE may include the first identification information indicating a mobility registration update in the registration request message and transmit the information, or may include the first identification information in the registration request message and transmit the information to indicate that the present procedure is a registration procedure for the mobility registration update.

In a case that an RRC message including the registration request message is received from the UE, the 5G AN (or gNB) selects an AMF to forward the registration request message (S802). Note that the 5G AN (or gNB) can select the AMF based on the registration request message and/or information included in the RRC message. The 5G AN (or gNB) retrieves the registration request message from the received RRC message and forwards the registration request message to the selected AMF (S804).

In a case that the registration request message is received from the 5G AN (or gNB), the AMF can perform the first condition determination. The first condition determination is intended to determine whether the network (or AMF) accepts a request from the UE. The AMF initiates the procedure (A) of FIG. 8 in a case that the first condition determination is true, and initiates the procedure (B) of FIG. 8 in a case that the first condition determination is false.

Note that the first condition determination may be performed based on reception of the registration request message, and/or identification information and/or subscription information, and/or an operator policy included in the registration request message. For example, in a case that the network accepts a request of the UE, the first condition determination is true, and in a case that the network does not accept requests of the UE, the first condition determination may be false. Furthermore, the first condition determination may be true in a case that the network that is a registration destination of the UE and/or an apparatus within the network supports a function requested by the UE, and the first condition determination may be false in a case that the network and/or the apparatus does not support the function requested by the UE. Furthermore, in a case that the identification information to be transmitted and/or received is allowed, the first condition determination may be true, and in a case that the identification information to be transmitted and/or received is not allowed, the first condition determination may be false. Note that conditions for determining whether the first condition determination is true or false may not be limited to the above-described conditions.

First, a case in which the first condition determination is true will be described. In the procedure illustrated in (A) of FIG. 8, the AMF can first perform fourth condition determination. The fourth condition determination is to determine whether the AMF transmits and/or receives an SM message to/from the SMF.

Note that the fourth condition determination may be performed based on whether the AMF has received an SM message. In addition, the fourth condition determination may be performed based on whether an SM message is included in the registration request message. For example, the fourth condition determination may be true in a case that the AMF receives the SM message and/or the SM message is included in the registration request message, and the fourth condition determination may be false in a case that the AMF does not receive the SM message and/or the SM message is not included in the registration request message. Note that conditions for determining whether the fourth condition determination is true or false may not be limited to the above-described conditions.

In a case that the fourth condition determination is true, the AMF selects the SMF and transmits and/or receives the SM message to and/or from the selected SMF, whereas, in a case that the fourth condition determination is false, the AMF does not perform the process (S806). Additionally, even in a case that the fourth condition determination is true, in a case that an SM message indicating rejection is received from the SMF, the AMF may cease the procedure (A) of FIG. 8. At this time, the AMF may initiate the procedure (B) of FIG. 8.

Next, the AMF transmits a registration accept message to the UE via the 5G AN (or gNB) as a response message to the registration request message based on the reception of the registration request message and/or the completion of SM message transmission and/or reception to and from the SMF (S808). For example, in a case that the fourth condition determination is true, the AMF may transmit a registration accept message based on reception of the registration request message from the UE. In addition, in a case that the fourth condition determination is false, the AMF may transmit a registration accept message based on the completion of the SM message transmission and/or reception to and from the SMF. Furthermore, although the registration accept message may be an NAS message to be transmitted and/or received on the N1 interface, the UE and the 5G AN (gNB) transmit and/or receive the message included in an RRC message.

In addition, the AMF can transmit an SM message included in the registration accept message (e.g., a PDU session establishment accept message) or transmit the SM message (e.g., a PDU session establishment accept message) along with the registration accept message. In addition, this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF can indicate that a procedure for SM has been accepted in the registration procedure by performing such a transmission method.

In addition, the AMF may indicate that a request of the UE has been accepted by transmitting a registration accept message based on the received identification information and/or network capability information and/or an operator policy and/or a network status and/or user registration information.

The UE receives a registration accept message via the 5G AN (gNB) (S808). The UE receives the registration accept message and thus can recognize that request of the UE has been allowed and the contents of various types of identification information included in the registration accept message.

The UE can transmit a registration complete message to the AMF via the 5G AN (gNB) as a response message to the registration accept message (S810). Note that, in a case that the UE receives an SM message such as a PDU session establishment accept message, the UE may transmit the SM message such as a PDU session establishment complete message included in the registration complete message, or may indicate that the procedure for SM has been completed by including the SM message. Here, although the registration complete message is an NAS message transmitted and/or received on the N1 interface, the UE and the 5G AN (gNB) transmit and/or receive the message included in an RRC message.

The AMF receives the registration complete message via the 5G AN (gNB) (S810). In addition, each apparatus completes the procedure (A) of FIG. 8 based on the transmission and/or reception of the registration accept message and/or the registration complete message.

Note that the UE may transition to the 41st state based on the reception of the registration accept message. Furthermore, the UE may initiate the PDU session establishment procedure to establish a PDU session corresponding to the PDN connection established in the EPC after the completion of the present procedure.

Next, a case in which the first condition determination is false will be described. In the procedure (B) of FIG. 8, the AMF transmits a registration reject message to the UE via the 5G AN (gNB) as a response message to the registration request message (S812). Here, although the registration reject message is an NAS message transmitted and/or received on the N1 interface, the UE and the 5G AN (gNB) transmit and/or receive the message included in an RRC message.

Here, the AMF may include one or more pieces of identification information among the 42nd to 45th identification information in the registration reject message, or may include these pieces of identification information to indicate that the request of the UE has been rejected.

More specifically, the AMF may include the 44th identification information and/or 45th identification information in the registration reject message in a case that the AMF has the N26 interface that is the interface between the 5GC and the EPC. Furthermore, in a case that the AMF does not have the N26 interface, the AMF may include the 42nd identification information and/or the 43rd identification information and/or the 44th identification information and/or the 45th identification information in the registration reject message and transmit the information.

Note that the UE_A 10 may transmit a registration request message including the first identification information indicating initial registration to the 5GC or may transition to the 41st state based on the reception of the 42nd identification information and/or the 45th identification information including the meaning indicated by the 42nd identification information. In addition, the UE_A 10 may transmit the PDU session establishment request message including the 12th identification information indicating the initial request and may transmit the PDU session establishment request message included in the registration request message to the 5GC based on the reception of the 42nd identification information and/or the 45th identification information including the meaning indicated by the 42nd identification information. Furthermore, the UE may initiate the PDU session establishment procedure to establish a PDU session corresponding to the PDN connection established in the EPC after the completion of the present procedure.

Furthermore, the UE_A 10 may transmit the registration request message including the first identification information indicating the initial registration to the 5GC, or may transition to the 42nd state based on the reception of the 43rd identification information and/or the 45th identification information including the meaning indicated by the 43rd identification information. In addition, the UE_A 10 may transmit the PDU session establishment request message including the 12th identification information indicating the initial request and may transmit the PDU session establishment request message included in the registration request message to the 5GC based on the reception of the 43rd identification information and/or the 45th identification information including the meaning indicated by the 43rd identification information. Furthermore, the UE_A 10 may delete retained capability information (Capability) for the EPC, may delete capability information for the S1 mode, or may delete radio capability information for the S1 mode based on the reception of the 43rd identification information and/or the 45th identification information including the meaning indicated by the 43rd identification information.

Further, the UE_A 10 may transition to the 33rd state based on the reception the 44th identification information and/or the 45th identification information including the meaning indicated by the 44th identification information. In addition, the UE_A 10 may delete retained capability information (Capability) for the 5GC, may delete capability information for the N1 mode, or may delete radio capability information for the N1 mode based on the reception of the 44th identification information and/or the 45th identification information including the meaning indicated by the 44th identification information. Furthermore, the UE_A 10 may attempt to connect to the E-UTRAN or attempt to connect to the EPC based on the reception of the 44th identification information and/or the 45th identification information including the meaning indicated by the 44th identification information.

The UE receives the registration reject message via the 5G AN (gNB) (S812). The UE receives the registration reject message to recognize that the request of the UE has been rejected and the contents of the various types of identification information included in the registration reject message. In addition, the UE may recognize that the request of the UE has been rejected in a case that the registration reject message is not received even after a prescribed period of time elapses after the registration request message is transmitted. Each apparatus completes the procedure (B) in the present procedure based on the transmission and/or reception of the registration reject message.

Note that the procedure (B) of FIG. 8 may be initiated in a case that the procedure (A) of FIG. 8 is canceled. Note that, in a case that the fourth condition determination is true in the procedure (A) of FIG. 8, the AMF may transmit an SM message indicating rejection such as a PDU session establishment reject message included in the registration reject message, or may include the SM message indicating rejection therein to indicate that the procedure for SM has been rejected. In that case, the UE may further receive the SM message indicating rejection such as the PDU session establishment reject message, or may recognize that the procedure for SM has been rejected.

Each apparatus completes the registration procedure based on the completion of the procedure (A) or (B) of FIG. 8. Furthermore, each apparatus may perform processing based on the identification information transmitted and/or received in the registration procedure based on the completion of the registration procedure.

8. Modified Examples

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-described electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention.

Furthermore, a configuration in which constituent elements, described in the respective embodiments and having mutually the same effects, are substituted for one another is also included in the technical scope of the present invention.

REFERENCE SIGNS LIST

1 Mobile communication system
5 PDN_A
6 DN_A
10 UE_A
30 PGW-U
32 PGW-C
35 SGW
40 MME
45 eNB
50 HSS
60 PCRF
80 Access network_A (E-UTRAN)
90 Core network_A
120 Access network_B (5G AN)
122 gNB
130 UPF
132 SMF
140 AMF
150 UDM
160 PCF
190 Core network_B

The invention claimed is:

1. A User Equipment (UE) comprising:
a controller, wherein the controller establishes, in an Evolved Packet System (EPS), a Packet Data Network (PDN) connection of which PDN type is non-IP, and configures a PDU session type to Ethernet or Unstructured at a time of a handover from the EPS to a 5G System (5GS), and the PDU session type is configured to a PDU session corresponding to the PDN connection; and
a storage unit configured to store the PDN type and to maintain the PDN type after the handover from the EPS to the 5GS, wherein the storage unit is configured to allow information of the PDN type to be deleted from the storage unit when the PDU session corresponding to the PDN connection is released in a case that after the handover from the EPS to the 5GS the PDU session corresponding to the PDN connection is released.

2. The UE according to claim 1, wherein the storage unit is configured to allow information of the PDN type to be deleted from the storage unit in a case that a prescribed period of time elapses after the handover from the EPS to the 5GS.

3. A communication control method for a User Equipment (UE), the communication control method comprising:
establishing, in an Evolved Packet System (EPS), a Packet Data Network (PDN) connection of which PDN type is non-IP;
configuring a PDU session type to Ethernet or Unstructured at a time of a handover from the EPS to a 5G System (5GS), wherein the PDU session type is configured to a PDU session corresponding to the PDN connection;
continuously storing the PDN type in a storage unit of the UE such that the PDN type is maintained after the handover from the EPS to the 5GS; and
deleting information of the PDN type from the storage unit when the PDU session corresponding to the PDN connection is released in a case that after the handover from the EPS to the 5GS the PDU session corresponding to the PDN connection is released.

4. The communication control method for the UE according to claim 3, the communication control method further comprising:
deleting information of the PDN type in a case that a prescribed period of time elapses after the handover from the EPS to the 5GS.

* * * * *